(12) United States Patent
Kolls

(10) Patent No.: US 6,389,337 B1
(45) Date of Patent: May 14, 2002

(54) TRANSACTING E-COMMERCE AND CONDUCTING E-BUSINESS RELATED TO IDENTIFYING AND PROCURING AUTOMOTIVE SERVICE AND VEHICLE REPLACEMENT PARTS

(76) Inventor: H. Brock Kolls, 1573 Potter Dr., Pottstown, PA (US) 19464

( * ) Notice: Subject to any disclaimer, the term of this patent is extended or adjusted under 35 U.S.C. 154(b) by 0 days.

(21) Appl. No.: 09/564,471

(22) Filed: May 3, 2000

Related U.S. Application Data

(63) Continuation-in-part of application No. 09/556,543, filed on Apr. 24, 2000.

(51) Int. Cl.$^7$ ............................................. G01M 17/00
(52) U.S. Cl. .......................... 701/29; 701/24; 370/313; 370/401; 340/439
(58) Field of Search .............................. 701/24, 29, 33; 370/313, 401, 457; 455/456; 340/438, 439; 73/117.3; 705/26; 700/244, 236, 241; 702/184, 185

(56) References Cited

U.S. PATENT DOCUMENTS

| | | | |
|---|---|---|---|
| 6,069,570 A | | 5/2000 | Herring |
| 6,181,994 B1 | * | 1/2001 | Colson et al. ................ 701/33 |

\* cited by examiner

Primary Examiner—William A. Cuchlinski, Jr.
Assistant Examiner—Arthur D. Donnelly
(74) Attorney, Agent, or Firm—H. Brock Kolls

(57) ABSTRACT

An in-vehicle device data communicates with Internet based data processing resources for the purpose of transacting e-mail, e-commerce, and e-business. The in-vehicle device and the Internet based data processing resources can effectuate a wide variety of e-mail, e-commerce, and e-business including accessing auto part databases, warranty, customer, and other remote databases. In addition, e-mail, e-commerce, and e-business transactions can include vehicle security and vehicle service management, data communicating Internet based radio, audio, MP3, MPEG, video, and other types of data. Furthermore, e-mail, e-commerce, and e-business transactions can include interactive advertising, promotional offers, coupons, and supporting other remote data communications.

The in-vehicle device can also include functionality for remote monitoring of vehicle performance, data communicating and accessing remote Internet based content and data, and effectuating adjustments and control of vehicle operation. Remote monitoring and control of vehicle operation can be by way of an Internet based data processing resource and can include engine control system programming and setting adjustment, vehicle monitoring, and transmission of vehicle telemetry and metric data. Vehicle telemetry and metric data can include global positioning system (GPS) data, vehicle operational data, engine performance data, and other vehicle data.

The in-vehicle device can also wirelessly data communicate with a communication interface device (COM device) or an Internet appliance. Such COM devices or Internet appliances can data communicate wirelessly with an in-vehicle device and simultaneously data communicate in a wired or wireless mode of operation to Internet based data processing resources, and to other data processing resources.

24 Claims, 30 Drawing Sheets

100

600

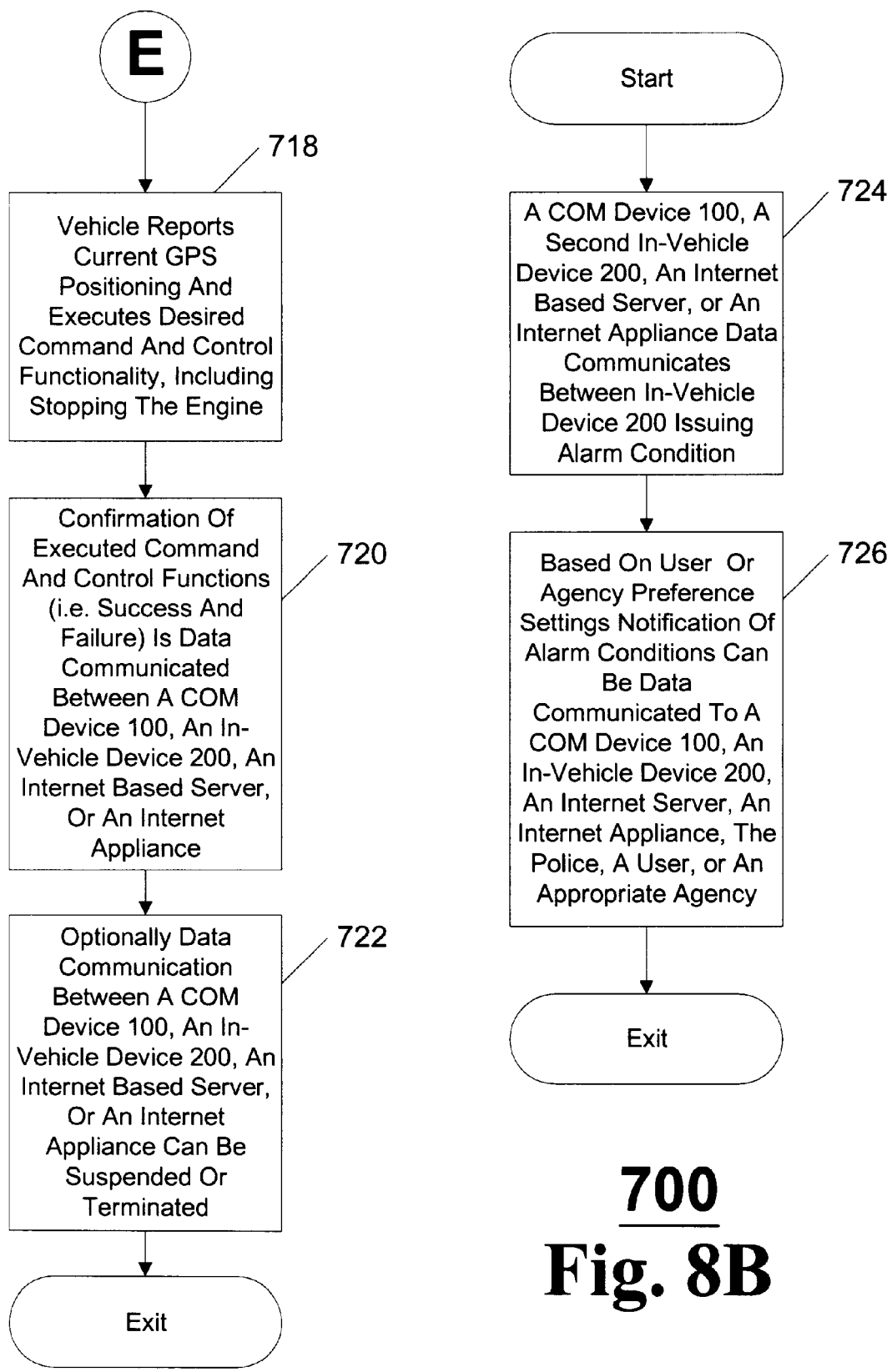

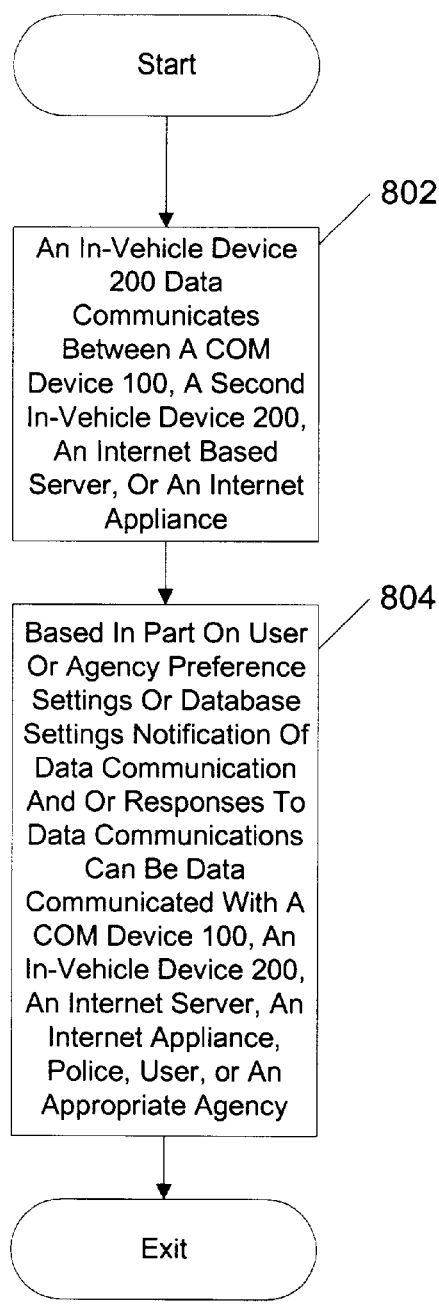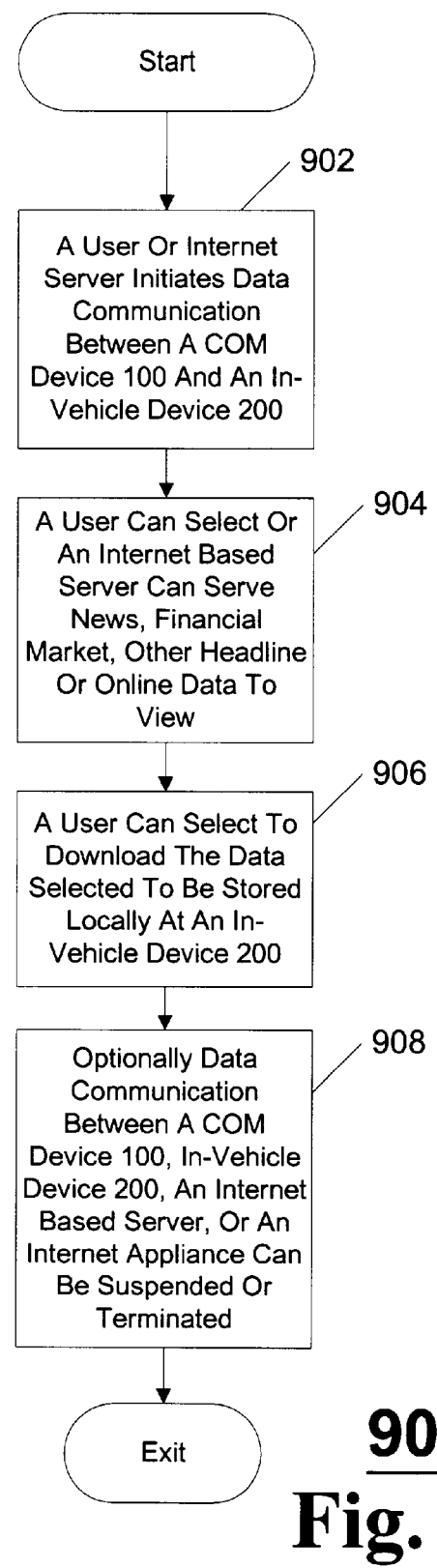

1000

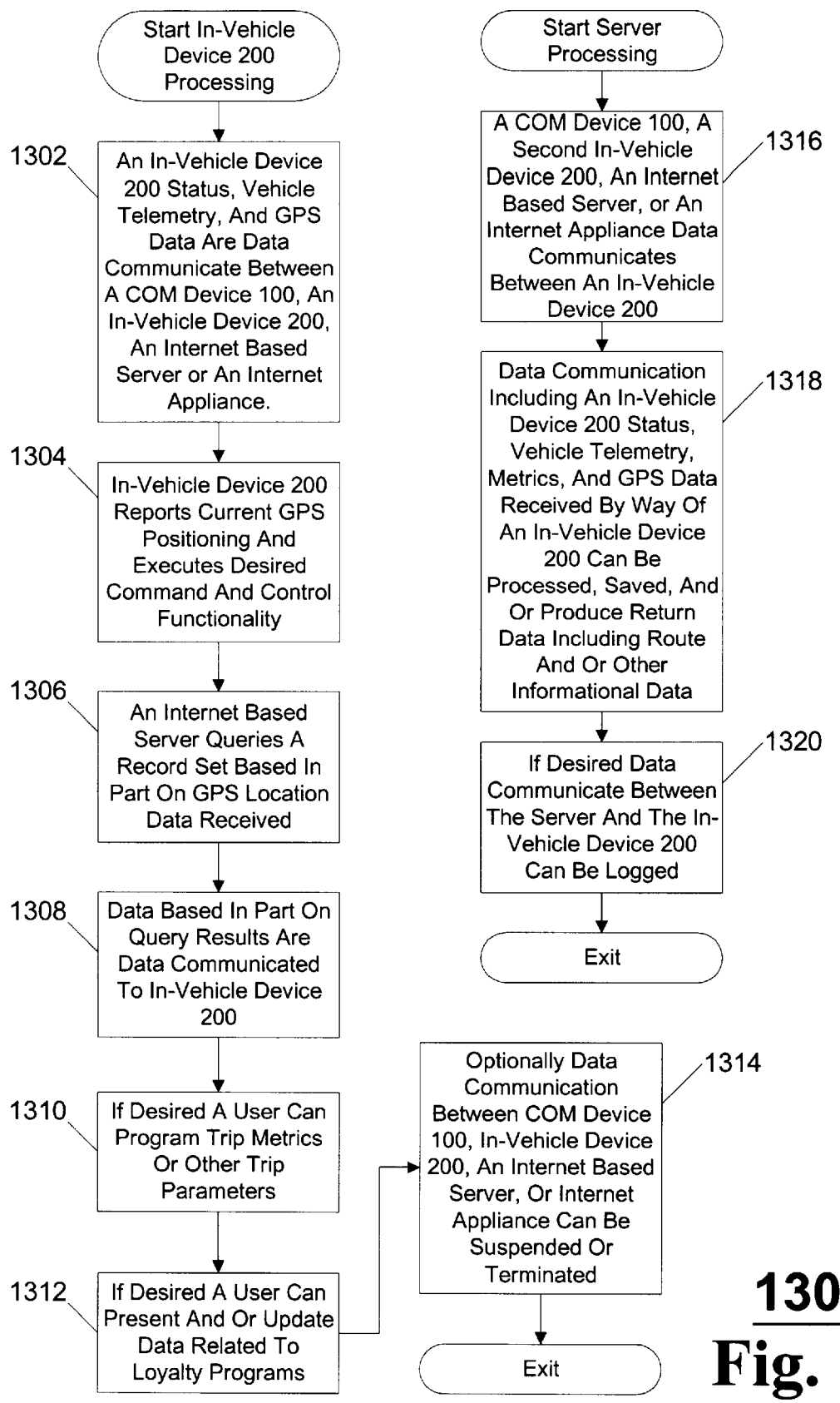

1400

1500

1600

1700

1900

2000

TRANSACTING E-COMMERCE AND CONDUCTING E-BUSINESS RELATED TO IDENTIFYING AND PROCURING AUTOMOTIVE SERVICE AND VEHICLE REPLACEMENT PARTS

RELATED APPLICATIONS

This is a continuation in part application that claims priority of a U.S. non-provisional application, Ser. No. 09/556,543, inventor H. Brock Kolls, entitled AN IN VEHICLE DEVICE FOR WIRELESSLY CONNECTING A VEHICLE TO THE INTERNET AND FOR TRANSACTING E-COMMERCE AND E-BUSINESS, filed Apr. 24, 2000.

TECHNICAL FIELD OF THE INVENTION

The present invention relates to system for wirelessly data communicating between and effectuating a network with a plurality of vehicles and a plurality of data processing resources, including Internet based data processing resources. Such wireless data communications can include data communicating vehicle information, remote monitoring of engine and vehicle performance, data communicating Internet based content, transacting e-mail, e-commerce, and e-business, and adjusting or controlling vehicle operation. Remote monitoring, adjustment, and control of vehicle operation can be effectuated by way of an Internet based data processing resource and can include monitoring vehicle telemetry and metric data. Vehicle telemetry and metric data can include global positioning system (GPS) data and engine performance data.

BACKGROUND OF THE INVENTION

Trucks and automobiles have become increasingly more complex with the advent of engine control systems. These engine control systems can exhibit the ability to diagnose, record, monitor, control, and or optimize engine performance. In addition, some engine control systems may offer additional functionality in the form of vehicle security alarms, door locking, ignition enabling, radio control, or other vehicle command and control functionality.

Even with the advances in engine control systems it can still be difficult for anyone but a mechanic with special diagnostic equipment to obtain and view the engine performance data and or other engine control system settings. In addition, such engine control system data may only be accessible from a repair or service center location and can not typically be monitored, viewed, or altered while the vehicle is in motion or in operation on the open roadway.

The inability to access and analyze engine performance data while a vehicle is in motion or in operation on an open roadway can prevent accurate engine performance analysis and or part failure prediction. Accurate part failure prediction can be characterized as the ability to predict part or system degradation or failure based on engine telemetry data and other vehicle operational data before degradation or failure of the part or system occurs.

The inability to accurately predict when engine problems may arise can cause the vehicle to become disabled while in between a point of origin and a desired destination. When a vehicle becomes disabled before reaching a desired destination the user of the vehicle and other occupants in the vehicle can find themselves stranded. Once stranded the user and occupants of the disabled vehicle may not know where or who to call for help, service, or for vehicle repairs. In addition, the inability to diagnose and repair even the simplest of vehicle problems on the side of a roadway can result in travel delays and expense in towing the vehicle to a repair site or service center location where repairs to the vehicle can be effectuated.

As more and more people take to the roadways in their vehicles for travel the chance of being stranded in unfamiliar areas increases. As the chance of becoming stranded in an unfamiliar area increases the need to be able to rapidly locate auto part stores, service centers, and emergency services can also increase.

Recently, Internet based auto part companies such as WRENCHHEAD.COM, PARTS.COM, CARPARTS.COM and others have begun providing online part locating and ordering services. These virtual online auto part web sites or portals can be convenient to visit and use from the comfort of one's own home personal computer (PC) or office PC, but can be difficult to utilize when stranded on the side of a road, or when stranded in an unfamiliar area.

Auto part stores with physical store locations such as CAR QUEST, AUTOZONE, ADVANCE AUTO PARTS, CHIEF AUTO PARTS, DISCOUNT AUTO PARTS, PEP BOYS, NAPA, MOPAR AUTO PARTS, and others have long maintained in-store databases where customers can look up replacement parts. Physical auto part stores can be convenient when the required parts are in stock and a person has the means and time to visit such a location. However, such locations can have little to offer and can be difficult to utilize when stranded on the side of a road, or when stranded in an unfamiliar area.

Another issue with virtual online stores and physical auto part stores can be that a customer may not be skilled in the art of vehicle repair or may not have access to pertinent vehicle information necessary for the correct selection of a replacement part. In addition, auto part stores can find themselves in the awkward position of having to dispense advice and help customers with access to limited vehicle knowledge or incomplete information. Specific to the virtual online stores the lack of immediate access to the vehicle can prevent even the friendliest of customer service departments from aiding the customer in ascertaining a correct and accurate diagnosis of a vehicle problem or dispensing timely repair and part selection advice. In the case of physical auto part stores an employee can lack the resources or time to aid a customer in diagnosing vehicle problems. Even in a case where an online customer service department, or an employee tries to assist a customer in diagnosing a vehicle problem the lack of easily obtainable engine performance data or other vehicle operational data could prevent a correct and accurate diagnosis.

Whether a customer chooses to do business at a virtual online store or at a physical store location an incorrect or inaccurate diagnosis can lead to additional problems. Additional problems can include purchase and installation of a part that is incorrect, installation of a part that won't fix the problem, introduction of a new engine problem resultant from the use of an incorrect part, and or a dissatisfied customer's need or desire to return the incorrect part for credit or replacement.

Car manufacturers such as GM, FORD, CHRYSLER, DIAMLER-BENZ, VOLKSWAGEN, TOYOTA, MAZDA, VOLVO, BMW, MERCEDES BENZ, PORSCHE, FERRARI and others have from time to time supported online databases for vehicle warranty, maintenance, repair parts, and vehicle financing information. However, car manufacturers do not accept and or maintain vehicle engine control system data over the Internet. In addition, car manufacturers do not regularly data communicate with their vehicle engine control systems. As such the users, and owners of these vehicles typically do not receive timely engine control system firmware updates, engine performance updates, maintenance information, vehicle information, timely online vehicle or engine service warnings, or other timely online vehicle information or updates.

The inability of online virtual auto part web sites or portal stores, physical auto part stores, and vehicle manufacturers to monitor engine performance data can result in lost sales and lost business opportunities. Lost sales and business opportunities can occur as a result of not anticipating service needs, or accurately diagnosing engine problems. Lost business opportunities can also result from the inability to uniquely identify a vehicle and or the vehicle's owner. Such unique identification could enable targeted marketing opportunities based on immediate and future vehicle service needs.

Online virtual auto part web sites or portal stores, physical auto part stores, and vehicle manufacturers can also lose sales and business opportunities by not maximizing Internet related business opportunities. Internet related business opportunities have allowed a wide variety of traditional businesses and services that support the auto industry to move their business products and service offerings online and create virtual companies. Examples can include advertising services, maps service, hotel and motel directories, radio stations, television stations, and news organizations to name a few.

A number of deficiencies give rise to the long felt need of the present invention. Such deficiencies can include the inability to data communicate telemetry data and stored system data within a vehicle's engine control system to the Internet and or Internet based data processing resources. In addition, the inability of auto part retailers and vehicle manufacturers to dynamically tie inventory and part databases to real time vehicle telemetry and metric data can result in lost sales and lost business opportunities.

Other deficiencies can include the inability of online and physical auto part stores to augment there existing part databases, and data processing resources. Such auto part store databases and data processing resource deficiencies can include a lack of support for monitoring and evaluating vehicle engine performance data and other vehicle data, the inability to use engine performance data to aid customers in accurately diagnosing vehicle problems, and selecting correct replacement parts.

Other deficiencies can include the inability to remotely anticipate vehicle and customer service needs, and vehicle requirements based in part on vehicle telemetry and metric data. Furthermore, the inability to uniquely identify and data communicate with a specific vehicle can prevent or limit customer support and other business opportunities.

SUMMARY OF THE INVENTION

The present invention relates to an in-vehicle device for remotely monitoring vehicle performance, for data communicating Internet based content, and for controlling vehicle operation. An in-vehicle device can be referred to as an in-vehicle device 200. Remote monitoring and control of vehicle operation can be by way of an Internet based data processing resource and can include vehicle telemetry and metric data. Vehicle telemetry and metric data can include global positioning system (GPS) data, vehicle operational data, engine performance data, and other vehicle data. Such an in-vehicle device 200 can wirelessly data communicate over the Internet to Internet based data processing resources, and to other data processing resources.

The present invention also relates to a communication interface device for data communicating wirelessly with an in-vehicle device 200. A communication interface device can be referred to as a COM device 100. A COM device 100 can data communicate wirelessly to an in-vehicle device 200, and simultaneously data communicate wired or wirelessly over the Internet to Internet based data processing resources, and to other data processing resources.

The present invention also relates to an Internet appliance for data communicating wirelessly with an in-vehicle device 200. An Internet appliance can be referred to as an Internet appliance 322. An Internet appliance 322 can data communicate wirelessly to an in-vehicle device 200, and simultaneously data communicate wired or wirelessly over the Internet to Internet based data processing resources, and to other data processing resources.

The present invention also relates to an Internet based network architecture for data communicating between Internet based data processing resources and a plurality of vehicles each equipped with an in-vehicle device 200. Data communication between data processing resources and an in-vehicle device 200 can be by way of a direct data communication between the data processing resource and an in-vehicle device 200. Alternatively, data communication between the data processing resource and an in-vehicle device 200 can be by way of a data communication facilitated by a COM device 100, or an Internet appliance 322.

The present invention also relates to the system formed by the cooperation of a plurality of COM device 100, a plurality of in-vehicle device 200, the network to manage the devices and the data processing resources utilized by both devices. Such a system can be utilized to transact and conduct a wide variety and types of e-commerce and e-business.

BRIEF DESCRIPTION OF FIGURES

The present invention is best understood from the following detailed description when read in connection with the accompanying drawings. Included in the drawings are the following Figures:

FIGS. 8A–8B show an Internet based vehicle alarm routine 700 flowchart;

FIG. 9 shows an Internet based notification routine 800 flowchart;

FIG. 10 shows an Internet based information acquisition routine 900 flowchart;

FIG. 14 shows an Internet based vehicle tracking routine 1300 flowchart;

DETAILED DESCRIPTION OF THE INVENTION

Figure 1A:
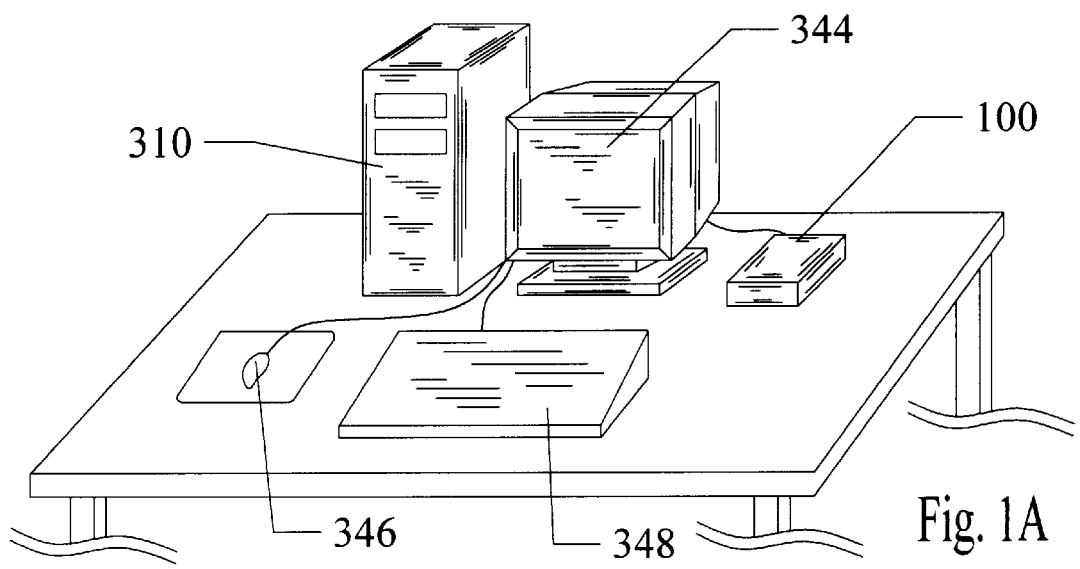
FIG. 1A shows a personal computer workstation.

Referring to FIG. 1A there is shown a personal computer (PC) system 310 interconnected with a communication interfacing device 100. The PC 310 is interconnected with several peripheral devices including a monitor 344, a mouse 346, and a keyboard 348. Other peripheral devices (not shown) can be interconnected with a PC 310. Other peripheral devices can include printers, scanners, modems, point of sale (POS) equipment such as bar code readers, as well as other PC 310 compatible peripheral devices. A PC 310 can be an industry standard INTEL x86, CELERON, or Pentium compatible processor or an AMD x86 compatible or ATHLON processor based system. In addition, a PC 310 can be an APPLE based system. PC's manufactured by DELL, GATEWAY, IBM, APPLE, or similar architectures can be a PC 310. A PC 310 can also take the form of a laptop, notebook, or personal data assistant (PDA).

Figure 3:
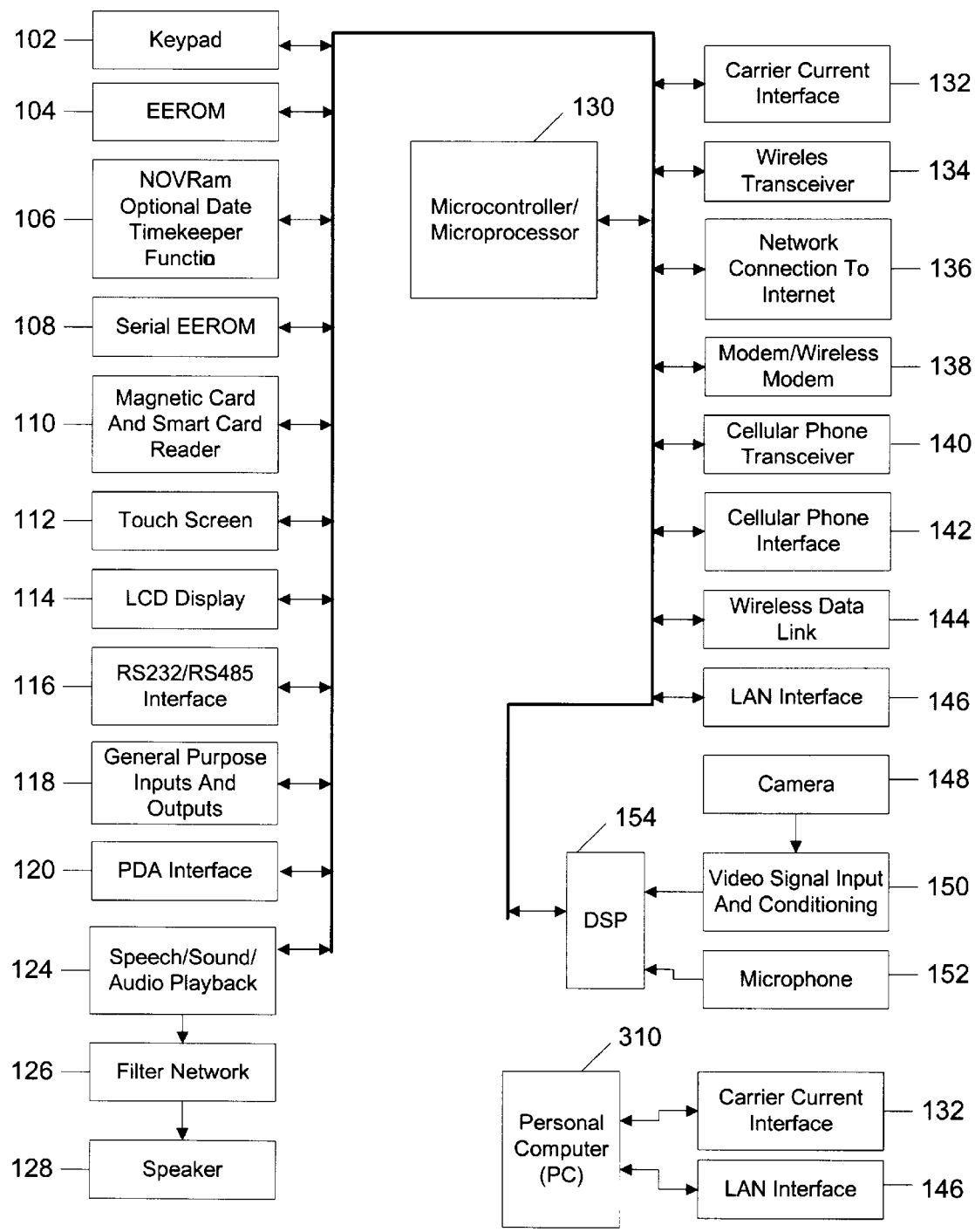
FIG. 3 shows a communication interfacing device 100 block diagram.
Figure 4:
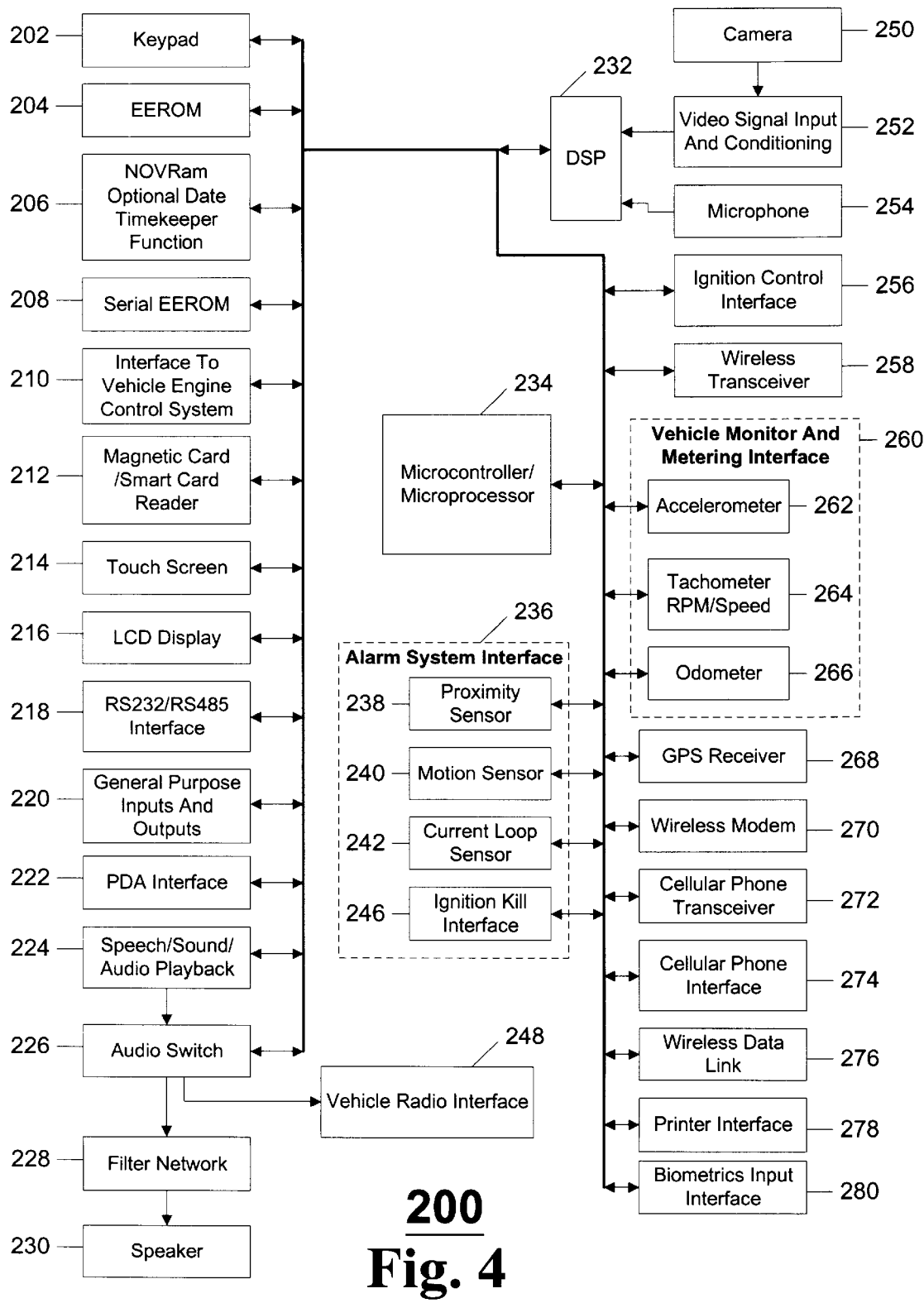
FIG. 4 shows an in-vehicle device 200 block diagram.

FIGS. 1B–1J show a plurality of a stationary communication interface device 100 and a mobile in-vehicle device 200. A communication interface device 100 can be referred to as a COM device 100. A mobile in-vehicle device 200 can be referred to as an in-vehicle device 200. A COM device 100 and an in-vehicle device 200 can be located in any suitable configuration such that the two devices can data communicate wirelessly. As such, COM device 100 can be located in a plurality of physical locations where, in the normal course of vehicle usage (i.e. driving), the two devices could continuously or from time to time be in wireless proximity with each other. FIG. 3 and accompanying disclosure detail the functionality and operation of a COM device 100. FIG. 4 and accompanying disclosure detail the functionality and operation of an in-vehicle device 200.

In general, a COM device 100, and an in-vehicle device 200 can access or be accessed by an Internet based server or an Internet based application server. In addition, a COM device 100, and an in-vehicle device 200 cooperated together and can be referred to as a system. Such a system can include additional local and Internet based data processing resources accessible by the COM device 100, or the in-vehicle device 200. Furthermore, such a system can be utilized to effectuate numerous forms and types of e-commerce and e-business.

E-commerce is the electronic buying and selling of good and services typically conducted over a global network. E-business is the electronic transacting of business over a global network. The Internet can be referred to as a global network.

Figure 1B:
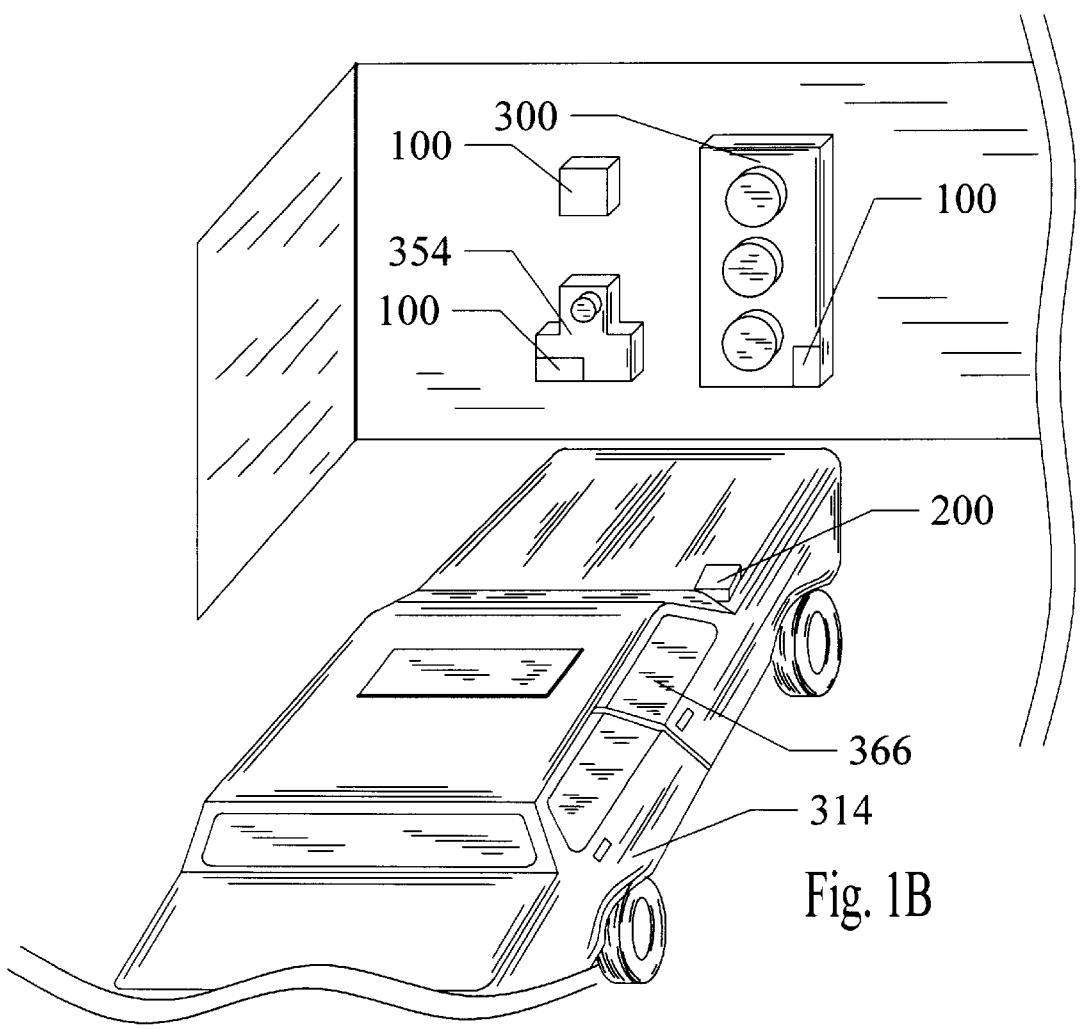
FIGS. 1B–1J shows a plurality of communication interfacing device 100 and a plurality of in-vehicle device 200 physical locations and device configurations.

Referring to FIG. 1B there is shown, within a garage, a plurality of COM device 100 embodiments. A COM device 100 can be mounted mutually exclusive from any other device or can be manufactured into other devices.

In an exemplary embodiment a COM device 100 can cache data communicated to it by an Internet based data processing resource or an in-vehicle device 200. In such as embodiment the COM device 100 can receive and cache data until such time the appropriate data processing resource or in-vehicle device 200 becomes available. The ability to cache data can allow a COM device 100 to hold data at a plurality of COM device 100 locations until the appropriate time or until the desired in-vehicle device 200 comes into wireless data communicating proximity. As an example and not limitation, an Internet based data processing resource could initiate a command to stop a vehicle equipped with an in-vehicle device 200. Such a command can be cached in a plurality of COM device 100 until such time the desired in-vehicle 200 comes into wireless data communication proximity. At such time the command can be data communicated. And the vehicle stopped. The results can then be data communicated to the appropriate Internet based data processing resource as required.

The Internet can be referred to as a global network and such terms can be utilized interchangeably with the same scope and meaning in this disclosure. Data processing resources with data connectivity to the Internet can be interchangeably referred to as Internet based data processing resources or global network based data processing resources.

A COM device 100 can be referred to as a client, an Internet based data processing resources, or a global network based data processing resource. In addition, an in-vehicle device 200 can be referred to as a client, an Internet based data processing resources, or a global network based data processing resource.

An Internet appliance, such as Internet appliance 322 can be referred to as a global network appliance or global network appliance 322. An Internet appliance 322 can be a COM device 100 or can include a COM device 100 as part of the Internet appliance 322 embodiment.

Internet based data processing resources can include Internet based servers, Internet based appliances, and other Internet based data processing resources. An Internet based server can be referred to as a global network server. Internet based data processing resources can be referred to as global network based data processing resources.

Furthermore, an in-vehicle device 200 and a COM device 100 can be constructed with numerous processor technologies platforms including INTEL x86 or PENTIUM processor technology, or MOTOROLA processor technologies, such as POWERPC, and the 68HC series of microprocessors and microcontrollers. In addition, an in-vehicle device 200 and a COM device 100 can operate on an embedded binary input-output system (BIOS) including a PC style BIOS and can run embedded system operating systems. Embedded system operating systems (OS) can include OSEK, OSEK/VDX, PALM OS, WINDOWS CE, QNX NEUTRINO, and other embedded system operating systems. In addition, development tools and application software can include MICROSOFT VISUAL STUDIO development tools and application software, VIRTUAL JAVA MACHINE development tools and application software, and other development tools and application software.

A COM device 100 can be interconnected with a parking proximity sensor 300. Furthermore, a COM device 100 can be interconnected with a proximity sensing parking light 354.

In general, a COM device 100 can be built into any suitable device. In this fashion a manufacturer of devices intended for use with vehicles or in convenient proximity to a vehicle can build the functionality of a COM device 100 into their device or product.

An in-vehicle device 200 can be interconnected with a vehicle 314. The portion of vehicle 314 where the driver, passengers, or other occupants are seated can be referred to as the vehicle 314 passenger compartment area 366. An in-vehicle device 200 can have further interconnection to a vehicle's control system, engine control system, or other vehicle operational point as shown in FIG. 4.

In-vehicle device 200 can be mounted in any convenient location. Preferable an in-vehicle device 200 can be mounted in a secure location such as under the hood, in a window, or in the truck. Alternatively, an in-vehicle device 200 can be mounted within the vehicle's battery, or in a battery case and can utilize a secure power connection to the battery as well as be sealed into a clean environment. Replacement of an in-vehicle device 200 can be by way of replacing the vehicle's battery or detaching the in-vehicle device 200 from the battery's enclosure.

Figure 1C:
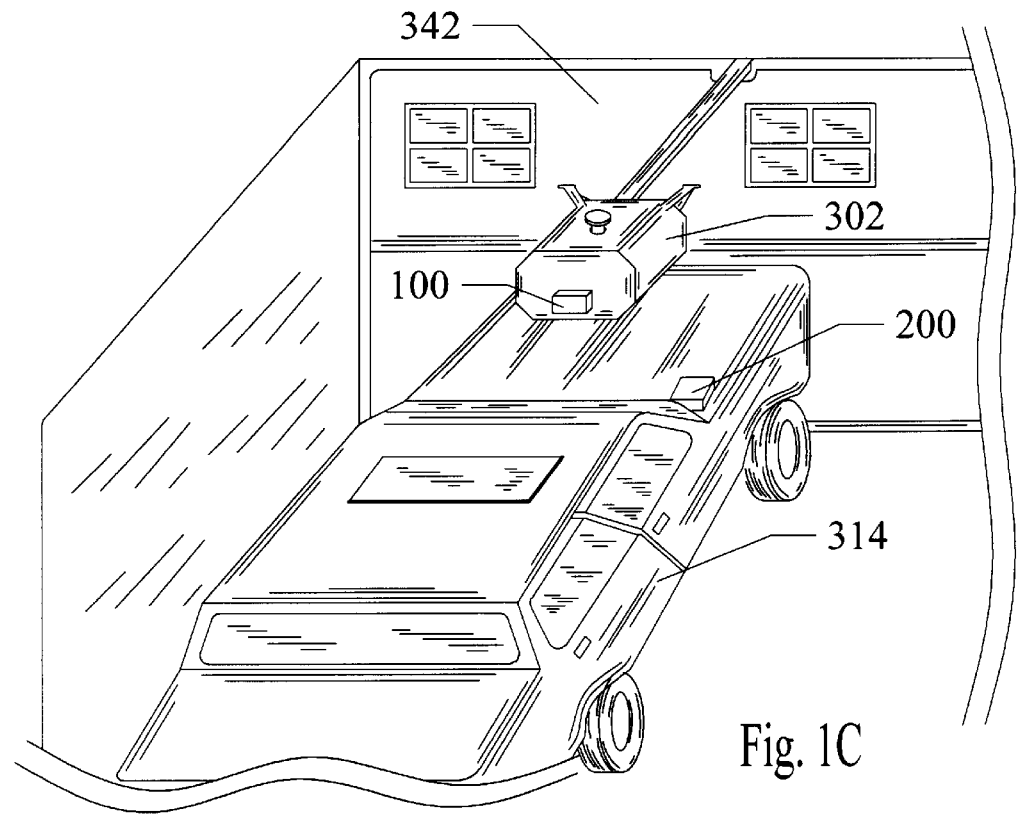

Referring to FIG. 1C there is shown a COM device 100 interconnected with a garage door opener 302. Interconnected with a garage door opener 302 can be a garage door 342. An in-vehicle device 200 interconnected with a vehicle 314 is shown in close proximity to a COM device 100. A garage door opener 302 can be a SEARS, GENIE, STANLEY or similar type of garage door device.

Figure 1D:
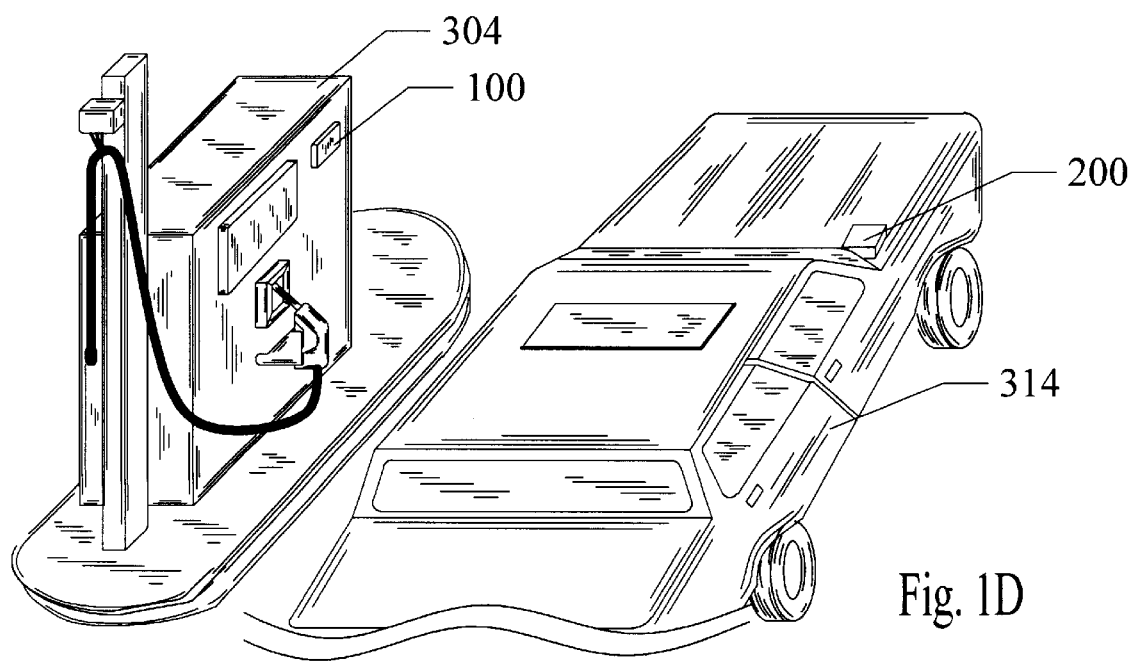

Referring to FIG. 1D there is shown a COM device 100 interconnect with a gas pump 304. A gas pump 304 can be a similar in type or manufacture to those utilized at most gas stations. A gas pump 304 can include those gas pumps utilized by BP AMOCO, ARCO, SHELL, CHEVRON, MOBIL, TEXACO, GULF, CONOCO, EXXON, independent station owners, convenience store operators, and other similar types of gas pumps. A COM device 100 can interface to a gas pump point-of-sale terminal. A gas pump point-of-sale terminal can be a WAYNE DRESSAR, GILBARCO, DAYNL, or other similar gas pump point-of-sale terminal.

Figure 1E:
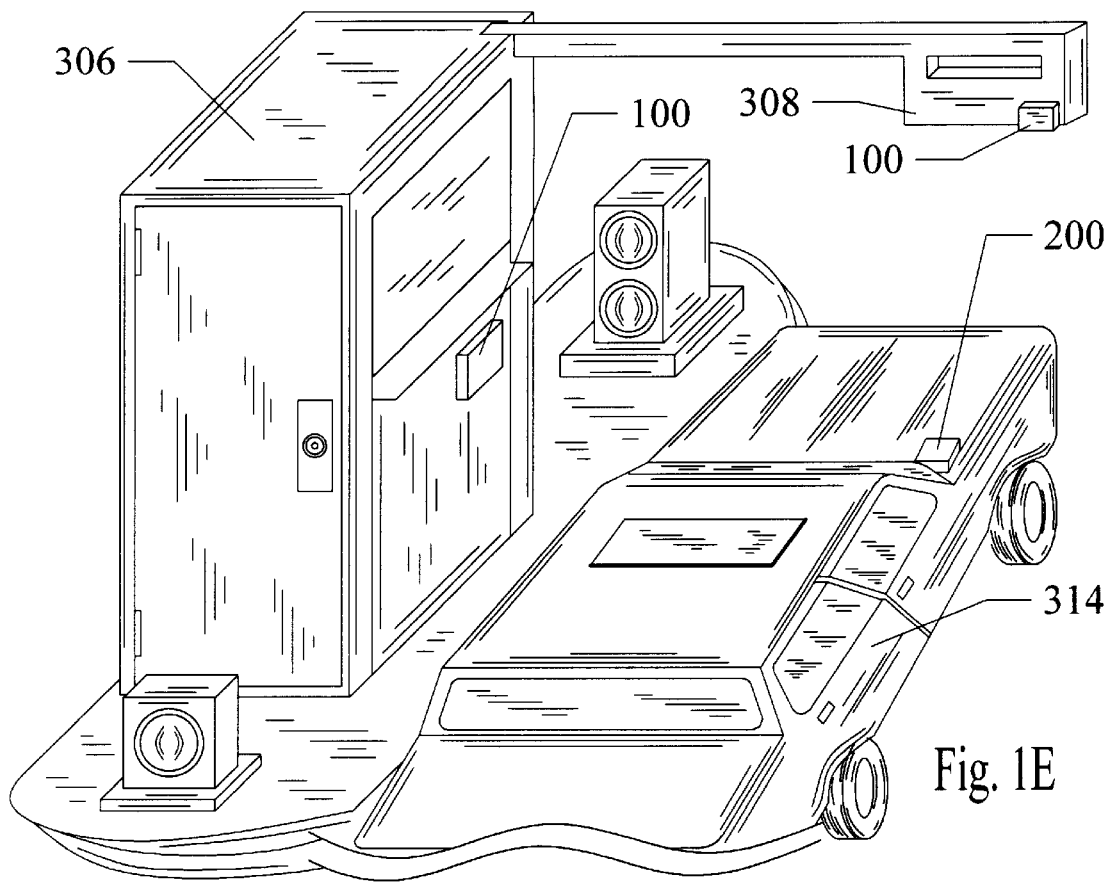

Referring to FIG. 1E there is shown a COM device 100 interconnected with a tollbooth 306. A tollbooth 306 can be commonly found on turnpikes, at bridge crossings, and tunnel entrances. In general, a tollbooth 306 can be established for the purpose of collecting money from a vehicle at certain roadway points, and for the use of certain roadways or passageways. Also shown is a COM device 100 interconnected with a wireless toll-pass system 308. A wireless toll-pass system can be utilized to identify a vehicle and charge a vehicle's owner account for passing through the toll area. A wireless toll-pass system 308 can be an E-ZPASS system, or other similar wireless toll-pass system.

In this embodiment while the vehicle is stopped or slowed at a tollbooth 306 or a wireless toll-pass system 308 an in-vehicle device 200 embodied in a vehicle 314 can data communicate with a COM device 100.

Figure 1F:
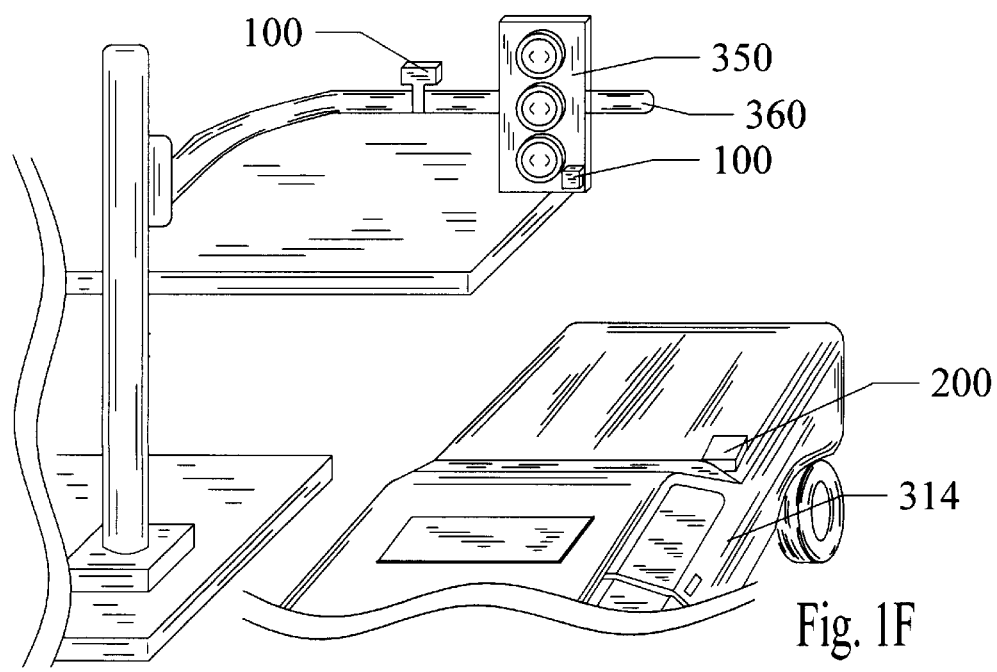

Referring to FIG. 1F there is shown a COM device 100 interconnected with a traffic light pole 360. Also shown is a COM device 100 interconnected with a traffic light 350. In this embodiment an in-vehicle device 200 interconnected with a vehicle 314 can data communicate with a COM device 100 while the vehicle is stopped or passing through an intersection.

Figure 1G:
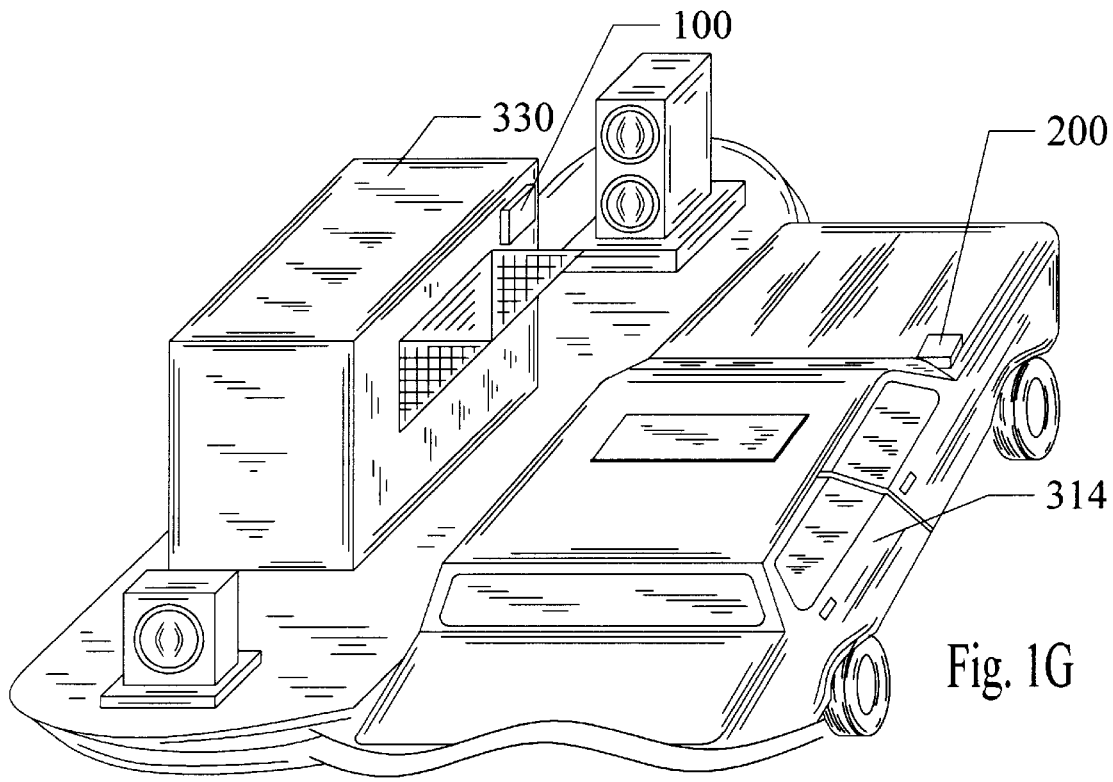

Referring to FIG. 1G there is shown a COM device 100 interconnected with a change tollbooth 330. In this embodiment an in-vehicle device 200 interconnected with a vehicle 314 can data communicate with a COM device 100 while the vehicle is in proximity of the change tollbooth 330 for the purpose of paying a toll.

Figure 1H:
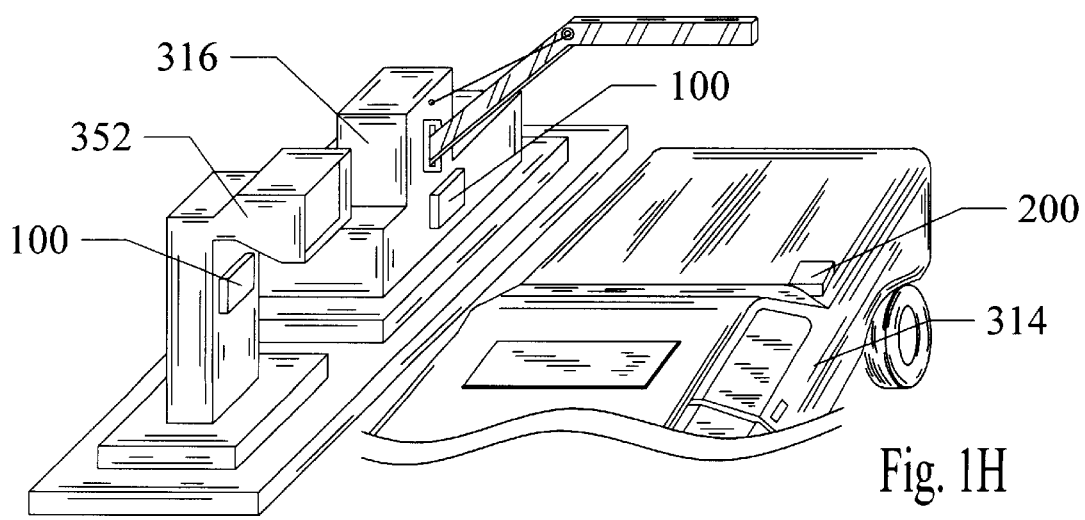

Referring to FIG. 1H there is shown a COM device 100 interconnected with a parking gate 316. Also shown is a COM device 100 interconnected with a parking terminal 352. In this embodiment an in-vehicle device 200 interconnected with a vehicle 314 can data communicate with a COM device 100 while the vehicle is stopped or slowed at the parking gate 316, or the parking terminal 352 for the purpose of obtaining a ticket, calling, inserting a card, or obtaining some additional level of authorization or permission to pass through the gate. A parking gate 316, and parking terminal 352 can be similar to those used at many airports, parking garages, business parking lots, rental cars facilities, and other similar locations.

Figure 1I:
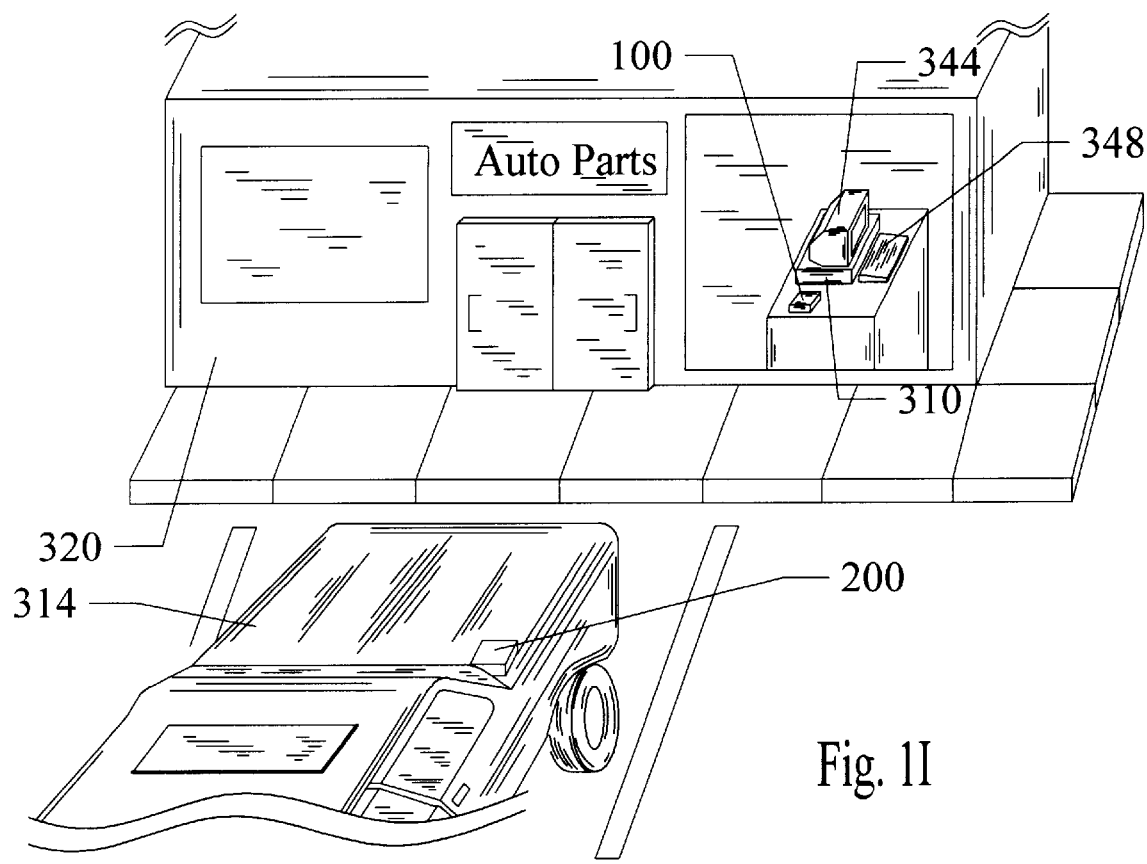

Referring to FIG. 1I there is shown a COM device 100 interconnected with a PC 310 located in a store 320. In this embodiment an in-vehicle device 200 interconnected with a vehicle 314 can data communicate with a COM device 100 located in a store 320 from, for example and without limitation, the stores parking lot, service center, or other location s outside the store. The wireless data communication between COM device 100 and an in-vehicle device 200 can provide information about the vehicle including make, model, feature set, as well as diagnostic, vehicle telemetry, vehicle metrics, and other data.

In this regard, a potential application for the technology can be that an auto parts store could evaluate, diagnose, identify parts, or recommend vehicle service automatically. In addition, access to the Internet via PC 310, a COM device 100 or an in-vehicle device 200 can query information related to warranty, service, parts, coupons, special offers, and other vehicle service, or maintenance data. A store 320 can be any store, garage, service center, vehicle dealership, repair center, or other place of business. A store 320 can be a CAR QUEST, AUTOZONE, ADVANCE AUTO PARTS, CHIEF AUTO PARTS, DISCOUNT AUTO PARTS, PEP BOYS, NAPA, MOPAR AUTO PARTS, or other similar auto parts store.

In an exemplary embodiment querying warranty information can include obtaining vehicle information from a database maintained and utilized in a retail store, or from a vehicle manufacturer database (i.e. GM, FORD, CHRYSLER, DIAMLER-BENZ, VOLKSWAGEN, TOYOTA, MAZDA, VOLVO, BMW, MERCEDES BENZ, PORSCHE, FERRARI, etc.), or other accessible databases. Querying part information can include obtaining part details, specifications, and availability from the retail store databases, Internet based databases, or Internet based auto parts companies such as WRENCHHEAD.COM, PARTS.COM, or CARPARTS.COM, or other accessible databases.

Furthermore, while performing service on a vehicle or while running the vehicle in the parking lot, such as while the customer is parking their vehicle, data can be gathered about the vehicle. The wireless connection between a COM device 100, an in-vehicle device 200, the stores databases, or the Internet can allow for the recording of vehicle and engine performance data.

Use of this performance data can include tracking engine performance over time for different makes and models of vehicles, better serving customer needs, anticipating vehicle part requirements and service needs in an effort to sell customer's parts or services they may not know they need, or enhance warranty programs or offerings by the manufacture, parts suppliers, or stores to list a few.

Figure 1J:
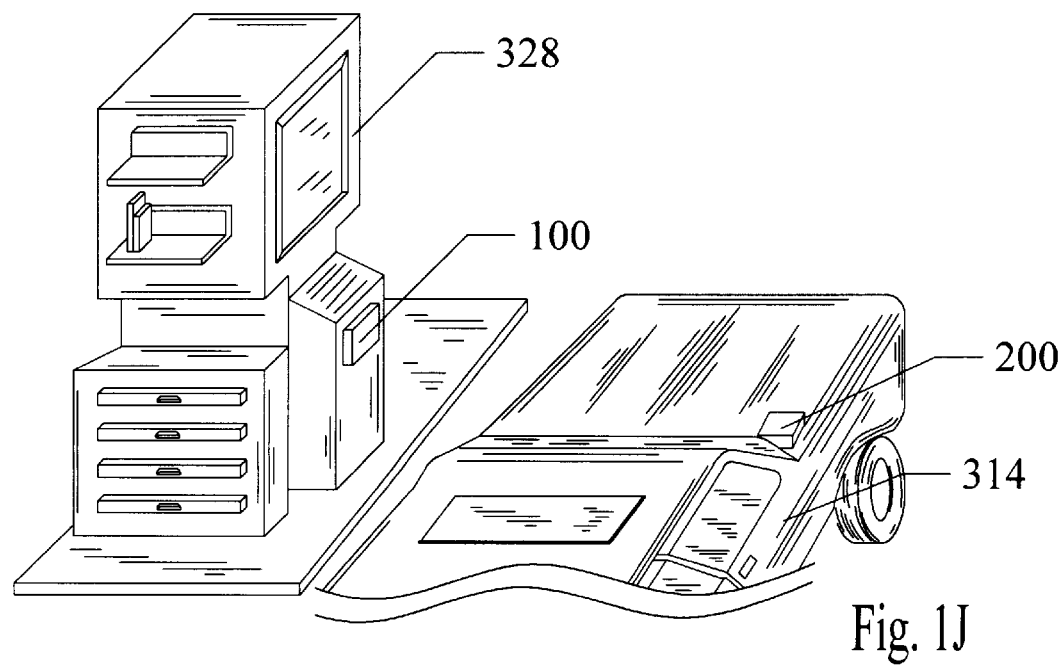

Referring to FIG. 1J there is shown a COM device 100 interconnected with a vehicle analyzer 328. In this embodiment an in-vehicle device 200 interconnected with a vehicle 314 can data communicate vehicle and engine performance to the vehicle analyzer 328, wherein such data can be analyzed, or data communicated to a database, or to an Internet based destination.

Figure 1K:
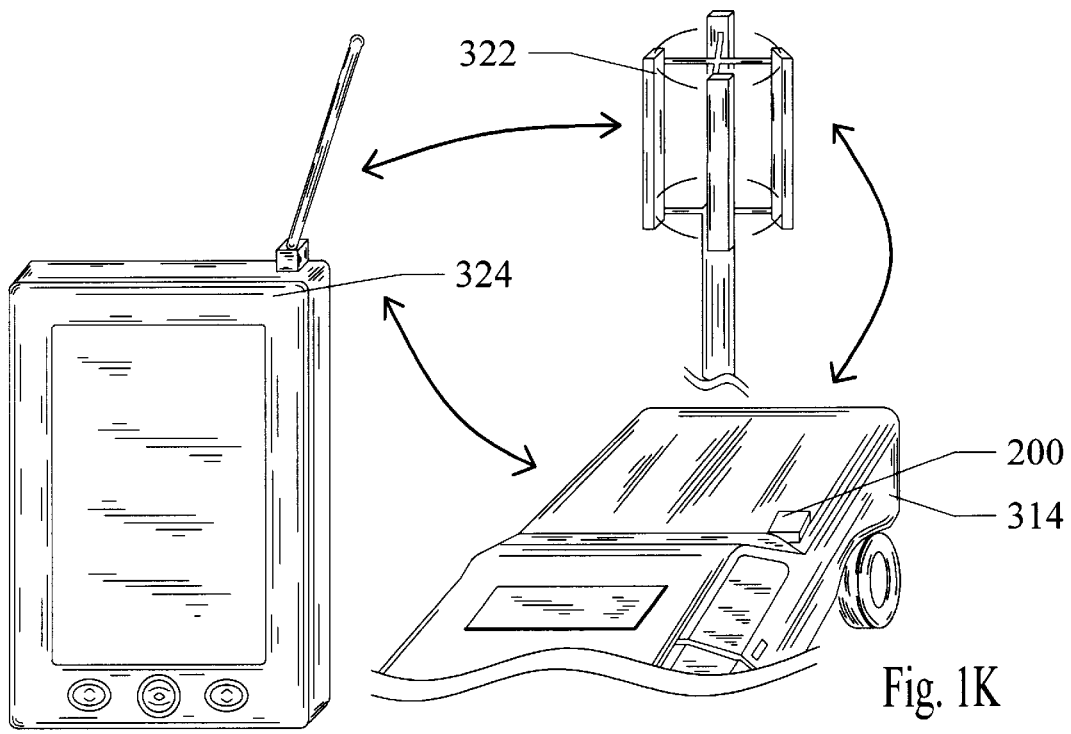
FIG. 1K shows a communication network including a personal data assistant.

Referring to FIG. 1K there is shown a personal data assistant (PDA) 324, and an Internet appliance 322. A PDA 324 can be a programmable storage device, such as a programmable storage device 368. An Internet appliance 322 can be a device, which has inherent in its design a primary application and multiple secondary applications. An Internet appliance 322 can be a COM device 100 or have a COM device 100 as part of an Internet appliance 322 embodiment.

For example and without limitation, a refrigerator can be equipped with an Internet appliance 322. In this embodiment an Internet appliance 322 can be a refrigerator control system and have a primary role of managing a refrigeration system. The Internet appliance 322 can also have a secondary role of connecting the refrigerator to the Internet, or providing wireless access to the Internet such that the Internet appliance 322 and refrigerator can data communicate with an Internet based server. Properly configured a refrigerator equipped with an Internet appliance 322 can serve as a wireless data link between devices such as COM device 100 or an in-vehicle device 200 and the Internet.

A second example of an Internet appliance 322 can be a wireless phone transceiver tower. In this example an Internet appliance 322 can be a wireless phone transceiver having a primary function of managing and conducting numerous simultaneous wireless voice and data phone communications. A secondary functions of the wireless transceiver tower can be as a data conduit for managing numerous wireless data communications for a plurality of COM device 100, or a plurality in-vehicle device 200 for the purpose of data communicating over the Internet to Internet based data processing resource.

In this embodiment an in-vehicle device 200 interconnected with a vehicle 314 can data communicate to either a PDA 324, or an Internet appliance 322. In operation this allows a PDA 324 device to display or effectuate changes to a vehicle equipped with an in-vehicle device 200 or effectuate changes to an in-vehicle device 200 by way of a wireless connection.

A PDA 324 and an in-vehicle device 200 can data communicate by way of direct wireless connection without reliance on an Internet appliance 322. Alternatively, a PDA 324, an in-vehicle device 200, and an Internet appliance 322 can data communicate with each other to allow seamless data communication between the devices or systems.

In an exemplary embodiment an Internet appliance 322 can be a wireless telephone transceiver. In this embodiment an in-vehicle device 200 can maintain a wireless data communication in a similar fashion as a cellular telephone call. The PDA 324 can also establish and maintain a data connection to an Internet appliance 322. As such, data communication between an in-vehicle device 200 and a PDA 324 c an be effectuated. In-vehicle device 200 and PDA 324 can data communicate through the same Internet appliance 322 or through different Internet appliances 322.

Furthermore, an in-vehicle device 200 can data communicate with an Internet appliance 322 for the purpose of obtaining Internet based, or other types of data or data resources. In addition, a PDA 324 can maintain a data connection with an in-vehicle device 200 by way of an Internet appliance 322. In this regard all three devices or systems including an in-vehicle device 200, an Internet appliance 322, and a PDA 324 can freely data communicate between each device or system sharing data and accessing other data resources.

In another exemplary embodiment a PDA 322 can wirelessly connect to and data communicate with an in-vehicle device 200. A PDA 322 can be a CASIO, SHARP, PANASONIC, SANYO, SONY, 3COM PALM PILOT brand or type, or other similar brands or types of PDA. Wireless data communications can be by way of proprietary wireless standards and protocols, 3COM wireless standards and protocols, wireless application protocol (WAP), BLUE TOOTH compliant standards and protocols, small device microwave, spread spectrum, 900 MHZ, or other suitable wireless standards, frequencies, or protocols.

Figure 1L:
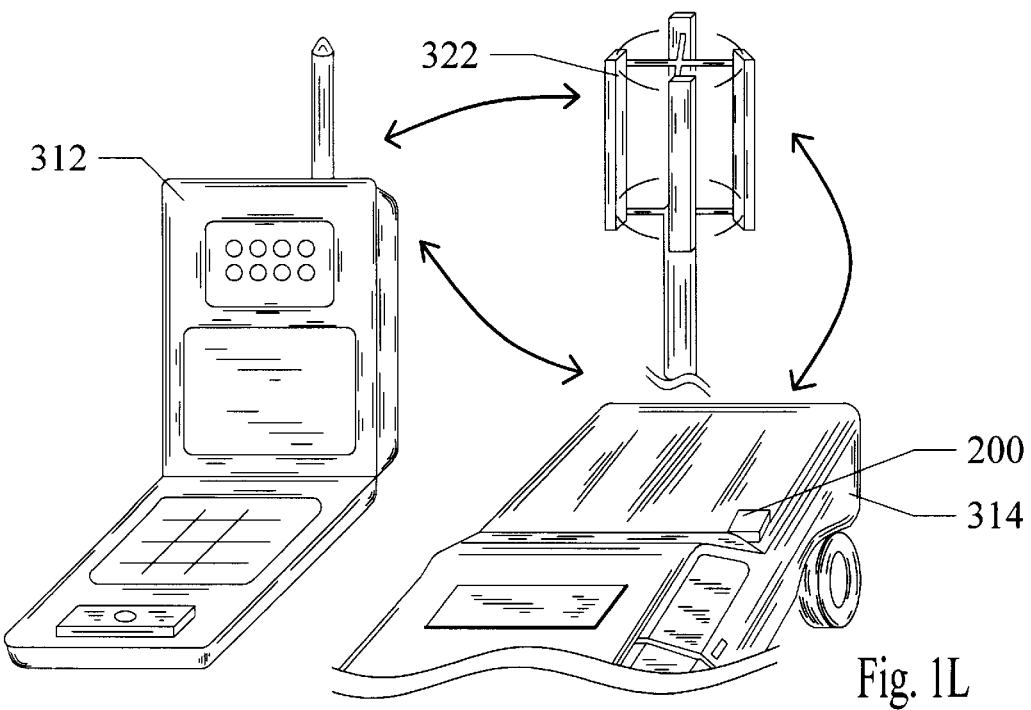
FIG. 1L shows a communication network including a wireless phone.

Referring to FIG. 1L there is shown a wireless phone 312, and an Internet appliance 322. A wireless phone 312 can be a programmable storage device, such as a programmable storage device 368. In this embodiment an in-vehicle device 200 interconnected with a vehicle 314 can data communicate to either a wireless phone 312, or an Internet appliance 322. An Internet appliance 322 can be a COM device 100 or have a COM device 100 as part of an Internet appliance 322 embodiment.

In operation this allows a wireless phone 312 device to display or effectuate changes to a vehicle equipped with an in-vehicle device 200 or effectuate changes to an in-vehicle device 200 by way of a wireless connection.

A wireless phone 312 and an in-vehicle device 200 can data communicate by way of direct wireless connection without reliance on an Internet appliance 322. Alternatively, a wireless phone 312, an in-vehicle device 200, and an Internet appliance 322 can data communicate with each other to allow seamless data communication between the devices or systems.

In an exemplary embodiment an Internet appliance 322 can be a wireless telephone transceiver. In this embodiment an in-vehicle device 200 can maintain a wireless data communication in a similar fashion as a cellular telephone call. The wireless phone 312 can also establish and maintain a data connection to an Internet appliance 322. As such, data communication between an in-vehicle device 200 and a wireless phone 312 can be effectuated. In-vehicle device 200 and wireless phone 312 can data communicate through the same Internet appliance 322 or through different Internet appliances 322.

Furthermore, an in-vehicle device 200 can data communicate with an Internet appliance 322 for the purpose of obtaining Internet based, or other types of data or data resources. In addition, a wireless phone 312 can maintain a data connection with an in-vehicle device 200 by way of an Internet appliance 322. In this regard all three devices or systems including an in-vehicle device 200, an Internet appliance 322, and a wireless phone 312 can freely data communicate between each device or system sharing data and accessing other data resources.

In another exemplary embodiment a wireless phone 312 can wirelessly connect to and data communicate with an in-vehicle device 200. A wireless phone 312 can be an ERICSON, MOTOROLA, QUALCOM, AUDIOVOX, SPRINT, AT&T, OMNIPOINT, or other similar brands or types of wireless phones.

Figure 1M:
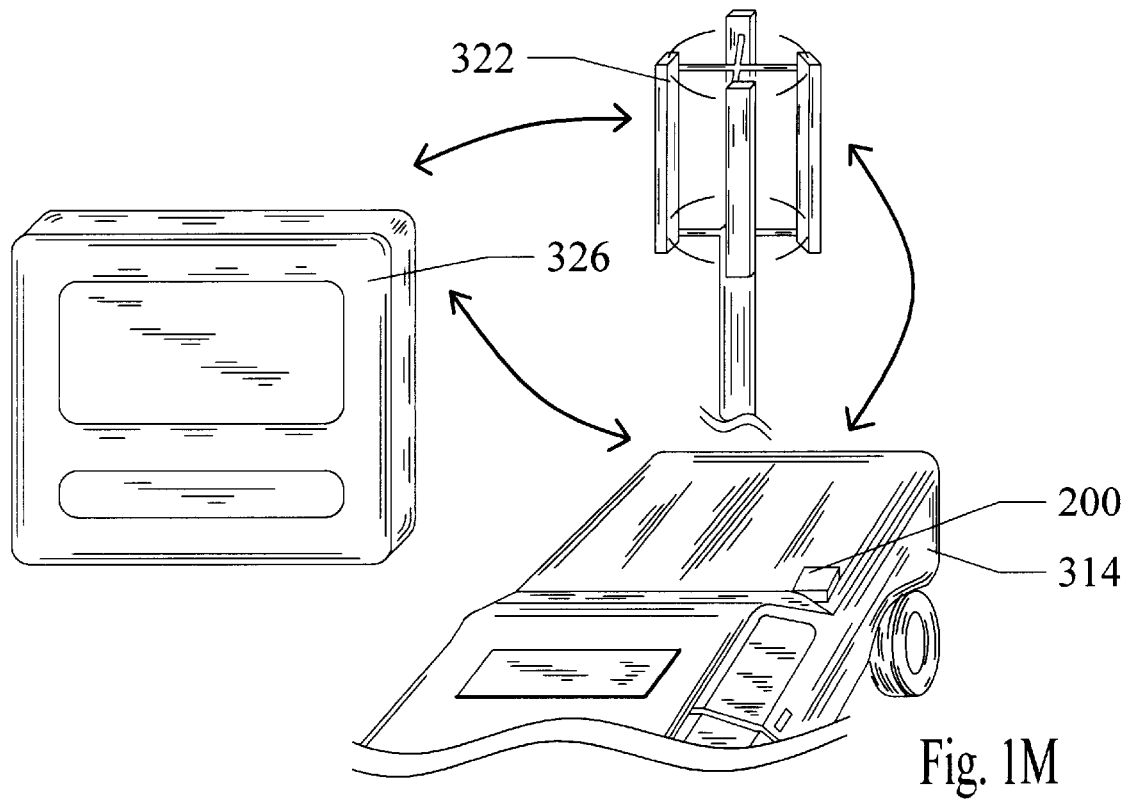
FIG. 1M shows a communication network including a pager.

Refer ring to FIG. 1M there is shown a pager 326, and an Internet appliance 322. A pager 326 can be a programmable storage device, such as a programmable storage device 368. In this embodiment an in-vehicle device 200 interconnected with a vehicle 314 can data communicate to either a pager 326, or an Internet appliance 322. An Internet appliance 322 can be a COM device 100 or have a COM device 100 as part of an Internet appliance 322 embodiment. In operation this allows a pager 326 to display or effectuate changes to a vehicle equipped with an in-vehicle device 200 or effectuate changes to an in-vehicle device 200 by way of a wireless connection.

A pager 326 and an in-vehicle device 200 can data communicate by way of direct wireless connection without reliance on an Internet appliance 322. Alternatively, a pager 326, an in-vehicle device 200, and an Internet appliance 322 can data communicate with each other to allow seamless data communication between the devices or systems.

In an exemplary embodiment an Internet appliance 322 can be a wireless telephone transceiver. In this embodiment an in-vehicle device 200 can maintain a wireless data communication in a similar fashion as a cellular telephone call. The pager 326 can also establish and maintain a data connection to an Internet appliance 322. As such, data communication between an in-vehicle device 200 and a pager 326 can be effectuated. In-vehicle device 200 and pager 326 can data communicate through the same Internet appliance 322 or through different Internet appliances 322.

Furthermore, an in-vehicle device 200 can data communicate with an Internet appliance 322 for the purpose of obtaining Internet based, or other types of data or data resources. In addition, a pager 326 can maintain a data connection with an in-vehicle device 200 by way of an Internet appliance 322. In this regard all three devices or systems including an in-vehicle device 200, an Internet appliance 322, and a pager 326 can freely data communicate between each device or system sharing data and accessing other data resources.

In another exemplary embodiment a pager 326 can wirelessly connect to and data communicate with an in-vehicle device 200. A pager 326 can be a SKYTEL, MOTOROLA, QUALCOM, or other similar brands or types of pagers.

Figure 1N:
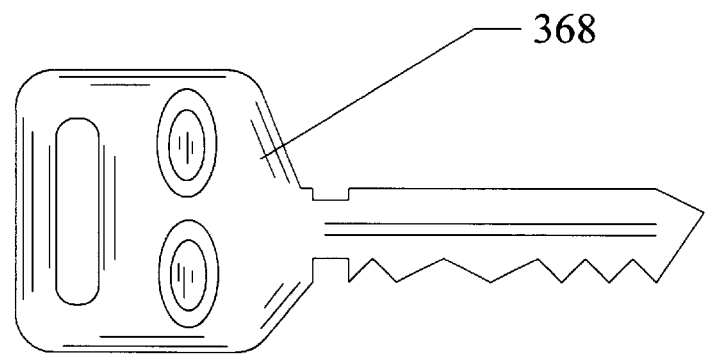
FIG. 1N shows a programmable storage device.

Referring to FIG. 1N there is shown a programmable storage device 368. A programmable storage device 368 is a device capable of storing data transmitted wired or wirelessly from an in-vehicle device 200. Once data is stored within the programmable storage device 368 a user can physically carry the programmable storage device 368 to a alternative destination where the data within the programmable storage device 368 can be transferred to a COM device 100, or Internet appliance 322. Data can also be transferred from a COM device 100 or an Internet appliance 322 to the programmable storage device 368. A user can then carry the programmable storage to an in-vehicle device 200.

Once at the in-vehicle device 200 the data within the programmable storage device 368 can be data communicated to the in-vehicle device 200. A programmable storage device 368 can be a vehicle key to start the engine.

In an exemplary embodiment a use r can transfer data between an in-vehicle device 200, a COM device 1 00, an Internet appliance 322, and a programmable storage device 368. This can enable a user to transfer data from the vehicle interconnected with an in-vehicle device 200 to the programmable storage device 368 for the purpose of carrying the data to a location away from the vehicle. The user can then carry the programmable storage device 368 into, for example and not limitation an auto part store. Once in the auto part store the data in the programmable storage device 368 can be data communicated to a COM device 100. The COM device 100 can then data communicate with additional data processing resources, such as a PC 310, or a global network based data processing resource.

A PDA 324, or a wireless phone 312, or a pager 326 can be a programmable storage device 368. In addition, a data key chain, or other portable storage device easily carried by a user can be utilized to implement a programmable storage device 368.

Figure 2A:
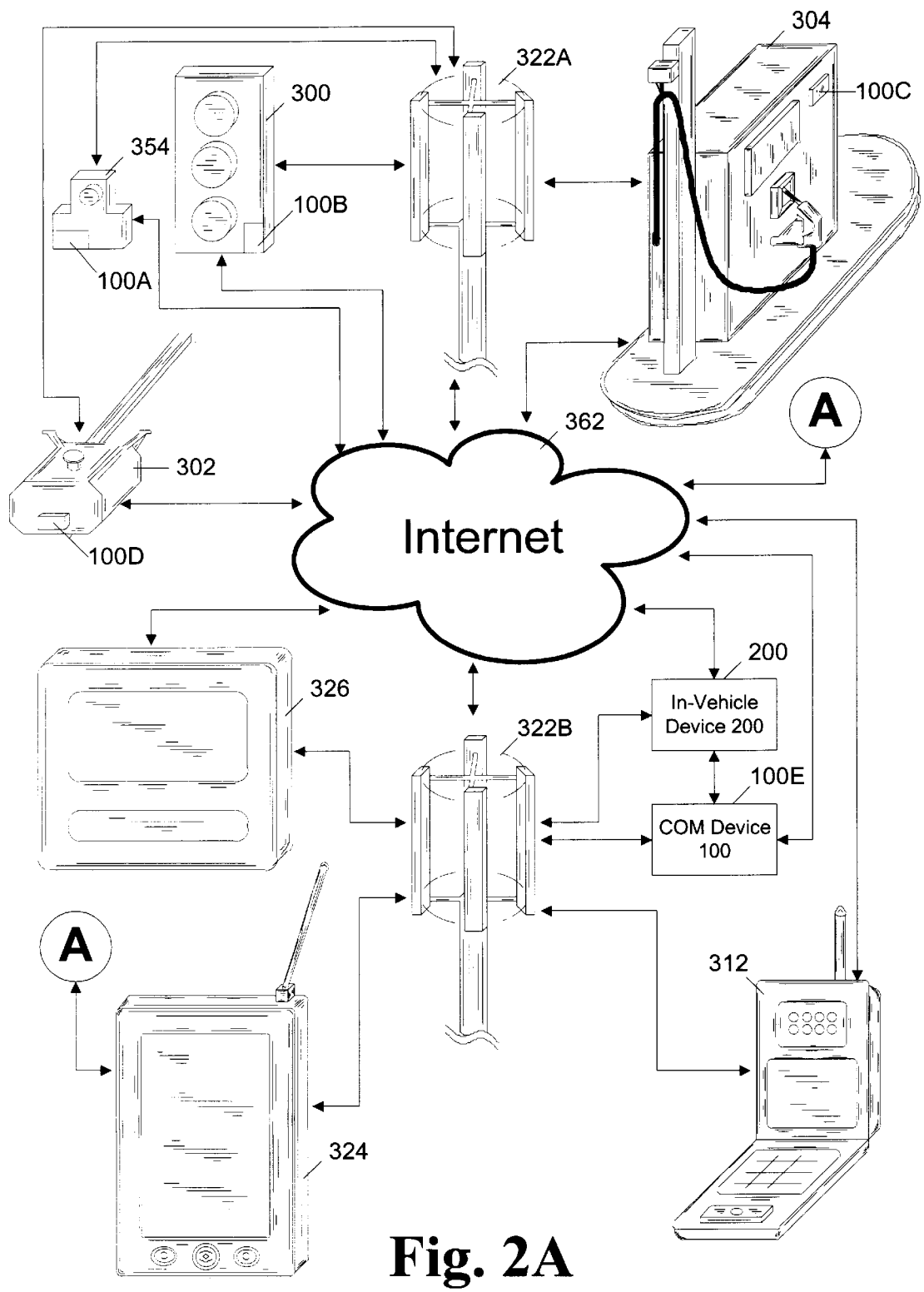
FIGS. 2A–2C show a data communication network diagram.
Figure 2B:
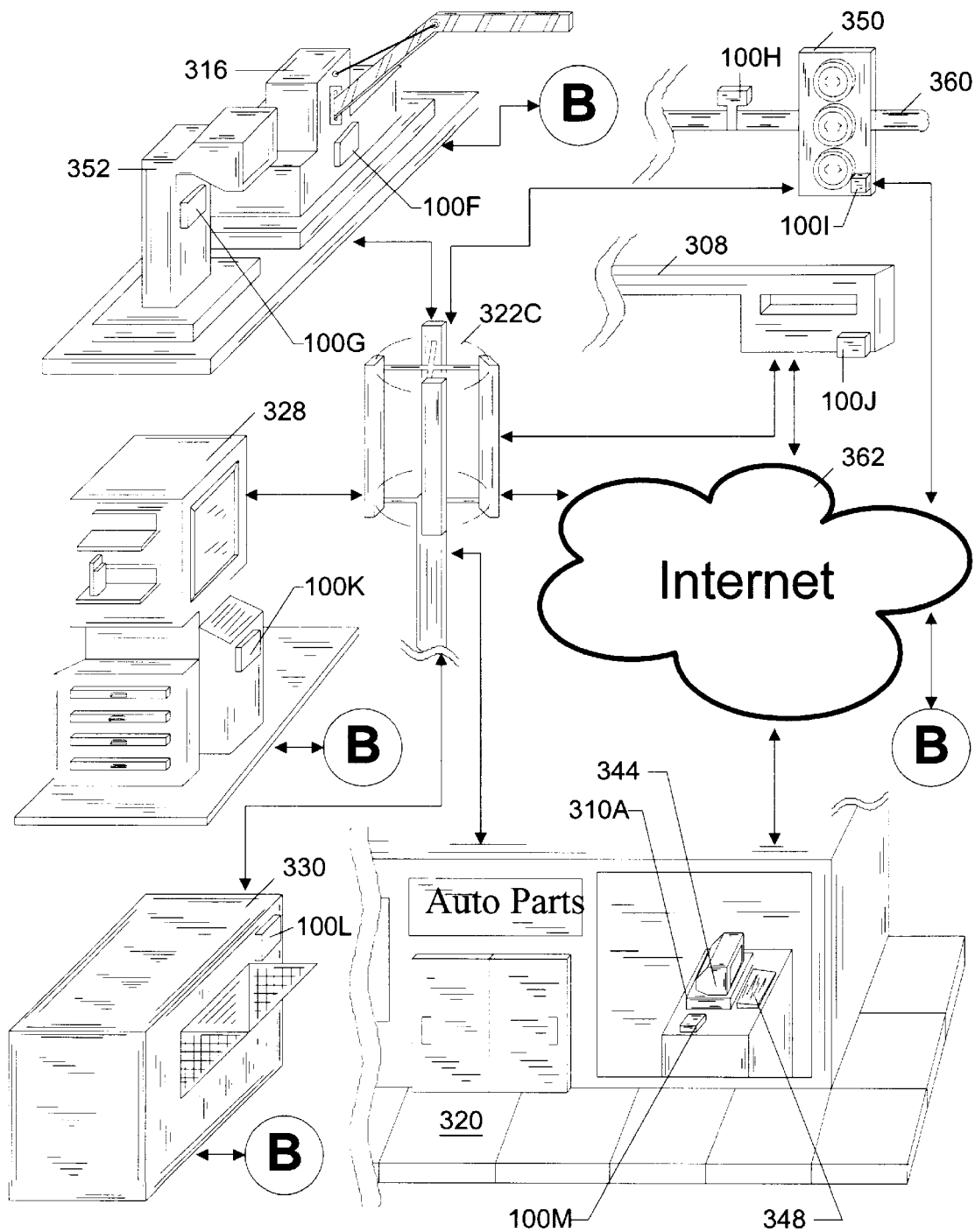
Figure 2C:
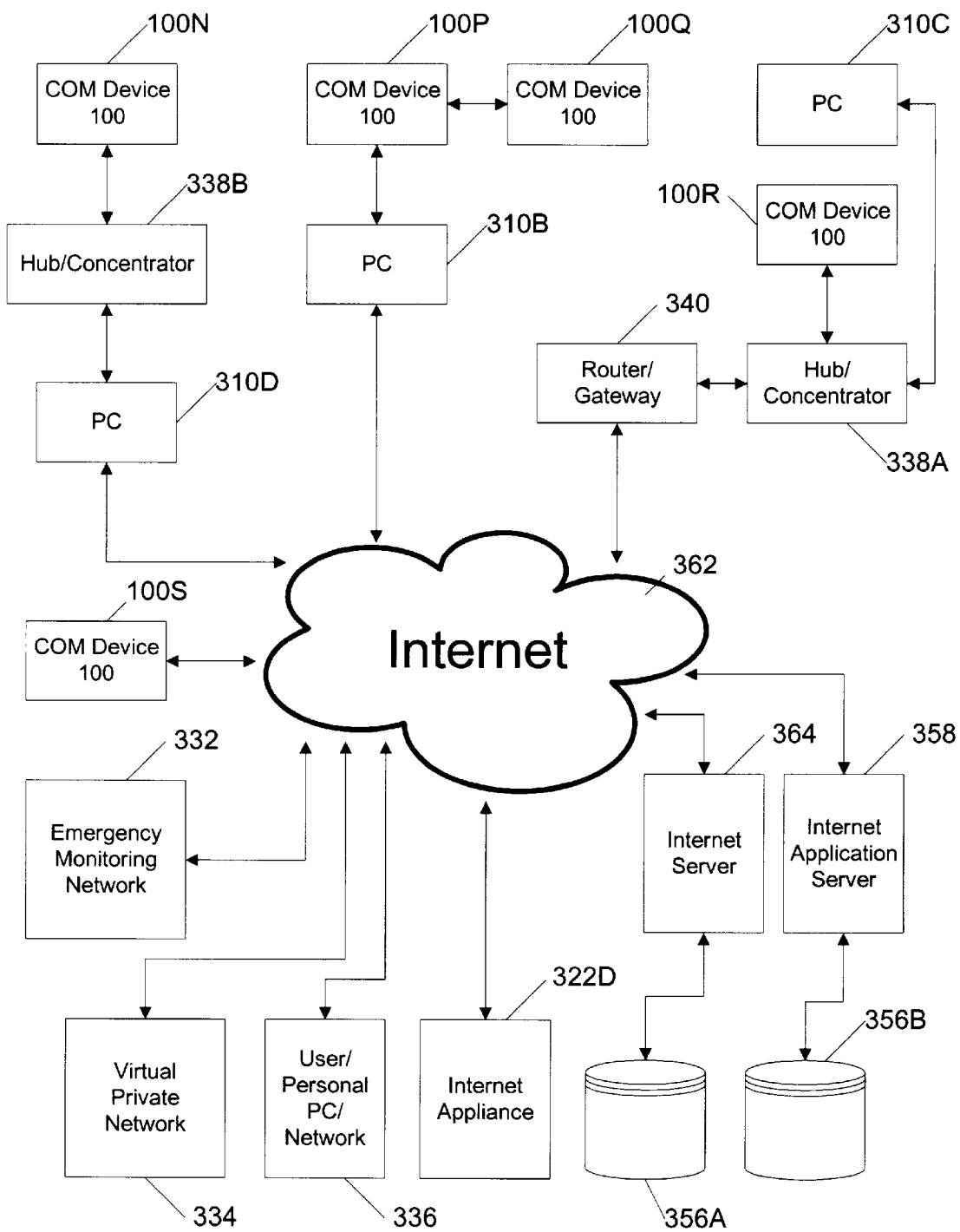

Referring to FIGS. 2A–2C there is shown a data communication network block diagram. FIG. 2A shows data communication network connection between a plurality of data communicating devices and the Internet. The Internet can also be referred to as a global network.

Interconnected with proximity sensing parking light 354 is a COM device 100A. A COM device 100A can be a specific embodiment of a COM device 100. A COM device 100A can be interconnected with the Internet 362. A COM device 100A can also be interconnected with an Internet appliance 322A, which in turn the Internet appliance 322A can be interconnected with the Internet 362. COM device 100A can data communicate over the Internet by way of Internet appliance 322A. An Internet appliance 322A can be a specific embodiment of an Internet appliance 322.

Depending on the particular embodiment and user preferences the proximity sensing parking light 354 with COM device 100A combination can selectively choose a single method to data communicate over the Internet 362, utilize a plurality of methods to data communicate over the Internet, or select not to have a direct Internet connection.

In an embodiment where a COM device 100A selects not to have a direct Internet connection, a COM device 100A can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100A can data communicate over the Internet by way of either the Internet appliance 322A data connection or by way of a more direct connection to the Internet 362. A more direct connection to the Internet can be by way of Internet service provider (ISP), a TCP/IP connection, a PPP or SOCKET layer connection, a remote access server (RAS), by utilizing wireless Internet standards or protocols, or other Internet connection points or connection types.

The interconnections between a COM device 100A and the Internet appliance 322A, and between a COM device 100A and the Internet 362 are mutually exclusive. In a plurality of exemplary embodiments, correct operation of a COM device 100A can utilize one of the interconnections to the Internet, both of the interconnections to the Internet, or neither interconnection to the Internet.

Interconnected with a parking proximity sensor 300 is a COM device 100B. A COM device 100B can be a specific embodiment of a COM device 100. A COM device 100B can be interconnected with the Internet 362. A COM device 100B can also be interconnected with an Internet appliance 322A, which in turn the Internet appliance 322A can be interconnected with the Internet 362. COM device 100B can data communicate over the Internet by way of Internet appliance 322A.

Depending on the particular embodiment and user preferences the parking proximity sensor 300 with COM device 100B combination can selectively choose a single method to data communicate over the Internet 362, utilize a plurality of methods to data communicate over the Internet, or select to not have a direct Internet connection.

In an embodiment where a COM device 100B selects not to have a direct Internet connection, a COM device 100B can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100B can data communicate over the Internet by way of either the Internet appliance 322A data connection or by way of a more direct connection to the Internet 362. A more direct connection to the Internet can be by way of ISP, a TCP/IP connection, a PPP or SOCKET layer connection, a RAS connection, by utilizing wireless Internet standards or protocols, or other Internet connection points or connection types.

The interconnections between a COM device 100B and the Internet appliance 322A, and between a COM device 100B and the Internet 362 are mutually exclusive. In a plurality of exemplary embodiments, correct operation of a COM device 100B can utilize one of the interconnections to the Internet, both of the interconnections to the Internet, or neither interconnection to the Internet.

Interconnected with a gas pump 304 is a COM device 100C. A COM device 100C can be a specific embodiment of a COM device 100. A COM device 100C can be interconnected with the Internet 362. A COM device 100C can also be interconnected with an Internet appliance 322A, which in turn the Internet appliance 322A can be interconnected with the Internet 362. COM device 100C can data communicate over the Internet by way of Internet appliance 322A.

Depending on the particular embodiment and user preferences the gas pump 304 with COM device 100C combination can selectively choose a single method to data communicate over the Internet 362, utilize a plurality of methods to data communicate over the Internet, or select to not have a direct Internet connection.

In an embodiment where a COM device 100C selects not to have a direct Internet connection, a COM device 100C can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100C can data communicate over the Internet by way of either the Internet appliance 322A data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100C and the Internet appliance 322A, and between a COM device 100C and the Internet 362 are mutually exclusive. In a plurality of exemplary embodiments, correct operation of a COM device 100C can utilize one of the interconnections to the Internet, both of the interconnections to the Internet, or neither interconnection to the Internet.

Interconnected with a garage door opener 302 is a COM device 100D. A COM device 100D can be a specific embodiment of a COM device 100. A COM device 100D can be interconnected with the Internet 362. A COM device 100D can also be interconnected with an Internet appliance 322A, which in turn the Internet appliance 322A can be interconnected with the Internet 362. COM device 100D can data communicate over the Internet by way of Internet appliance 322A.

Depending on the particular embodiment and user preferences the garage door opener 302 with COM device 100D combination can selectively choose a single method to data communicate over the Internet 362, utilize a plurality of methods to data communicate over the Internet, or select to not have a direct Internet connection.

In an embodiment where a COM device 100D selects not to have a direct Internet connection, a COM device 100D can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100D can data communicate over the Internet by way of either the Internet appliance 322A data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100D and the Internet appliance 322A, and between a COM device 100D and the Internet 362 are mutually exclusive. In a plurality of exemplary embodiments, correct operation of a COM device 100D can utilize one of the interconnections to the Internet, both of the interconnections to the Internet, or neither interconnection to the Internet.

A pager 326 can be interconnected with the Internet 362. Alternatively, a pager 326 can be interconnected with an Internet appliance 322B. The Internet appliance 322B can in turn be interconnected with the Internet 362. In both embodiments the pager 326 can data communicate over the Internet to a plurality of COM device 100, a plurality of in-vehicle device 200, a plurality of Internet based servers, a plurality of Internet appliances, or a plurality of other Internet based data processing resources. An Internet appliance 322B can be a specific embodiment of an Internet appliance 322.

Depending on the particular embodiment and user preferences the pager 326 can selectively choose a single method to data communicate over the Internet 362, utilize a plurality of methods to data communicate over the Internet, or select not to have a direct Internet connection.

In an embodiment where a pager 326 selects not to have a direct Internet connection, a pager 326 can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A pager 326 can data communicate over the Internet by way of either the Internet appliance 322B data connection or by way of a more direct connection to the Internet 362. A more direct connection to the Internet can be by way of an ISP, a TCP/IP connection, a PPP or SOCKET layer connection, a RAS connection, or by utilizing wireless pager standards and protocols, or wireless Internet standards and protocols, or other Internet connection points or connection types.

The interconnections between a pager 326 and the Internet appliance 322B, and between a pager 326 and the Internet 362 are mutually exclusive. In a plurality of exemplary embodiments, correct operation of a pager 326 can utilize one of the interconnections to the Internet, both of the interconnections to the Internet, or neither interconnection to the Internet.

A PDA 324 can be interconnected with the Internet 362. Alternatively, a PDA 324 can be interconnected with an Internet appliance 322B. The Internet appliance 322B can in turn be interconnected with the Internet 362. In both embodiments the pager 326 can data communicate over the Internet to a plurality of COM device 100, a plurality of in-vehicle device 200, a plurality of Internet based servers, a plurality of Internet appliances, or a plurality of other Internet based data processing resources.

Depending on the particular embodiment and user preferences the PDA 324 can selectively choose a single method to data communicate over the Internet 362, utilize a plurality of methods to data communicate over the Internet, or select not to have a direct Internet connection.

In an embodiment where a PDA 324 selects not to have a direct Internet connection, a PDA 324 can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A PDA 324 can data communicate over the Internet by way of either the Internet appliance 322B data connection or by way of a more direct connection to the Internet 362. A more direct connection to the Internet can be by way of an ISP, a TCP/IP connection, a PPP or SOCKET layer connection, a RAS connection, or by utilizing wireless PDA standards and protocols, or wireless Internet standards and protocols, or other Internet connection points or connection types.

The interconnections between a PDA 324 and the Internet appliance 322B, and between a PDA 324 and the Internet 362 are mutually exclusive. In a plurality of exemplary embodiments, correct operation of a PDA 324 can utilize one of the interconnections to the Internet, both of the interconnections to the Internet, or neither interconnection to the Internet.

A wireless phone 312 can be interconnected with the Internet 362. Alternatively, a wireless phone 312 can be interconnected with an Internet appliance 322B. The Internet appliance 322B can in turn be interconnected with the Internet 362. In both embodiments the wireless phone 312 can data communicate over the Internet to a plurality of COM device 100, a plurality of in-vehicle device 200, a plurality of Internet based servers, a plurality of Internet appliances, or a plurality of other Internet based data processing resources.

Depending on the particular embodiment and user preferences the wireless phone 312 can selectively choose a single method to data communicate over the Internet 362, utilize a plurality of methods to data communicate over the Internet, or select not to have a direct Internet connection.

In an embodiment where a wireless phone 312 selects not to have a direct Internet connection, a wireless phone 312 can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A wireless phone 312 can data communicate over the Internet by way of either the Internet appliance 322B data connection or by way of a more direct connection to the Internet 362. A more direct connection to the Internet can be by way of an ISP, a TCP/IP connection, a PPP or SOCKET layer connection, a RAS connection, or by utilizing wireless phone standards and protocols, or a wireless Internet standards and protocols, or other Internet connection points or connection types.

The interconnections between a wireless phone 312 and the Internet appliance 322B, and between a wireless phone 312 and the Internet 362 are mutually exclusive. In a plurality of exemplary embodiments, correct operation of a wireless phone 312 can utilize one of the interconnections to the Internet, both of the interconnections to the Internet, or neither interconnection to the Internet.

A wireless phone 312 can be interconnected with the Internet 362. Alternatively, a wireless phone 312 can be interconnected with an Internet appliance 322B. The Internet appliance 322B can in turn be interconnected with the Internet 362. In both embodiments the wireless phone 312 can data communicate over the Internet to a plurality of COM device 100, a plurality of in-vehicle device 200, a plurality of Internet based servers, a plurality of Internet appliances, or a plurality of other Internet based data processing resources.

Depending on the particular embodiment and user preferences the wireless phone 312 can selectively choose a single method to data communicate over the Internet 362, utilize a plurality of methods to data communicate over the Internet, or select not to have a direct Internet connection.

In an embodiment where a wireless phone 312 selects not to have a direct Internet connection, a wireless phone 312 can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A wireless phone 312 can data communicate over the Internet by way of either the Internet appliance 322B data connection or by way of a more direct connection to the Internet 362. A more direct connection to the Internet can be by way of an ISP, a TCP/IP connection, a PPP or SOCKET layer connection, a RAS connection, or by utilizing wireless phone standards and protocols, or wireless Internet standards and protocols, or other Internet connection points or connection types.

The interconnections between a wireless phone 312 and the Internet appliance 322B, and between a wireless phone 312 and the Internet 362 are mutually exclusive. In a plurality of exemplary embodiments, correct operation of a wireless phone 312 can utilize one of the interconnections to the Internet, both of the interconnections to the Internet, or neither interconnection to the Internet.

COM device 100E can also be interconnected with the Internet 362, and with an Internet appliance 322B. A COM device 100E can data communicate over the Internet by way of an Internet appliance 322B.

A COM device 100E and an in-vehicle device 200 can data communicate by way of a plurality of wired or wireless data communication means. A plurality of wired or wireless data communication means can include a carrier current interface, a wireless transceiver, a network connection, modem or wireless modem, cellular phone interface, wireless data link, LAN interface, or other wired or wireless communication means.

Depending on the particular embodiment and user preferences a COM device 100E can selectively choose a single method to data communicate over the Internet 362, utilize a plurality of methods to data communicate over the Internet, or select to not have a direct Internet connection.

In an embodiment where a COM device 100E selects not to have a direct Internet connection, a COM device 100E can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100E can data communicate over the Internet by way of either the Internet appliance 322B data connection or by way of a more direct connection to the Internet 362. A more direct connection to the Internet can be by way of ISP, a TCP/IP connection, a PPP or SOCKET layer connection, a RAS connection, by utilizing a wireless Internet standards and protocols, or other Internet connection points or connection types.

The interconnections between a COM device 100E and the Internet appliance 322B, and between a COM device 100E and the Internet 362 are mutually exclusive. In a plurality of exemplary embodiments, correct operation of a COM device 100E can utilize one of the interconnections to the Internet, both of the interconnections to the Internet, or neither interconnection to the Internet.

An in-vehicle device 200 can data communicate over the Internet by way of an Internet appliance 322B. Depending on the particular embodiment and user preferences an in-vehicle device 200 can selectively choose a single method to data communicate over the Internet 362, utilize a plurality of methods to data communicate over the Internet, or select to not have a direct Internet connection.

In an embodiment where an in-vehicle device 200 selects not to have a direct Internet connection, an in-vehicle device 200 can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

An in-vehicle device 200 can data communicate over the Internet by way of either the Internet appliance 322B data connection or by way of a more direct connection to the Internet 362. A more direct connection to the Internet can be by way of ISP, a TCP/IP connection, a PPP or SOCKET layer connection, a RAS connection, by utilizing a wireless Internet standards and protocols, or other Internet connection points or connection types.

The interconnections between an in-vehicle device 200 and the Internet appliance 322B, and between an in-vehicle device 200 and the Internet 362 are mutually exclusive. In a plurality of exemplary embodiments, correct operation of a COM device 100E can utilize one of the interconnections to the Internet, both of the interconnections to the Internet, or neither interconnection to the Internet.

Referring to FIG. 2B there is shown a data communication network connection between a plurality of data communicating devices and the Internet. Interconnected with a parking gate 316 is a COM device 100F. A COM device 100F can be a specific embodiment of a COM device 100. A COM device 100F can be interconnected with the Internet 362. A COM device 100F can also be interconnected with an Internet appliance 322C, which in turn the Internet appliance 322C can be interconnected with the Internet 362. COM device 100F can data communicate over the Internet by way of Internet appliance 322C. An Internet appliance 322C can be a specific embodiment of an Internet appliance 322.

Depending on the particular embodiment and user preferences the parking gate 316 with a COM device 100F combination can selectively choose a single method to data communicate over the Internet 362, utilize a plurality of methods to data communicate over the Internet, or select to not have a direct Internet connection.

In an embodiment where a COM device 100F selects not to have a direct Internet connection, a COM device 100F can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100F can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100F and the Internet appliance 322C, and between a COM device 100F and the Internet 362 are mutually exclusive. In a plurality of exemplary embodiments, correct operation of a COM device 100F can utilize one of the interconnections to the Internet, both of the interconnections to the Internet, or neither interconnection to the Internet.

Interconnected with a parking terminal 352 is a COM device 100G. A COM device 100G can be a specific embodiment of a COM device 100. A COM device 100G can be interconnected with the Internet 362. A COM device 100G can also be interconnected with an Internet appliance 322C, which in turn the Internet appliance 322C can be interconnected with the Internet 362. COM device 100G can data communicate over the Internet by way of an Internet appliance 322C.

Depending on the particular embodiment and user preferences the parking terminal 352 with a COM device 100G combination can selectively choose a single method to data communicate over the Internet 362, utilize a plurality of methods to data communicate over the Internet, or select to not have a direct Internet connection.

In an embodiment where a COM device 100G selects not to have a direct Internet connection, a COM device 100G can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100G can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100G and the Internet appliance 322C, and between a COM device 100G and the Internet 362 are mutually exclusive. In a plurality of exemplary embodiments, correct operation of a COM device 100G can utilize one of the interconnections to the Internet, both of the interconnections to the Internet, or neither interconnection to the Internet.

Interconnected with a traffic light 350 is a COM device 100I. A COM device 100I can be a specific embodiment of a COM device 100. A COM device 100I can be interconnected with the Internet 362. A COM device 100I can also be interconnected with an Internet appliance 322C, which in turn the Internet appliance 322C can be interconnected with the Internet 362. COM device 100I can data communicate over the Internet by way of an Internet appliance 322C.

Depending on the particular embodiment and user preferences the traffic light 350 with COM device 100I combination can selectively choose a single method to data communicate over the Internet 362, utilize a plurality of methods to data communicate over the Internet, or select to not have a direct Internet connection.

In an embodiment where a COM device 100I selects not to have a direct Internet connection, a COM device 100I can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100I can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100I and the Internet appliance 322C, and between a COM device 100I and the Internet 362 are mutually exclusive. In a plurality of exemplary embodiments, correct operation of a COM device 100I can utilize one of the interconnections to the Internet, both of the interconnections to the Internet, or neither interconnection to the Internet.

A COM device 100H is mounted on a traffic light pole 360. A COM device 100H can be interconnected with a traffic light 350 or an emergency warning system (not shown). Furthermore, a COM device 100H can also be interconnected with the Internet 362 or interconnected with an Internet appliance 322C. In turn, the Internet appliance 322C can be interconnected with the Internet 362. A COM device 100H can data communicate over the Internet by way of an Internet appliance 322C. A COM device 100H can be a specific embodiment of a COM device 100.

In an exemplary embodiment a traffic light warning system can be optically responsive to oncoming emergency vehicles. An emergency warning system typically interfaces with the traffic light control system, such that when an emergency vehicle approaches the traffic light the warning system can by way of the traffic light control system activate the appropriate traffic lights to allow safe passage of the emergency vehicle through the intersection.

Interconnected with a wireless toll-pass system 308 is a COM device 100J. A COM device 100J can be a specific embodiment of a COM device 100. A COM device 100J can be interconnected with the Internet 362. A COM device 100J can also be interconnected with an Internet appliance 322C, which in turn the Internet appliance 322C can be interconnected with the Internet 362. A COM device 100J can data communicate over the Internet by way of an Internet appliance 322C.

Depending on the particular embodiment and user preferences the wireless toll-pass system 308 with COM device 100J combination can selectively choose a single method to data communicate over the Internet 362, utilize a plurality of methods to data communicate over the Internet, or select to not have a direct Internet connection.

In an embodiment where a COM device 100J selects not to have a direct Internet connection, a COM device 100J can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100J can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing a wireless Internet standards and protocols, or other Internet connection points or connection types.

The interconnections between a COM device 100J and the Internet appliance 322C, and between a COM device 100J and the Internet 362 are mutually exclusive. In a plurality of exemplary embodiments, correct operation of a COM device 100J can utilize one of the interconnections to the Internet, both of the interconnections to the Internet, or neither interconnection to the Internet.

Interconnected with a vehicle analyzer 328 is a COM device 100K. A COM device 100K can be a specific embodiment of a COM device 100. A COM device 100K can be interconnected with the Internet 362. A COM device 100K can also be interconnected with an Internet appliance 322C, which in turn the Internet appliance 322C can be interconnected with the Internet 362. COM device 100K can data communicate over the Internet by way of Internet appliance 322C.

Depending on the particular embodiment and user preferences the vehicle analyzer 328 with COM device 100K combination can selectively choose a single method to data communicate over the Internet 362, utilize a plurality of methods to data communicate over the Internet, or select to not have a direct Internet connection.

In an embodiment where a COM device 100K selects not to have a direct Internet connection, a COM device 100K can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100K can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100K and the Internet appliance 322C, and between a COM device 100K and the Internet 362 are mutually exclusive. In a plurality of exemplary embodiments, correct operation of a COM device 100K can utilize one of the interconnections to the Internet, both of the interconnections to the Internet, or neither interconnection to the Internet.

Interconnected with a change tollbooth 330 is a COM device 100L. A COM device 100L can be a specific embodiment of a COM device 100. A COM device 100L can be interconnected with the Internet 362. A COM device 100L can also be interconnected with an Internet appliance 322C, which in turn the Internet appliance 322C can be interconnected with the Internet 362. A COM device 100L can data communicate over the Internet by way of Internet appliance 322C.

Depending on the particular embodiment and user preferences the change tollbooth 330 with COM device 100L combination can selectively choose a single method to data communicate over the Internet 362, utilize a plurality of methods to data communicate over the Internet, or select to not have a direct Internet connection.

In an embodiment where a COM device 100L selects not to have a direct Internet connection, a COM device 100L can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100L can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100L and the Internet appliance 322C, and between a COM device 100L and the Internet 362 are mutually exclusive. In a plurality of exemplary embodiments, correct operation of a COM device 100L can utilize one of the interconnections to the Internet, both of the interconnections to the Internet, or neither interconnection to the Internet.

Interconnected with a COM device 100M can be a PC 310A. Interconnected with a PC 310A can be a monitor 344, and a keyboard 348. A COM device 100M can be a specific embodiment of a COM device 100. A PC 310A can be a specific embodiment of a PC 310. A COM device 100M or a PC 310A can also be interconnected with an Internet appliance 322C, which in turn the Internet appliance 322C can be interconnected with the Internet 362. A COM device 100M or a PC 310A can data communicate over the Internet by way of an Internet appliance 322C.

In an exemplary embodiment a COM device 100M can be interconnected with a PC 310 and located in a store 320. A store 320 can be any store, garage, service center, vehicle dealership, repair center, or other place of business. A COM device 100M can then data communicate wirelessly with an in-vehicle device 200 (not shown). Such data communication can be telemetry information, vehicle metrics, or other data to facilitate vehicle service.

Depending on the particular embodiment and user preferences the COM device 100M or a PC 310A can selectively choose a single method to data communicate over the Internet 362, utilize a plurality of methods to data communicate over the Internet, or select to not have a direct Internet connection.

In an embodiment where a COM device 100M or a PC 310A selects not to have a direct Internet connection, a COM device 100M or a PC 310A can interface with a second data communicating device to gain access to the Internet. Data communication to a second device can be by way of a carrier current interface, a wireless transceiver, a network connection, modem or wireless modem, cellular phone interface, wireless data link, LAN interface, or other wired or wireless communication means.

A COM device 100L can data communicate over the Internet by way of either the Internet appliance 322C data connection or by way of a more direct connection to the Internet 362. A more direct connection to the Internet can be by way of ISP, a TCP/IP connection, a PPP or SOCKET layer connection, a RAS connection, by utilizing wireless Internet standards and protocols, or other Internet connection points or connection types.

The interconnections between a COM device 100M or a PC 310A and the Internet appliance 322C, and between a COM device 100M or a PC 310A and the Internet 362 are mutually exclusive. In a plurality of exemplary embodiments, correct operation of a COM device 100M or a PC 310A can utilize one of the interconnections to the Internet, both of the interconnections to the Internet, or neither interconnection to the Internet.

Referring to FIG. 2C there is shown a data communication network connection between a plurality of data communicating devices and the Internet. The Internet can also be referred to as a global network. In particular FIG. 2C shows a plurality of exemplary embodiments of a system by which a plurality of COM device 100, a plurality of in-vehicle device 200, and a plurality of Internet based data processing resources can data communicate with one another.

A PC 310B can be interconnected with a COM device 100P or with the Internet 362. A COM device 100P can be a specific embodiment of a COM device 100. A PC 310B can be a specific embodiment of a PC 310. Furthermore, the COM device 100P can be interconnected with a COM device 100Q. A COM device 100Q can be a specific embodiment of a COM device 100.

In an exemplary embodiment a PC 310 can data communicate over the Internet 362. In addition, a COM device 100P can data communicate with a PC 310B and a plurality of COM device 100Q. In this embodiment a remote COM device 100Q can forward, relay, or otherwise effectuate data communications with a COM device 100P.

Applications can include a service center with several garage work areas. In this application a plurality of COM device 100Q can data communicate with a COM device 100P data communicating vehicle telemetry, vehicle metrics, and other data to a COM device 100P or to a PC 310B for processing.

Interconnected with a PC 310C can be COM device 100R. A COM device 100R can be a specific embodiment of a COM device 100. A PC 310C can be a specific embodiment of a PC 310. A COM device 100R can be interconnected with a hub or concentrator 338A. A hub or concentrator 338A can be a specific embodiment of a hub or concentrator 338. Furthermore, a hub or concentrator 338A can be interconnected with a router or gateway 340. A router or gateway 340 can be interconnected with the Internet 362. A hub or concentrator 338 can be CISCO, or other similar brands or types of hubs or concentrators. A router or gateway 340 can be CISCO, WHISTLE JET, or other similar brands or types of router or gateway.

In an exemplary embodiment a PC 310C and COM device 100R can data communicate by way of the hub or concentrator 338A and the router or gateway 340 over the Internet 362. Applications include a COM device 100R serving as a modem, data link, or other data connection device for a PC 310C, such that both a PC 310C and a COM device 100R can data communicate over the Internet.

Interconnected with a COM device 100N can be a hub or concentrator 338B. A hub or concentrator 338B can be a specific embodiment of a hub or concentrator 338. A COM device 100N can be a specific embodiment of a COM device 100. A hub or concentrator 338B can be interconnected with a PC 310D. A PC 310D can be a specific embodiment of a PC 310. Furthermore, a PC 310D can be interconnected with the Internet 362.

In an exemplary embodiment a COM device 100N can data communicate with a PC 310D by way of the hub or concentrator 338B. Such data communication can be consistent with network protocol standards common to MICROSOFT NT, LINUX, UNIX, or NOVELL NETWARE applications and network architecture as well as other similar network applications and network architectures. In addition, a COM device 100N can data communicate over the Internet by way of the data connection to the PC 310D. Applications can include COM device 100N utilizing the PC 310D remote communication means to data communicate over the Internet 362. Remote communication means can include RAS, modem, LAN, and other wired and wireless remote communication means.

Interconnected with a COM device 100S can be the Internet 362. In an exemplary embodiment a COM device I 00S can data communicate, access, or be accessed over the Internet by a plurality of COM device 100, a plurality of in-vehicle device 200, a plurality of Internet based servers, a plurality of Internet appliances, or a plurality of other Internet based data processing resources.

Interconnected with an emergency monitoring network 332 can be the Internet 362. In an exemplary embodiment an emergency monitoring network 332 can data communicate to, access, or be accessed over the Internet by a plurality of COM device 100, a plurality of in-vehicle device 200, a plurality of Internet based servers, a plurality of Internet appliances, or a plurality of other Internet based data processing resources. Access to the emergency monitoring network 332 can include Internet, RAS, modem access, and other network access technologies. An emergency access network can be the national emergency agency 911 network, police networks, fire networks, medical networks, security networks, remote monitoring networks, surveillance networks, and other similar emergency access networks.

Applications can include a plurality of COM device 100, a plurality of in-vehicle device 200, a plurality of Internet based servers, a plurality of Internet appliances, or a plurality of other Internet based data processing resources data communicating with an emergency monitoring network 332. Such data communication can be for the purpose of reporting, locating, or remotely disabling operation of a vehicle, notifying or requesting emergency service resultant from break in, theft, fire, or other emergency monitoring network data communications.

Interconnected with a virtual private network 334 can be the Internet 362. In an exemplary embodiment a virtual private network 334 can data communicate to, access, or be accessed over the Internet by a plurality of COM device 100, a plurality of in-vehicle device 200, a plurality of Internet based servers, a plurality of Internet appliances, or a plurality of other Internet based data processing resources. Access to the virtual private network 334 can include Internet, RAS, modem access, and other network access technologies.

Interconnected with a personal PC network 336 can be the Internet 362. In an exemplary embodiment a personal PC network 336 can data communicate to, access, or be accessed over the Internet by a plurality of COM device 100, a plurality of in-vehicle device 200, a plurality of Internet based servers, a plurality of Internet appliances, or a plurality of other Internet based data processing resources. Access to the personal PC network 336 can include Internet, RAS, modem access, and other network access technologies.

Interconnected with an Internet appliance 322D is the Internet 362. An Internet appliance 322D can be a specific embodiment of an Internet appliance 322.

Interconnected with an Internet based server 364 can be the Internet 362 and a database 356A. A database 356A can be a specific embodiment of a database 356. In an exemplary embodiment a database 356A can be accessed by way of a plurality of COM device 100, a plurality of in-vehicle device 200, a plurality of Internet based servers, a plurality of Internet appliances, or a plurality of other Internet based data processing resources. In addition, a database 356A can be accessible by way of an application, application server, a user, or a web browser. A web browser can be MICROSOFTS INTERNET EXPLORER, NETSCAPE, NEUTRINO, PALM OS, WINDOWS CE, or other similar web browser technology. A database 356 can be based on MICROSOFT MSACCESS, SQL, DB2, ORACLE, or other similar database architectures. An Internet based server 364 can be a MICROSOFT NT, LINUX, APACHE, WHISTLE, NOVELL, UNIX, NEUTRINO, PALM OS, WINDOWS CE, WINDOWS 95–98, WINDOWS 2000 or other similar Internet capable server platform. Furthermore, an Internet based server 364 can be a mail server, database server, file transfer protocol (ftp) server, web server, transaction processing server, e-business server, e-commerce server, or other specialized server. An Internet based server 364 can be configured as an application server 358.

Interconnected with an Internet application server 358 can be the Internet 362 and a database 356B. A database 356B can be a specific embodiment of a database 356. In an exemplary embodiment an Internet application server 358 or a database 356B can be accessed by way of a plurality of COM device 100, a plurality of in-vehicle device 200, a plurality of Internet based servers, a plurality of Internet appliances, or a plurality of other Internet based data processing resources. In addition, a database 356B can be accessible by way of an Internet application server 358, a local or remote application, a user, or a web browser.

In an exemplary embodiment an Internet application server 358 can be utilized to search for car parts in a database, or can process and maintain warranty information, or can process and store vehicle telemetry and vehicle metrics data. In addition, an Internet application server 358 can run a plurality of specific software applications and can data communicate with a plurality of COM device 100, or a plurality of in-vehicle device 200.

Referring to FIG. 3 there is shown a communication interface device 100. A communication interface device 100 can be referred to as a COM device 100. A COM device 100 can be a device capable of data communicating wired or wirelessly with an in-vehicle device 200.

Interconnected with a microcontroller 130 can be a keypad 102. A keypad 102 can be an array of buttons. A keypad 102 utilizing an array of buttons can be implemented with a plurality of OMRON B3F-1100 push buttons, which can be organized in an array, or other functionally similar array of buttons. A microcontroller can be a ZILOG brand Z8, Z380C, or Z382 microcontroller, or a MOTOROLA brand HC series microcontroller. In addition, a microcontroller 130 can be an INTEL brand x86, CELERON, or PENTIUM microprocessor, or AMD brand microprocessor, or other similar microcontroller or microprocessor.

Interconnected with a microcontroller 130 can be an electrically erasable read only memory ("EEROM") 104. Such an EEROM 104 can be a MICROCHIP 27C512, an ATMEL FLASH AT27512, or other similar electrical erasable read only memory. A one-time-programmable (OPT) read-only-memory (ROM) can be utilized to implement EEROM 104.

Interconnected with a microcontroller 130 can be a non-volatile memory 106. Such a non-volatile memory 106 can be a DALLAS SEMICONDUCTOR DS1643 or DS1743. Furthermore, the DS1643 or DS1743 can provide a non-volatile date and time function whereby microcontroller 130 can be responsive to or schedule events based on date and time, or date and time stamp transactions as they occur.

Interconnected with a microcontroller 130 can be an electrically erasable read only memory ("EEROM") 104. Such an EEROM 104 can be a MICROCHIP 93LC66, or ATMEL DATAFLASH serial EEROM.

Interconnected with a microcontroller 130 can be a magnetic card or smart card reader/writer 110. A magnetic card reader/writer 110 can be implemented with a NEURON brand MSR-100, or MSR-270, or a MAGNA TEC brand magnetic card or smart card reader/writer, or other similar track 1, 2 or 3 style magnetic card reader/writer or smart card reader/writer.

Interconnected with a microcontroller 130 can be a touch screen 112. A touch screen 112 can be implemented with a TRANSPARENT PRODUCTS, INC. part number TPI PN 1059-001, and a BURR BROWN touch screen controller part number ADS7843.

Interconnected with microcontroller 130 can be a liquid crystal display (LCD) 114. An LCD display 114 can be implemented by way of an OPTREX #DMF-5002NY-EB super-twist graphics module, or an OPTREX #DMC-6204NY-LY liquid crystal display, or an OPTREX #DMF-50944NCU-FW-1 and an EPSON SED1354FOA LCD controller.

Interconnected with a microcontroller 130 can be an RS232/RS485 interface 116. An RS232/RS485 interface 116 can be implemented by way of a MAXIM brand RS232 or RS485 transceiver series semiconductor. RS232 serial communications can be effectuated with a receive (RXD) data connection, transmit (TXD) data connection, clear to send data connection, ready to send (RTS) data connection, signal ground (GND) data connection. RS485 data communication can be effectuated with a pair of data connections (DATA "A" data connection and DATA "B" data connection).

Interconnected with a microcontroller 130 can be a general-purpose input and output interface 118. A general-purpose input and output interface 118 can be utilized to interface a COM device 100 to a plurality of external devices. Such external devices can include a garage door opener 302, a gas pump 304, a tollbooth 306, a wireless toll-pass system 308, a traffic light 350, a change tollbooth 330, a parking gate 316, a parking terminal 352, a vehicle analyzer 328, or a proximity sensing parking light 354.

In an exemplary embodiment a general-purpose input and output interface 118 can be tailored and effectuated in a plurality of ways based in part on the particular application. For example and without limitation, a general-purpose input and output interface 118 can be implemented with a plurality of relays, or a plurality of transistor-to-transistor-logic (TTL) inputs and outputs (I/O). A general-purpose input and output interface 118 can also be implemented with a plurality of opto-isolators, or a plurality of silicon controlled rectifiers (SCR), or a plurality of triacs, or a plurality of transistor drivers.

A general-purpose input and output interface 118 can be implemented with OMRON series G5V-1-DC5 or an OMRON series G3B-1174P-US-DC5 (for higher current loads), or other similar type of switches or relays. A general-purpose input and output interface 118 can also be implemented with a HARRIS 82C55 peripheral interface, ZILOG, INTEL, AMD, MICROCHIP or MOTOROLA brand microcontroller or microprocessor, a MOTOROLA 74LS series TTL I/O semiconductors, an ALEGRO MICROSYSTEMS UCN5801EP, or UDN2595A, or other similar line I/O and receiver/drivers. A general-purpose input and output interface 118 can also be implemented with a TECCOR ELECTRONICS INC series SCR or triac, or a QUALITY TECH part number MID400QT or triac output opto-isolator part number MOC3010QT, or a NEC brand or PANASONIC brand opto-isolator, or other similar types of opto-isolators. Furthermore, a general-purpose input and output interface 118 can also be implemented with TEXAS INSTRUMENT brand transistors such as the 2N4401, or the 2N4403, or the TIP 120, or other similar types of transistors.

Interconnected with a microcontroller 130 can be a personal data interface (PDA) interface 120. A PDA interface 120 can be implemented with an infrared communication means or a wired interface. An infrared communications means can be implemented with an infrared remote control receiver module, such as a LITEON LT1033, and an infrared light emitting diode (LED) for transmitting data, such as a LITEON LT1062 LED. A wired PDA interface 120 can be implemented with the 3COM PALM PILOT interface cable, or other PDA brand interface cables. In addition, a wireless PDA interface 120 can be implemented utilizing wireless standards such as wireless application protocol (WAP), BLUE TOOTH, or other wireless standards and protocols.

In an exemplary embodiment a COM device 100 can data communicate with a PDA by way of the PDA interface 120. In such an embodiment the PDA can exchange data and gain access to the Internet by way of the COM device 100. In addition, the PDA can receive data related to vehicle telemetry, metrics, and other informational data.

Interconnected with a microcontroller 130 can be a speech and sound audio playback means 124. In an exemplary embodiment a speech and sound audio playback means 124 can playback digitized and streamed audio data. In such an embodiment a data communication by way of the Internet can be played by the speech and sound audio playback means 124. In addition, pre-recorded audio data can be played by way of the speech and sound audio playback means 124. Such pre-recorded audio data can be ADPCM format, MP3 format, or other proprietary or standard data format. Furthermore, pre-recorded audio data can include instructional prompts and sounds, as well as warning prompts and other sounds. A speech and sound audio playback means 124 can be implemented with an OKI SEMICONDUCTOR MSM9841 or a OKI SEMICONDUCTOR MSM6585RS, or other similar speech or audio processors.

Interconnected with a speech and sound audio playback means 124 can be an amplifier and a filter network 126. An amplifier and a filter network 126 can be implemented with a SANYO LA4460N amplifier or TEXAS INSTRUMENTS amplifier. A filter network 126 can be implemented with a NATIONAL LM324 quad op-amp, or TEXAS INSTRUMENTS series DSP, or with a single pole resistor and capacitor combination. A speech and sound audio playback means 124 can also be implemented with other similar amplifiers and filter networks.

Interconnected with a speech and sound audio playback means 124 can be a speaker 128. A speaker 128 can be implement with a variety of general-purpose speakers. Selection of a suitable speaker can be based in part on speaker size, shape, tonal qualities, as well as other design and application specification criteria.

Interconnected with a microcontroller 130 can be a carrier current interface 132. Carrier current interface 130 can be effectuated with traditional carrier current technologies, including spread spectrum technologies. Such a carrier current interface 132 can be implemented as desired and known by one skilled in the art of carrier current data communications.

In an exemplary embodiment a carrier current interface 132 can effectuate data communication with a PC 310. In this embodiment a COM device 100 by way of the carrier current interface 132 can data communication to a plurality of other COM device 100, or to a plurality of in-vehicle device 200, or to a plurality of Internet based servers, or to a plurality of Internet appliances, or to a plurality of other Internet based data processing resources.

Interconnected with a microcontroller 130 can be a wireless transceiver 134. In an exemplary embodiment a wireless transceiver 134 can be utilized to data communicate between a COM device 100 and an in-vehicle device 200. Such data communication can include vehicle telemetry, vehicle metrics, COM device 100 data, in-vehicle device 200 data, audio or video data, e-business data, e-mail data, e-commerce data, Internet based data, PC 310 data, as well as other general and specific data. A wireless transceiver 134 can be implemented with a BYTEL, DIGITAL WIRELESS CORPORATION, GLOBAL WAVE, FREEWAVE TECHNOLOGIES, ELECTRONIC SYSTEMS TECHNOLOGIES, GRE, IBM, MOTOROLA, or other similar manufacturer of wireless transceiver products. A wireless transceiver 134 can also be implemented by terminating a wireless transceiver 134 interface as a PCMCIA interface. A PCMCIA compatible wireless device can then be electrically connected and utilized to effectuate wireless communications on any wireless technology, network, or system. A wireless transceiver 134 can be BLUE TOOTH compliant, wireless application protocol (WAP) compliant, or subscribe to other standard and proprietary wireless protocols or standards.

Interconnected with a microcontroller 130 can be a network connection to the Internet 136. In an exemplary embodiment a network connection to the Internet 136 can connect a COM device 100 to the Internet. A network connection to the Internet 136 can manage the TCP/IP stack if required and can implement a data security layer, SSL security socket, or other proxy, firewall, or encrypted security. In addition, the network connection to the Internet 136 can manage an encrypted packet protocol, or other network protocols.

In addition, a network connection to the Internet 136 can include a plurality of network and telecommunication interfaces including analog telephone line, T1, ADSL, DSL, ISDN, cable modem, satellite, or LAN interfaces including Ethernet, token ring, FIREWIRE, and other similar telecommunication and network interface technologies.

Interconnected with a microcontroller 130 can be a modem 138. A modem 138 can be a wireless modem. In an exemplary embodiment a modem 138 can be utilized to data communicate with a remote location. Such a remote location can be an emergency monitoring network 332, or a PC 310, or other remote location. A modem 138 can be implemented with a XECOM brand modem part number XE2400, or XE9600, CERMETEK, ROCKWELL, ZILOG or other similar types of modem. A wireless modem can be implemented with an IBM, MOTOROLA, TELETRONICS, TELEDESIGN SYSTEMS or other similar types of wireless modem. A modem 138 can also be a PCMCIA interface connector. In this embodiment a PCMCIA interface connector can allow a wide variety of off-the-shelf brand of wireless modem to interconnect and operate with an in-vehicle device 200.

Interconnected with a microcontroller 130 can be a cellular phone transceiver 140. In an exemplary embodiment a cellular phone transceiver 140 can be utilized to effectuate data communications between a COM device 100 and a cellular network. A cellular phone transceiver 140 can be implemented with an IBM, GLOBAL WAVE, NOVATEL WIRELESS, MOTOROLA, or other similar cellular phone transceiver.

Interconnected with a microcontroller 130 can be a cellular phone interface 142. In an exemplary embodiment a cellular phone interface 142 can be utilized to interface a cellular phone to a COM device 100. In this embodiment a cellular phone interface 142 can enable a COM device 100 to utilize cellular phone functionality including, processing voice and data signals, or data communicate by way of a cellular network.

Interconnected with a microcontroller 130 can be a wireless data link 144. An infrared communications means can be a wireless data link 144, and can be implemented with an infrared remote control receiver module, such as a LITEON LT1033, and an infrared light emitting diode (LED) for transmitting data, such as a LITEON LT1062 LED. A radio frequency (RF) transceiver can be a wireless data link 144 and can be implemented with an IBM, MOTOROLA, RESEARCH IN MOTION, MICROTEQ, or other similar RF transceiver technologies. A satellite receiver can be a wireless data link 144. Such a satellite receiver can be implemented with standards, protocols, service, communication equipment, or other technologies available from XM SATELLITE RADIO HOLDINGS, or SIRIUS SATELLITE RADIO, or other similar satellite technology companies.

Interconnected with a microcontroller 130 can be a local area network (LAN) interface 146. In an exemplary embodiment a LAN interface 146 can include Ethernet, token ring, FIREWIRE, and other standard networking interfaces. In addition, a LAN interface 146 can be utilized to effectuate data communication directly with a PC 310, or by way of a hub or concentrator 338 to a PC 310 or a router or gateway 340. A LAN 146 can effectuate COM device 100 data communication over the Internet to a plurality of COM device 100, or to a plurality of in-vehicle device 200, or to a plurality of Internet based servers, or to a plurality of Internet appliances, or to a plurality of other Internet based data processing resources.

Interconnected with a microcontroller 130 can be a digital signal processor (DSP) 154. A DSP 154 can be a TEXAS INSTRUMENTS, or other similar DSP technology.

Interconnected with a video signal input and conditioner 150 can be a DSP 154, or a video signal input and conditioner 150. A camera 148 can be interconnected with a video signal input and conditioner 150. Additionally, a DSP 154 can be interconnected with a microphone 152.

In an exemplary embodiment a DSP 154 in combination with a camera 148, or a video signal input and conditioner 150, and a microphone 152 can be utilized to digitize audio and video signals. Once digitized these signals can be data communicated by way of a COM device 100. Data communication can include data communication over the Internet to a plurality of COM device 100, or to a plurality of in-vehicle device 200, or to a plurality of Internet based servers, to a plurality of Internet appliances, or to a plurality of other Internet based data processing resources. In addition, digitized audio can be utilized to effectuate voice activation of COM device 100.

Referring to FIG. 4 there is shown an in-vehicle device 200. In-vehicle device 200 can be a device embodied in a vehicle. An in-vehicle device 200 can also be embodied in a vehicle battery, vehicle control system, vehicle alarm system, or an in-vehicle device 200 can be embodied in a separate enclosure and fastened to, or retrofitted to a vehicle. In an exemplary embodiment an in-vehicle device 200 can be located in a secure area within the vehicle. Such a secure area can include under the vehicle's hood, or in the vehicle's trunk.

Interconnected with a microcontroller 234 can be a keypad 202. A microcontroller 234 can be similar in manufacture, specification, or general electrical functionality to a microcontroller 130. A keypad 202 can be similar in manufacture, specification, or general electrical functionality to a keypad 102.

Interconnected with a microcontroller 234 can be an EEROM 204. An EEROM 204 can be similar in manufacture, specification, and general electrical functionality to an EEROM 104. Interconnected with a microcontroller 234 can be non-volatile memory 206. A non-volatile memory 206 can be similar in manufacture, specification, and general electrical functionality to a non-volatile memory 106.

Interconnected with a microcontroller 234 can be a serial EEROM 208. A serial EEROM 208 can be similar in manufacture, specification, and general electrical functionality to a serial EEROM 108. In an exemplary embodiment a serial EEROM 208 can be utilized as a high-density data storage area. Such a high-density data storage area can be utilized for storage of digital audio data, video data, text data, display data, telemetry data, metric data, or other types of data.

Interconnected with a microcontroller 234 can be non-volatile memory 206. A non-volatile memory 206 can be similar in manufacture, specification, and general electrical functionality to a non-volatile memory 106.

Interconnected with a microcontroller 234 can be a vehicle engine control system interface 210. The vehicle engine control system interface 210 can include interconnections to a vehicle communication bus. Such a vehicle communication bus can carry data communication to a plurality of systems and devices within the vehicle. Vehicle bus protocols and standard can include proprietary protocols and standards, or conform and support standard vehicle bus protocols and standards. Standard vehicle bus protocols and standards can include CONTROL AREA NETWORK (CAN), LOCAL INTERCONNECT NETWORK (LIN), J1850, INTELLIGENT TRANSPORTATION SYSTEM DATA BUS (IDB), and IDB-MULTIMEDIA protocols and standards.

In an exemplary embodiment a vehicle engine control system interface 210 can interface and data communicate with a vehicle engine control system such that engine telemetry, metrics, efficiency, settings, or other vehicle and engine data can be data communicated for processing. Data communication for processing can include data communicating over the Internet, or to a plurality of COM device 100, or to a plurality of in-vehicle device 200, or to a plurality of Internet based servers, or to a plurality of Internet appliances, or to a plurality of other Internet based data processing resources.

In such an embodiment data communication between a vehicle engine control system interface 210 and a vehicle engine control system can effectuate remote diagnostics, repairs, adjustment to the engine control system, as well as other vehicle maintenance, monitoring, or adjustments. Such data communication can be between a remote location, over the Internet, between a plurality of COM device 100, between a plurality of in-vehicle device 200, between a plurality of Internet based servers, between a plurality of Internet appliances, or between a plurality of other Internet based data processing resources.

Interconnected with a microcontroller 234 can be a magnetic card or smart card reader/writer 212. A magnetic card or smart card reader/writer 212 can be similar in manufacture, specification, and general electrical functionality to a magnetic card or smart card reader/writer 110.

Interconnected with a microcontroller 234 can be a touch screen 214. As part of a user interface the touch screen 214 can be electrically tethered separate from the in-vehicle device 200. A touch screen 214 can be similar in manufacture, specification, and general electrical functionality to a touch screen 114. Interconnected with a microcontroller 234 can be an LCD display 216. A LCD display 216 can be similar in manufacture, specification, and general electrical functionality to a LCD display 114.

Interconnected with a microcontroller 234 can be an RS232/RS485 interface 218. An RS232/RS485 interface 218 can be similar in manufacture, specification, and general electrical functionality to an RS232/RS485 interface 116. In an exemplary embodiment an RS232/RS485 interface 218 can be utilized to effectuated data communication with an RS232/RS484 compliant device, including a notebook computer. A notebook computer can be a DELL, SONY, GATEWAY, IBM, IBM brand THINKPAD, or other similar type of notebook computer. Such data communication can be between a remote location, over the Internet, between a plurality of COM device 100, between a plurality of in-vehicle device 200, between a plurality of Internet based servers, between a plurality of Internet appliances, or between a plurality of other Internet based data processing resources.

Interconnected with microcontroller 234 can be a general-purpose input and output interface 220. A general-purpose input and output interface 220 can be utilized to interface an in-vehicle device 200 to a plurality of in vehicle devices. Such in vehicle devices can include engine components, gauges, relays, ignition controls, cruise control, air conditioner controls, and other vehicle controls. A general-purpose input and output interface 220 can include support for CAN network interfacing, LIN network interfacing, J1850, IDB network interface, or IDB-MULTIMEDIA network interface.

In an exemplary embodiment a general-purpose input and output interface 220 can be tailored and effectuated in a plurality of ways based in part on the particular application. For example and without limitation, a general-purpose input and output interface 220 can be implemented with a plurality of relays, or a plurality of transistor-to-transistor-logic (TTL) inputs and outputs (I/O). A general-purpose input and output interface 118 can also be implemented with a plurality of opto-isolators, or a plurality of silicon controlled rectifiers (SCR), or a plurality of triacs, or a plurality of transistor drivers.

A general-purpose input and output interface 220 can be similar in manufacture, specification, or general electrical functionality to a general-purpose input and output interface 118.

Interconnected with a microcontroller 234 can be a personal data assistant (PDA) interface 222. A PDA interface 222 can be implemented with an infrared communications means or a wired interface. An infrared communications means can be implemented with an infrared remote control receiver module, such as a LITEON LT1033, and an infrared LED for transmitting data, such as a LITEON LT1062 LED. A PDA interface 222 can also be a wired interface. A wired interface can be implemented with the 3COM PALM PILOT interface cable, or other PDA brand interface cables. In addition, a wireless PDA interface 120 can be implemented utilizing wireless standards such as wireless application protocol (WAP), BLUE TOOTH, or other wireless standards and protocols.

In an exemplary embodiment an in-vehicle device 200 can data communicate with a PDA by way of the PDA interface 222. In such an embodiment the PDA can exchange data and gain access to the Internet by way of an in-vehicle device 200. In addition, the PDA can receive data related to vehicle telemetry, metrics, and other informational data.

Interconnected with a microcontroller 234 can be a speech and sound audio playback means 224. In an exemplary embodiment a speech and sound audio playback means 224 can play back digitized, and streamed audio data. In such an embodiment a data communication by way of the Internet can be played by the speech and sound audio playback means 224. In addition, pre-recorded audio data can be play by the speech and sound audio playback means 224. Such pre-recorded audio data can be ADPCM format, MP3 format, or other proprietary or standard data format. In addition, pre-recorded audio data can include instructional prompts and sounds, as well as warning prompts and sounds, and other audible prompts and sounds. A speech and sound audio playback means 224 can be implemented with an OKI SEMICONDUCTOR MSM9841 or a OKI SEMICONDUCTOR MSM6585RS, or other similar speech and audio processors.

Interconnected with the speech and sound audio playback means 224 can be an audio switch 226. The audio switch 226 can be interconnected with the microcontroller 234. In an exemplary embodiment the audio switch 226 being responsive to the microcontroller 234 can route audio signals to an in-vehicle device 200 audio amplifier 228, or to the vehicle radio interface 248. In this embodiment the audio switch 226 allows analog and digital signals from an in-vehicle device 200 to be data communicated to the vehicle's radio by way of the vehicle interface 248. This allows the vehicle radio to serve as the audio system for playback, and audio conferencing. A vehicle radio interface 248 can be implemented with line level analog inputs, through TTL level or digital line driven inputs and outputs, or small signal relays. A vehicle radio interface 248 can include support for CAN network interfacing, LIN network interfacing, J1850, IDB network interface, or IDB-MULTIMEDIA network interface.

Interconnected with the audio switch 226 can be an amplifier and a filter network 228. An amplifier and filter network 228 can be implemented with a SANYO LA4460N amplifier or TEXAS INSTRUMENTS amplifier. A filter network 228 can be implemented with a NATIONAL LM324 quad op-amp, or TEXAS INSTRUMENTS series DSP, or with a single pole resistor and capacitor combination. An amplifier and a filter network 228 can also be implemented with other similar amplifiers and filter networks.

Interconnected with a filter network 228 can be a speaker 230. A speaker 230 can be implement with a variety of general-purpose speakers. Selection of a suitable speaker can be based in part on speaker size, shape, tonal qualities, as well as other design and application specification and criteria.

Interconnected with a microcontroller 236 can be an alarm system interface 236. In an exemplary embodiment an alarm system interface 236 can allow an in-vehicle device 200 to interface to third party vehicle alarm systems. In addition, an alarm system interface 236 can include certain alarm circuitry. Certain alarm circuitry can include a proximity sensor 238, a motion sensor 240, a current loop sensor 242, or an ignition kill interface 246. Additional alarm circuitry can be used to supplement a third party alarm system adding additional alarm mechanism or trigger means.

An alarm system interface 236 can be implemented with line level analog inputs, through TTL level or digital line driven inputs and outputs, or through small signal relays. A proximity sensor 238 can be implemented with an ALLEN BRADLEY, GENERAL ELECTRIC, OMRON, NATIONAL, or other similar proximity sensor. A motion sensor 240 can be implemented with an ANALOG DEVICE, ANALOG DEVICE iMEMS technology, or other similar motion sensor. A current loop sensor 242 can be implemented with a toroid coil, or other similar current loop sensor. An ignition kill interface 238 can be implemented with an OMRON relay, or other similar relay.

Interconnected with a microcontroller 234 can be a digital signal processor (DSP) 232. A DSP 232 can be a TEXAS INSTRUMENTS, or other similar DSP technology.

Interconnected with a video signal input and conditioner 252 can be a DSP 232, or a video signal input and conditioner 252. A camera 250 can be interconnected with a video signal input and conditioner 252. Additionally, a DSP 232 can be interconnected with a microphone 254.

A user interface can include a combination of in-vehicle device 200 features. Such combination of in-vehicle device 200 features can include the touch screen 214, the LCD display 216, and the microphone 254. Other user interface devices can be included in the user interface as required by the specific application. In certain embodiments it may be required, or desirable to locate the user interface in the vehicle's passenger compartment area and electrically tether the user interface to the in-vehicle device 200 which may reside in the vehicle trunk, engine area, or elsewhere in the vehicle. This in effect allows the in-vehicle device to reside in a secure area of the vehicle while the user interface components remain accessible by a user from within the vehicle's passenger compartment area.

In an exemplary embodiment a DSP 232 in combination with a camera 250, or a video signal input and conditioner 252, or a microphone 254 can be utilized to digitize audio and video signals. Once digitized these signals can be data communicated by way of an in-vehicle device 200. Data communication can include data communication over the Internet to a plurality of COM device 100, to a plurality of in-vehicle device 200, to a plurality of Internet based servers, to a plurality of Internet appliances, or to a plurality of other Internet based data processing resources. In addition, digitized audio can be utilized to effectuate voice activation of in-vehicle device 200. Such voice activation can invoke command and control features such as vehicle command and control, in-vehicle device 200 command and control, or other command and control functions and features. Such vehicle command and control can include operation and control of the vehicle and vehicle system including the engine, braking, gas pedal, ignition, and stick shift.

Interconnected with a microcontroller 234 can be an ignition control interface 256. An ignition control interface 256 allows the in-vehicle device 200 to start a car that is turned 'OFF' or stop a car that is turned 'ON'. An ignition control interface can be implemented with an OMRON relay, or other similar relay. An ignition control interface 256 can include support for CAN network interfacing, LIN network interfacing, J1850, IDB network interface, or IDB-MULTIMEDIA network interface.

Interconnected with a microcontroller 234 can be a wireless transceiver 258. In an exemplary embodiment a wireless transceiver 258 can be utilized to data communicate between a COM device 100 and an in-vehicle device 200. Such data communication can include vehicle telemetry, vehicle metrics, COM device 100 data, in-vehicle device 200 data, audio or video data, e-business data, e-mail data, e-commerce data, Internet based data, PC 310 data, as well as other general and specific data. A wireless transceiver can be implemented with a BYTEL, DIGITAL WIRELESS CORPORATION, GLOBAL WAVE, FREEWAVE TECHNOLOGIES, ELECTRONIC SYSTEMS TECHNOLOGIES, GRE, IBM, MOTOROLA, or other similar manufacturer of wireless transceiver products. A wireless transceiver 258 can also be implemented by terminating a wireless transceiver 258 interface as a PCMCIA interface. A PCMCIA compatible wireless device can then be electrically connected and utilized to effectuate wireless communications on any wireless technology, network, or system. A wireless transceiver 258 can be BLUE TOOTH compliant, wireless application protocol (WAP) compliant, or subscribe to other standard and proprietary wireless protocols or standards.

Interconnected with a microcontroller 234 can be a vehicle monitor and metering interface 260. A vehicle monitor and metering interface 260 can include support for CAN network interfacing, LIN network interfacing, J1850, IDB network interface, or IDB-MULTIMEDIA network interface.

In addition, a vehicle monitor and metering interface 260 can include certain vehicle monitor and metering means. Certain vehicle monitor and metering means can include an accelerometer 262, a tachometer RPM/speed 264, and an odometer 266. By interconnecting a vehicle monitor and metering interface 260 with vehicle gauges and instrumentation the in-vehicle device 200 can monitor, record, and data communicate vehicle telemetry and metrics. In an embodiment where an interface to certain instrumentation may not be possible or desirable the necessary functionality for data gathering can be effectuated by including and utilizing the accelerometer 262, or the tachometer RPM/speed 264, or the odometer 266.

In an exemplary embodiment the vehicle monitor and metering interface 260, accelerometer 262, or the tachometer RPM/speed 264, or the odometer 266 can monitor and or measure the vehicles performance. In accordance with vehicle dynamic changes such as increasing velocity, or travel at high speeds certain broadcast volume levels can be adjusted for the purpose of offsetting background noise including roadway noise, wind noise, engine noise, or other vehicle noises. Adjustments to broadcast levels can be by way of the in-vehicle device 200 speech and sound audio playback means 224, or the vehicle radio interface 248.

In addition, microphone 254 and digital signal processor 232 can be utilized to implement noise cancellation functionality, such noise canceling audio can be broadcast by way of sound audio playback means 224, or the vehicle radio interface 248.

A vehicle monitor and metering interface 260 can be implemented with line level analog inputs, through TTL level or digital line driven inputs and outputs, or small signal relays, or opto-isolators. An accelerometer 262 can be implemented with an ENTRAN brand, or other similar accelerometers.

Interconnected with a microcontroller 234 can be a global satellite positioning (GPS) receiver 268. A GPS receiver 268 can receive signals from satellites and determine the locations of the GPS receiver and the vehicle containing the GPS receiver. This GPS location data can be data communicated to the in-vehicle device 200 and further processed as required. A GPS receiver 268 can be implemented with a GARMIN, MAGELLAN, LOWRANCE, or other similar GPS receiver models or brands.

Interconnected with a microcontroller 234 can be a wireless modem 270. In an exemplary embodiment a wireless modem 270 can be utilized to data communicate with a remote location. Such a remote location can be an emergency monitoring network 332, or a PC 310, or other remote location. A wireless modem 270 can be implemented with an IBM, MOTOROLA, TELETRONICS, TELEDESIGN SYSTEMS, or other similar types of wireless modem. A wireless modem 270 can also be a PCMCIA interface connector. In this embodiment a PCMCIA interface connector can allow a wide variety of off-the-shelf brands of wireless modem to interconnect and operate with an in-vehicle device 200.

Interconnected with a microcontroller 234 can be a cellular phone transceiver 272. In an exemplary embodiment a cellular phone transceiver 272 can be utilized to effectuate data communication between an in-vehicle device 200 and a cellular network. A cellular phone transceiver 272 can be implemented with an IBM, GLOBAL WAVE, NOVATEL WIRELESS, MOTOROLA, or other similar cellular phone transceiver.

Interconnected with a microcontroller 234 can be a cellular phone interface 274. In an exemplary embodiment a cellular phone interface 274 can be utilized to interface a cellular phone to an in-vehicle device 200. In this embodiment a cellular phone interface 274 can enable an in-vehicle device 200 to utilize cellular phone functionality including, processing voice and data signals, or data communicate by way of a cellular network.

Interconnected with a microcontroller 234 can be a wireless data link 276. An infrared communications means can be a wireless data link 276, and can be implemented with an infrared remote control receiver module, such as a LITEON LT1033, and an infrared LED for transmitting data, such as a LITEON LT1062 LED. A radio frequency (RF) transceiver can be a wireless data link 276 and can be implemented with an IBM, MOTOROLA, RESEARCH IN MOTION, MICROTEQ, or other similar RF transceiver technologies. Such a satellite receiver can be implemented with standards, protocols, service, communication equipment, or other technologies available from XM SATELLITE RADIO HOLDINGS, or SIRIUS SATELLITE RADIO, or other similar satellite technology companies.

Interconnected with a microcontroller 234 can be a printer interface 278. A printer interface can interface to serial printers as well as parallel or CENTRONIC or USB style printers. In an exemplary embodiment a printer interface 278 can interface to a printer for the purpose of printing Internet based data, vehicle telemetry or metric data, advertising data, or other print data. A printer interface 278 can be implemented with a TTL level line input and output driver or a TTL or RS232 level serial interface. A TTL level interface can be an ALEGRO UCN5801EP or UDN2595A, or a CYPRESS CPLD 371 series. A serial printer interface can be implemented with a MAXIM RS232 converter/interface, or TTL level ALEGRO UDN2595A, or a CYPRESS CPLD 371 series, or other similar devices.

Interconnected with a microcontroller 234 can be a biometric input interface 280. A biometric input interface 280 can accept and or process palm, hand, finger, eye (iris scan), voice and voice commands, or other biometric input data. A biometric input interface can be a TTL, or RS232, or third party proprietary interface. In addition, a biometric input interface 280 can interface to a third party biometric devices. A biometric input interface 280 can be implemented with a TTL level line interface such as an ALEGRO UCN5801EP, or UDN2595A, or a CYPRESS CPLD 371 series, or other similar circuit interfaces. A serial biometric input interface can be implemented with a MAXIM RS232 converter/interface, or TTL level ALEGRO UDN2595A, or a HARRIS SEMICONDUCTOR, CYPRESS SEMICONDUCTOR, or other similar circuit interfaces.

Figure 5:
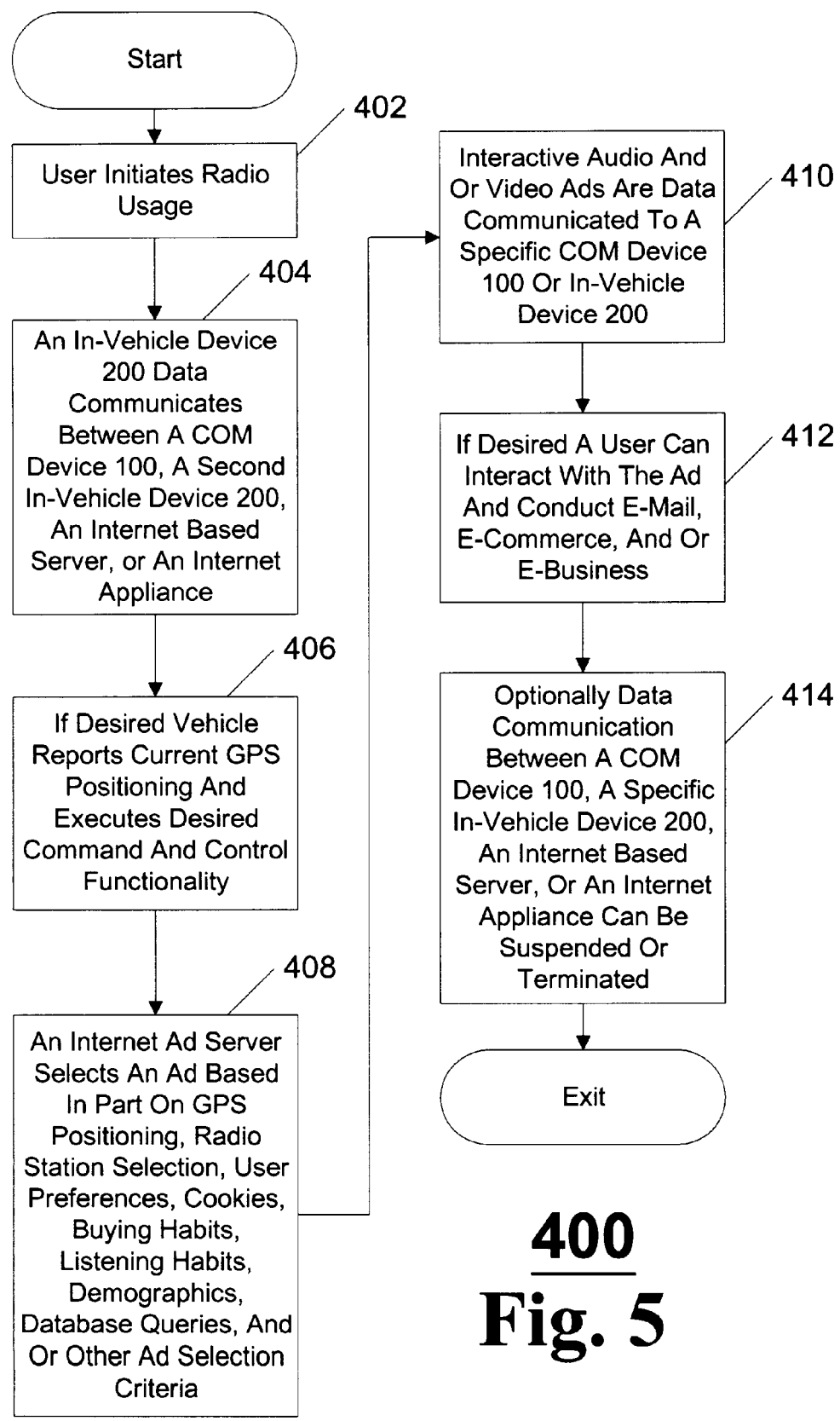
FIG. 5 shows a radio advertisement server routine 400 flowchart.

Referring to FIG. 5 there is shown a radio advertisement server routine 400. COM device 100, in-vehicle device 200, and various data processing resources cooperate together as a system to effectuate the radio advertising routine 400. The radio advertisement server can be an Internet based server that receives data communication from a COM device 100 or an in-vehicle device 200. Then based in part on known user preferences or profile and based in part on GPS data or geographic location data the Internet based advertisement server can select advertising content from a database of advertising content and serve the advertisement to a specific COM device 100, or a specific in-vehicle device 200. Alternatively, the advertisement server can serve advertisements to a plurality of COM device 100, or a plurality of in-vehicle device 200. Processing begins in block 402.

Processing in block 402 allows a user to initiate the usage of the vehicle radio. In an exemplary embodiment an in-vehicle device 200 can monitor the usage of the radio including the radios settings. Radio settings can include radio frequency (radio station) listening preferences, duration of listening, time of the day and days of the week listening, and measure a users tendency to change the radio station when commercials are broadcast. Processing then moves to block 404.

In block 404 data communication between an in-vehicle device 200 and a COM device 100, a second in-vehicle device 200, an Internet based server, or an Internet appliances can be established. Such a data communication can allow data to be exchanged between an Internet based server and an in-vehicle device 200. Such data communication can include user preferences, and other user metrics, or listening histories including radio frequency (radio station) listening preferences, duration of listening, time of the day and days of the week listening, and measure a user's tendency to change the radio station when commercials are broadcast. In addition, data communication between the in-vehicle device 200 and an Internet based server allows both the server and the in-vehicle device 200 to be programmed, or update other elements within a plurality of databases. Processing then moves to block 406.

In block 406 GPS data can be data communicated between the Internet based server and the in-vehicle device 200. Such GPS data communication can be utilized in the selection of advertisements based in part on geographic location. In addition, any command and control functionality such as stopping the engine, monitoring engine performance, trip tracking, or reporting car positioning can be data communicated. Processing then moves to block 408.

In block 408 an Internet based server selects advertisements based on certain advertisement criteria. Such advertisement criteria can include advertisement selection based in part on GPS positioning data. Advertisement selection based on GPS data in essence is advertisement selection based on the geographic location of the vehicle. In this embodiment, advertisement selection criteria, based on GPS data can result in advertisements for local restaurants, shopping, site seeing attractions, etc. can be served and displayed in a vehicle moving down a highway.

Advertisement selection can also be based on radio station selection and user's listening histories. User listening histories can include radio frequency (radio station and types of songs including specific song titles) listening preferences, duration of listening, time of the day and days of the week listening, and measure a user's tendency to change the radio station when commercials are broadcast. Such listening history data can be monitored or recorded by way of a vehicle radio interface 248.

In addition, advertisement selection can be based on cookies resident on an Internet server, or in a user's in-vehicle device 200. In addition to cookies other user specific data can be maintained at the server or within the user's in-vehicle device 200. Such other users specific data can include a user's buying habits, listening habits, and other user demographics.

In other embodiments advertisements can be selected based on database queries, and other advertisement serving based criteria and processes. Processing then moves to block 410.

In block 410 interactive advertisements are data communicated between the Internet based server and a specific COM device 100, or a specific in-vehicle device 200. Processing then moves to block 412.

Processing in block 412 allows a user to interface with the advertisement. Interaction with an advertisement can include sending or receiving an e-mail, or conducting an e-commerce or e-business type transaction. Processing then moves to block 414.

In block 414 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 6:
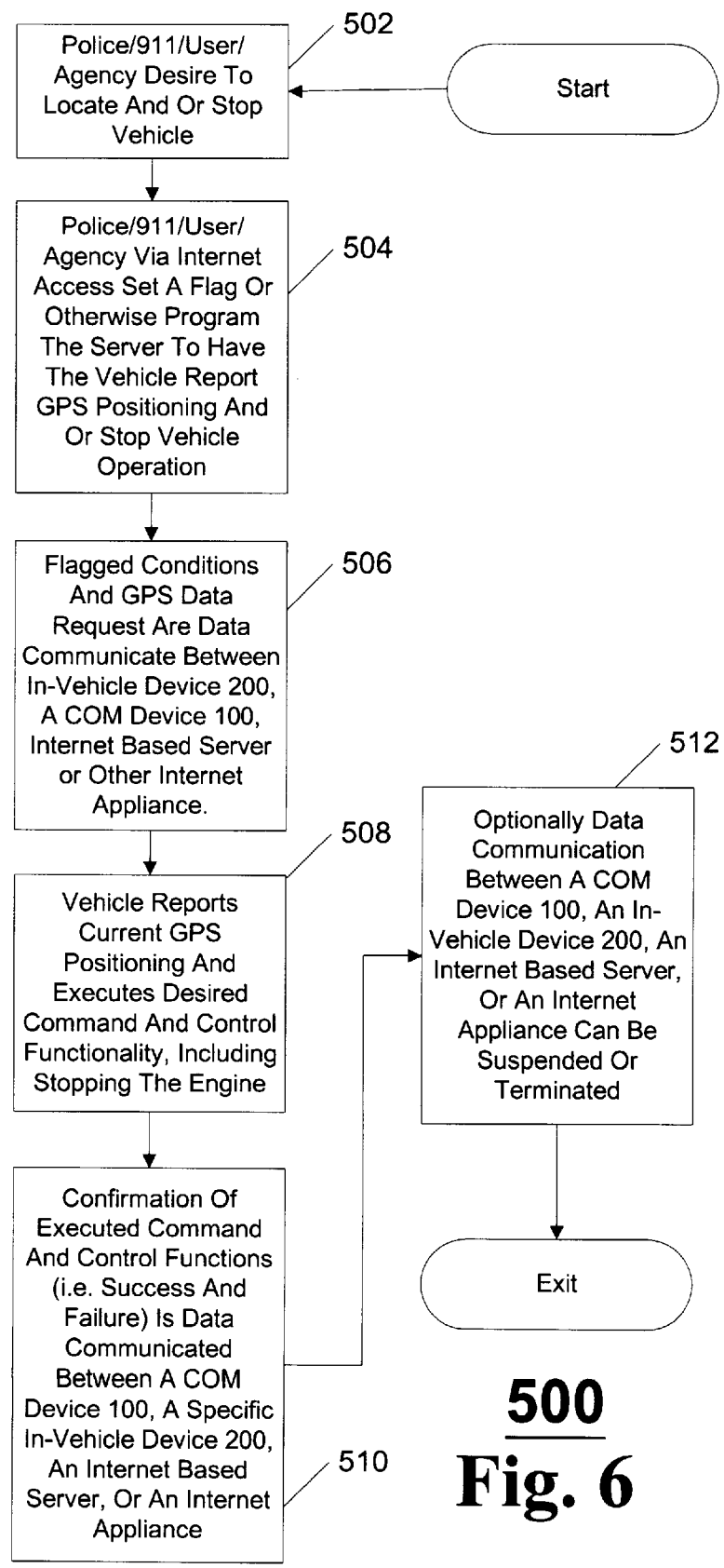
FIG. 6 shows an Internet based remote control vehicle alarm routine 500 flowchart.

Referring to FIG. 6 there is shown an Internet based remote control vehicle alarm routine 500. COM device 100, in-vehicle device 200, and various data processing resources cooperate together as a system to effectuate the vehicle alarm routine 500. In an exemplary embodiment an Internet based remote control vehicle alarm can be utilized to notify an Internet based data processing resource, server, or agency that a vehicle alarm has been activated. In addition, the Internet based data processing resource, server, or agency can initiate a command and control level of functionality such that, a equipped with an vehicle in-vehicle device 200 can receive a data communication and act upon such data including deactivating the vehicle's engine. Processing begins in block 502.

In block 502 the police, law enforcement, national emergency agency 911, a user, central monitoring station, or other agency desiring to located or stop a specific vehicle equipped with an in-vehicle device 200 can be identified. Processing then moves to block 504.

In block 504 the police, law enforcement, national emergency agency 911, a user, central monitoring station, or other agency desiring to located or stop a specific vehicle can via Internet access set a flag or otherwise program a server with appropriate instructions. Appropriate instructions, can include setting a flag, or programming a server, requesting the vehicle to report its GPS position, or instructing the in-vehicle device 200 associated with a particular vehicle to stop the vehicle. Stopping the vehicle can be done by way of the interface to the vehicle engine control system 210, or the ignition control interface 256. Processing then moves to block 506.

In block 506 flagged conditions and GPS data requests can be data communicated between a specific in-vehicle device 200, a COM device 100, an Internet based server, or an Internet appliance. Processing then moves to block 508.

In block 508 the vehicle associated with the specific in-vehicle device 200 receives the flagged condition, or GPS data request and executes the command and control functionality. Such command and control functionality can include stopping the engine, or reporting vehicle GPS positioning. Processing then moves to block 510.

In block 510 a confirmation of executed command and control functions including success and failure confirmation can be data communicated between a COM device 100, a specific in-vehicle device 200, an Internet based server, or an Internet appliance. Such data communication can serve as notification to the police, law enforcement, national emergency agency 911, a user, central monitoring station, or other agency that the vehicle has been or has not been located, or stopped. Such data can include the vehicle's GPS location. Processing then moves to block 512.

In block 512 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 7:
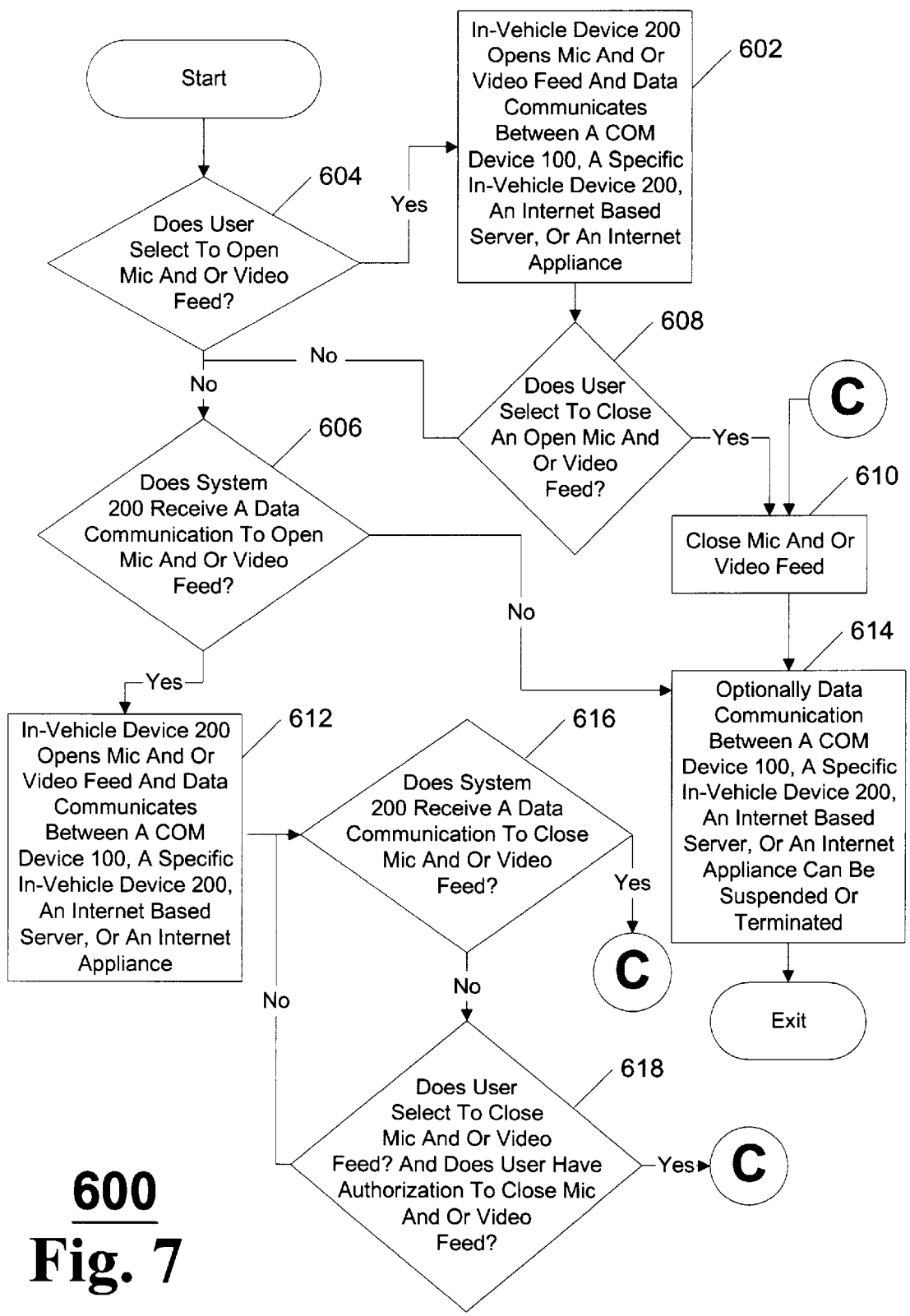
FIG. 7 shows an Internet based voice and data communication routine 600 flowchart.

Referring to FIG. 7 there is shown an Internet based voice and data communication routine 600. COM device 100, in-vehicle device 200, and various data processing resources cooperate together as a system to effectuate voice and data communication routine 600. An Internet based voice and data communication routine effectuates audio and videoconferencing from within a vehicle by way of an in-vehicle device 200, a COM device 100, a second in-vehicle device 200, an Internet based server, or an Internet appliance. Processing begins in decision block 604.

In decision block 604 a user is allowed to select whether to open a microphone or video feed. If the resultant is in the affirmative, that is the user decides to open a microphone or video feed then processing moves to block 602. If the resultant is in the negative, that is the user does not decide to open a microphone or video feed then processing moves to decision block 606.

In an exemplary embodiment audio conferencing can be effectuated by way of microphone 254. In addition, videoconferencing can be effectuated by way of camera 250, and video signal input and conditioner 252. In this embodiment audio or video signals can be digitized by way of DSP 232 and data communicated between an in-vehicle device 200 and other COM device 100, other in-vehicle device 200, or other Internet resources. Audio or Video signals can be data communicated to an in-vehicle device 200 and broadcast or shown by way of the LCD display 216, and the speech and sound audio playback means 224. Audio playback can be by way of an in-vehicle device 200 sound system including amplifier and filter network 228, and speaker 230. Alternatively, playback can be through the vehicle's radio by way of vehicle radio interface 248. In this embodiment an audio switch 226 can select between playback systems (in-vehicle device 200 or vehicle radio).

In block 602 the in-vehicle device 200 associated with the user's vehicle opens a microphone or a video feed. In addition, data communication between a COM device 100, a specific in-vehicle device 200, an Internet based server, or an Internet appliance is effectuated. Processing then moves to decision block 608.

In decision block 608 the user is allowed to close the microphone or video feed. If the resultant is in the affirmative, that is the user desires to close the microphone or video feed then processing moves to block 610. If the resultant is in the negative, that is the user does not desire to close the microphone or video feed then processing moves to decision block 606.

In block 610 the microphone or video feed is closed and processing then moves to block 614.

In block 614 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

In decision block 606 a determination is made based on data communication received by the in-vehicle device 200. If the resultant is in the affirmative, that is data communications are received requesting the in-vehicle device 200 to open a microphone or video feed then processing moves to block 612. If the resultant is in the negative, that is the in-vehicle device 200 does not receive data communications requesting the in-vehicle device 200 to open a microphone or video feed then processing moves to block 614.

In block 612 the in-vehicle device 200 opens the microphone or video feed based on data communication requests from a COM device 100, a specific in-vehicle device 200, an Internet based server, or an Internet appliance. Processing then moves to decision block 616.

In decision block 616 a determination is made based on data received by the in-vehicle device 200. If the resultant is in the affirmative, that is in-vehicle device 200 receives a data communication requesting the closing of the microphone or video feed then processing moves to block 610. If the resultant is in the negative, that is in-vehicle device 200 does not receive a data communication requesting the closing of the microphone or video feed then processing moves to decision block 618.

In decision block 618 a determination is made based on user input. If the resultant is in the affirmative, that is a user selects to close a microphone or video feed then processing moves to block 610. If the resultant is in the negative, that is the user does not select to close the microphone or video feed then processing moves to block 616.

Figure 8A:
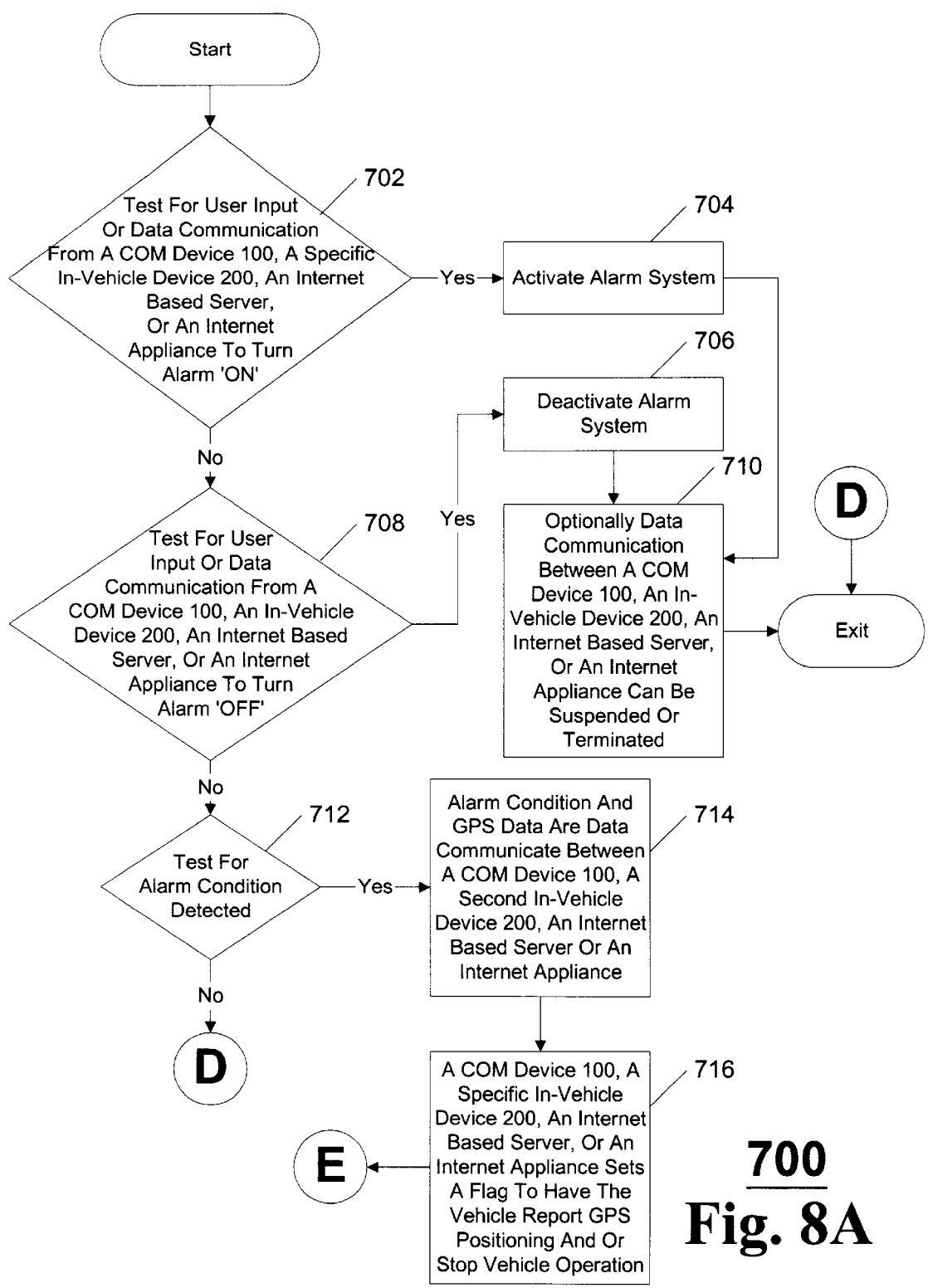

Referring to FIGS. 8A–8B there is shown an Internet based vehicle alarm routine 700. COM device 100, in-vehicle device 200, and various data processing resources cooperate together as a system to effectuate Internet based vehicle alarm routine 700. An Internet based vehicle alarm system effectuates setting and monitoring of a vehicle's security system by way of the Internet. In such an embodiment a user can set the alarm and allow a central station to monitor the vehicle status, including the alarm state by way of an Internet connection or an Internet based server. Processing begins in decision block 702.

In decision block 702 a determination is made based on user input or based on data communication between the in-vehicle device 200 and a COM device 100, a specific in-vehicle device 200, an Internet based server, or an Internet appliance. If the resultant is in the affirmative, that is user input or data communication from a COM device 100, a specific in-vehicle device 200, an Internet based server, or an Internet appliance desires to turn the alarm system 'ON' then processing moves to block 704. If the resultant is in the negative, that is user input or data communication from a COM device 100, a specific in-vehicle device 200, an Internet based server, or an Internet appliance does not desire to turn the alarm system 'ON' then processing moves to decision block 708.

In block 704 the vehicle alarm system is turned 'ON'. In an exemplary embodiment a vehicle's alarm system can be activated by way of the alarm system interface 236. In such an embodiment the alarm system interface 236 can include certain alarm circuitry. Certain alarm circuitry can include a proximity sensor 238, a motion sensor 240, a current loop sensor 242, or an ignition kill interface 246. In vehicles equipped with an in-vehicle device 200 and a separate alarm system the alarm system interface 236 can interface to and data communicate with the separate alarm system by way of the alarm system interface 236.

Alternatively, in embodiments where interfacing to a separate alarm system may not be possible an in-vehicle device 200 and a microphone 254 can be utilized to monitor the vehicle noise level and activate an alarm condition based in part on alarm siren noise, or other detected noise. Processing then moves to block 710.

In decision block 708 a determination is made based on user input or based on data communication between the in-vehicle device 200 and a COM device 100, a specific in-vehicle device 200, an Internet based server, or an Internet appliance. If the resultant is in the affirmative, that is user input or data communication from a COM device 100, a specific in-vehicle device 200, an Internet based server, or an Internet appliance desires to turn the alarm system 'OFF' then processing moves to block 706. If the resultant is in the negative, that is user input or data communication from a COM device 100, a specific in-vehicle device 200, an Internet based server, or an Internet appliance does not desire to turn the alarm system 'OFF' then processing moves to decision block 712.

Processing in block 706 deactivates the alarm system. Processing then moves to block 710.

In block 710 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

In decision block 712 a determination can be made based on the status of the alarm. If the resultant is in the affirmative, that is an alarm condition is detected (the alarm has been triggered) then processing moves to block 714. If the resultant is in the negative, that is the alarm condition is not detected (the alarm has not been triggered) then the routine is exited.

In block 714 the status of the alarm condition (triggered, or not triggered) and the vehicle GPS location data are data communicated between a COM device 100, an in-vehicle device 200, an Internet based server, or an Internet appliance. Processing then moves to block 716.

In block 716 a COM device 100, a specific in-vehicle device 200, an Internet based server, or an Internet appliance can set a flag to have the vehicle continuously report vehicle GPS location data, stop the vehicle engine, reset the alarm, or take other appropriate action. Appropriate action determination can be based in part on user preferences, server programming, central station monitoring procedures, police or law enforcement or national emergency agency 911 intervention, or other desirable agency command and control functionality. Processing then moves to 718.

Processing in block 718 allows the vehicle to report GPS location data and executes the command and control functionality commands received in block 716. Processing then moves to block 720.

In block 720 a confirmation of executed command and control functions including success and failure confirmation can be data communicated between a COM device 100, a specific in-vehicle device 200, an Internet based server, or an Internet appliance. Such data communication can serve as notification to the police, law enforcement, national emergency agency 911, a user, central monitoring station, or other agency that the vehicle has or has not been located, or stopped. Such data can include the vehicle GPS location. Processing then moves to block 722.

In block 722 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

There is shown in FIG. 8B a server alarm response routine. The server alarm response routine can receive data communication from an in-vehicle device 200 indicating a vehicle alarm condition (the alarm has been triggered) notification. A response from the server can be issued based on user preferences, server programming, or central station monitor procedures. In addition, responses from the server can be directed to and processed by the police networks, law enforcement networks, national emergency agency 911 networks, or other agency networks. Processing begins in block 724.

In block 724 a COM device 100, an in-vehicle device 200, an Internet based sever, or an Internet appliance having detected an alarm condition data communicates with an Internet based server. Processing then moves to block 726.

In block 726 based on user preferences, server programming, or central station monitoring procedures a response from the server can be issued. In addition, responses from the server can be directed to and processed by the police networks, law enforcement networks, national emergency agency 911 networks, other agency networks. The routine is then exited.

Referring to FIG. 9 there is shown an Internet based notification routine 800. COM device 100, in-vehicle device 200, and various data processing resources cooperate together as a system to effectuate the Internet based notification routine 800. An Internet based notification routine is a server based application capable of processing transactions or requests and issuing notifications received from and sent to a plurality of COM device 100, a plurality of in-vehicle device 200, a plurality of Internet based data processing resources, or a plurality of servers.

In general, an Internet based notification routine effectuates the receiving and sending of notifications resultant from processing transaction and request information data communicated with a COM device 100, an in-vehicle device 200, an Internet appliance, or other data processing resource. Types of notifications can vary based in part on the transaction or request information, user preferences and settings, or notification server programming. Notification responses can be directed to a plurality of data processing resources. Such data processing resources can include wireless phones, pagers, PDA, PC 310, COM device 100, in-vehicle device 200, Internet appliance, Internet based servers, fax servers, e-mail servers, e-business servers, e-commerce servers, and other data processing resources.

In an exemplary embodiment an Internet based notification routine can be programmed with user specific information. Such user specific information can be a user's profile or other appropriate notification responses and destination information.

In this embodiment a transaction or request can include a request for a stock quote, headline news, or MP3 audio files. In addition, a transaction or request can result in notification of an event occurrence. Such a notification of an event occurrence can be sent to a person, a company, data processing device, an agency, or other network. An event occurrence can include an alarm condition or status, a vehicle mechanical problem or condition, a message or data waiting condition, or other type of event occurrence where notification is required or requested.

A transaction or request can include receiving an e-mail, e-business, or e-commerce transaction data communicated from an in-vehicle device 200, and subsequently fulfilling the transaction request by forwarding the transaction data to the appropriate destination. Furthermore, a transaction or request can include forwarding or notifying an in-vehicle device 200 that an e-mail, e-business, or e-commerce transaction is pending.

A transaction or request can include querying headline news or stock quotes based in part on user defined preferences. Likewise notification of new news or updated financial data pending can be performed by an Internet based notification routine. Processing begins in block 802.

In block 802 an in-vehicle device 200 data communicates between a COM device 100, a second in-vehicle device 200, an Internet appliance, and an Internet based server operating an Internet based notification routine. Such data communication can be in the form of a transaction or a request. In general, a transaction can be a task such as sending a fax, sending an e-mail, conducting e-business, performing e-commerce, sending notification to other data processing resources, or performing other task oriented events. Alternatively, a request can be for an Internet based notification routine to obtain data, change settings, upload or download data, or data communicate with other data processing resources. Processing then moves to block 804.

In block 804 the transaction or request is handled based in part on notification routine programming, and user specific settings or preferences. Transaction and request processing can invoke response data communications to other networks such as news networks, financial networks, specific web sites or portals, servers, databases, specific dot-com type of companies, police networks, law enforcement networks, national emergency agency 911 networks, other agency networks. In addition, transaction and request processing can invoke response data to fax servers, telecommunication servers, e-mail, e-business servers, e-commerce servers, or other servers and systems. The routine is then exited.

Referring to FIG. 10 there is shown an Internet based information acquisition routine 900. COM device 100, in-vehicle device 200, and various data processing resources cooperate together as a system to effectuate the Internet based information acquisition routine 900. An Internet based information acquisition routine allows a user or Internet server to initiate data communications with an in-vehicle device 200. Once data communication is established a user can select, or a server can data communicate online data for storage or viewing. Online data can include news, financial market information, e-mail, or other types of data. Processing begins in block 902.

In block 902 a user or an Internet server initiates data communication with an in-vehicle device 200. Data communications between an Internet based server and an in-vehicle device 200 can be a direct data communication between the server and the in-vehicle 200 or a data communication facilitated by way of a COM device 100, or an Internet appliance 322. Processing then moves to block 904.

In block 904 a user selects data stored locally to view or selects online data to download and or view. Alternatively, an Internet based server can download online data based in part on user preferences or server settings. Processing then moves to block 906.

In an exemplary embodiment online data can include headline news such as CNN or FOX news. Online data can also include online new papers, financial data such as stock quotes, or online periodicals. A user can select and view data store locally in the in-vehicle device 200 or obtain online data via the Internet or other remote server.

In another exemplary embodiment an Internet server can independently without user intervention initiate delivery of online data. In this embodiment for example and not limitation an Internet server can be utilized to automatically download to an in-vehicle device 200 an online newspaper each morning or evening. A user can then read the paper on the way to work or during a commute.

In block 906 a user can select to download and store the data locally in the in-vehicle device 200. Data can then be retrieved and viewed at the user's convenience. User stored preferences within the in-vehicle device 200 or on an Internet based server can determine whether non-user initiated data communications from a server are stored locally at the in-vehicle device 200. Processing then moves to block 908.

In block 908 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 11:
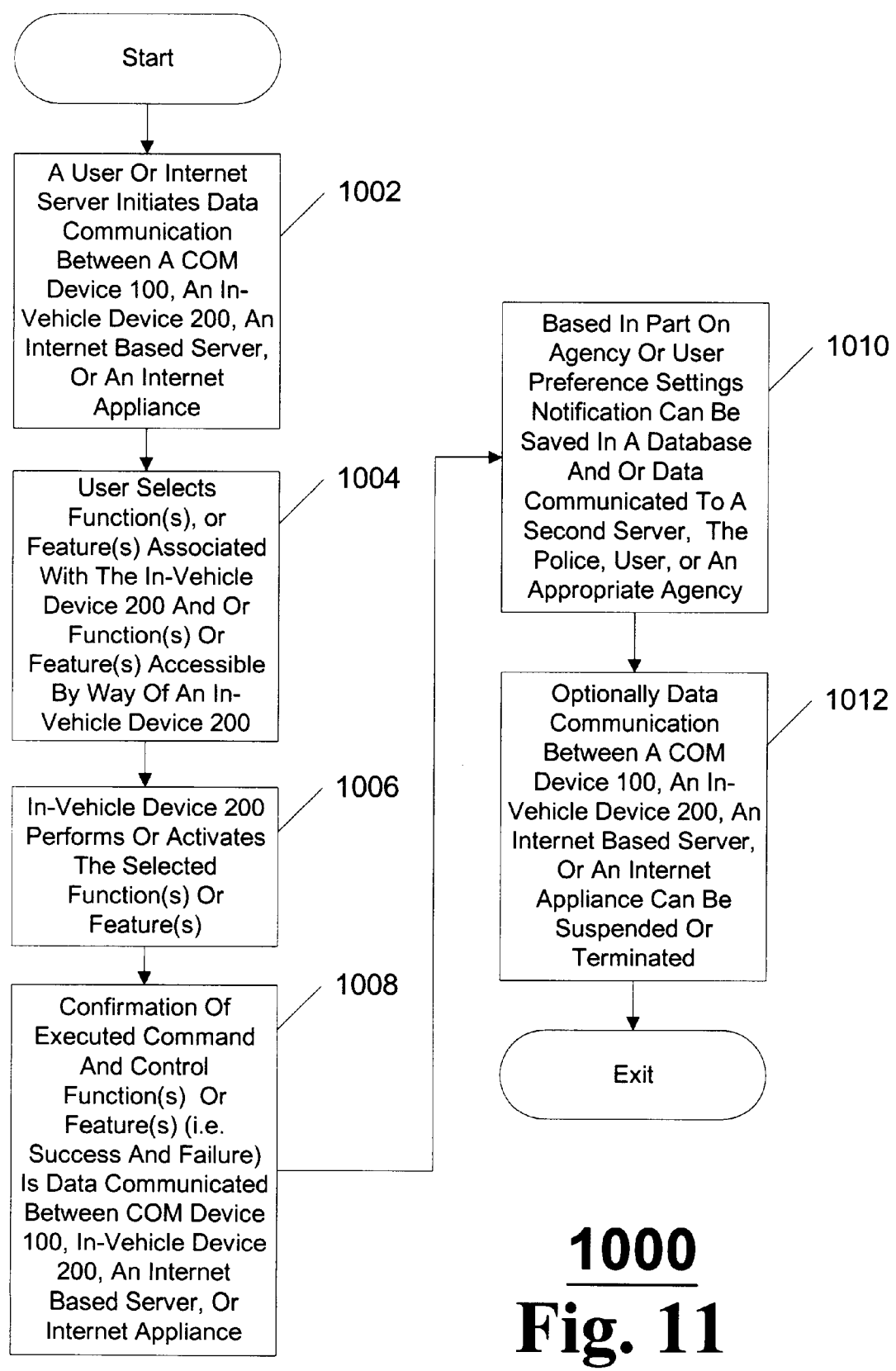
FIG. 11 shows an Internet based command and control routine 1000 flowchart.

Referring to FIG. 11 there is shown an Internet based command and control routine 1000. COM device 100, in-vehicle device 200, and various data processing resources cooperate together as a system to effectuate the command and control routine 1000. An Internet based command and control routine allows a user or server to initiate data communication with an in-vehicle device 200 and direct the in-vehicle device 200 to perform certain command and control functions. Such command and control functions can include reporting GPS location data, enabling or disabling vehicle operation, changing system or engine performance parameters, uploading or download data, reporting vehicle telemetry or metric information, activating alarm or security systems, or effectuating other command and control functions. Processing begins in block 1002.

In block 1002 a user or an Internet server initiates data communication with an in-vehicle device 200. Data communications between an Internet based server and an in-vehicle device 200 can be a direct data communication between the server and the in-vehicle 200 or a data communication facilitated by way of a COM device 100, or an Internet appliance 322. Processing then moves to block 1004.

In block 1004 a user selects a command and control function or feature to be preformed at a remote in-vehicle device 200. The selection of a command and control functions or feature can be initiated from a web browser, an in-vehicle device 200, or other PC or server based platform. The selected command and control functions are data communicated to the in-vehicle device 200. Processing then moves to block 1006.

In an exemplary embodiment a user or other appropriate agency can select command and control features and change preferences on an Internet based server. The server can then data communicate with the selected in-vehicle device 200 and effectuate the command and control request. The server can also receive a confirmation or status. A confirmation or status can include the information that the desired command and control functions have been executed or are pending execution.

In this type of embodiment for example and without limitation the police may decide to stop the operation of a vehicle equipped with an in-vehicle device 200. By initiating a data communication with an in-vehicle device 200 command and control function can be issued. Such command and control function could stop or disable the operation of a vehicle by way of for example and without limitation the ignition control interface 256.

In block 1006 the in-vehicle device 200 performs or activates the selected functions or features. Performing or activating selected functions or features can include enabling or disabling operation of a vehicle, opening or closing a microphone or video feed, activating or deactivating an alarm system, sending or receiving vehicle telemetry or metric data, or downloading MP3, video, advertising or other data. Processing then moves to block 1008.

In block 1008 confirmation of all executed command or control functions or features are data communicated between the in-vehicle device 200, a COM device 100, an Internet based server, or an Internet appliance. Processing then moves to block 1010.

In block 1010 optionally data related to the placing of the command and control request, the data communication of such a request to an in-vehicle device 200, and the subsequent status and confirmation of the execution of such a request can be data processed. Data processing of the command and control related data can include saving such data in a database, or data communicating such data to a second server, the police, law enforcement, national emergency agency 911, a user, central monitoring station, or other appropriate agency. Processing then moves to block 1012.

In block 1012 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 12:
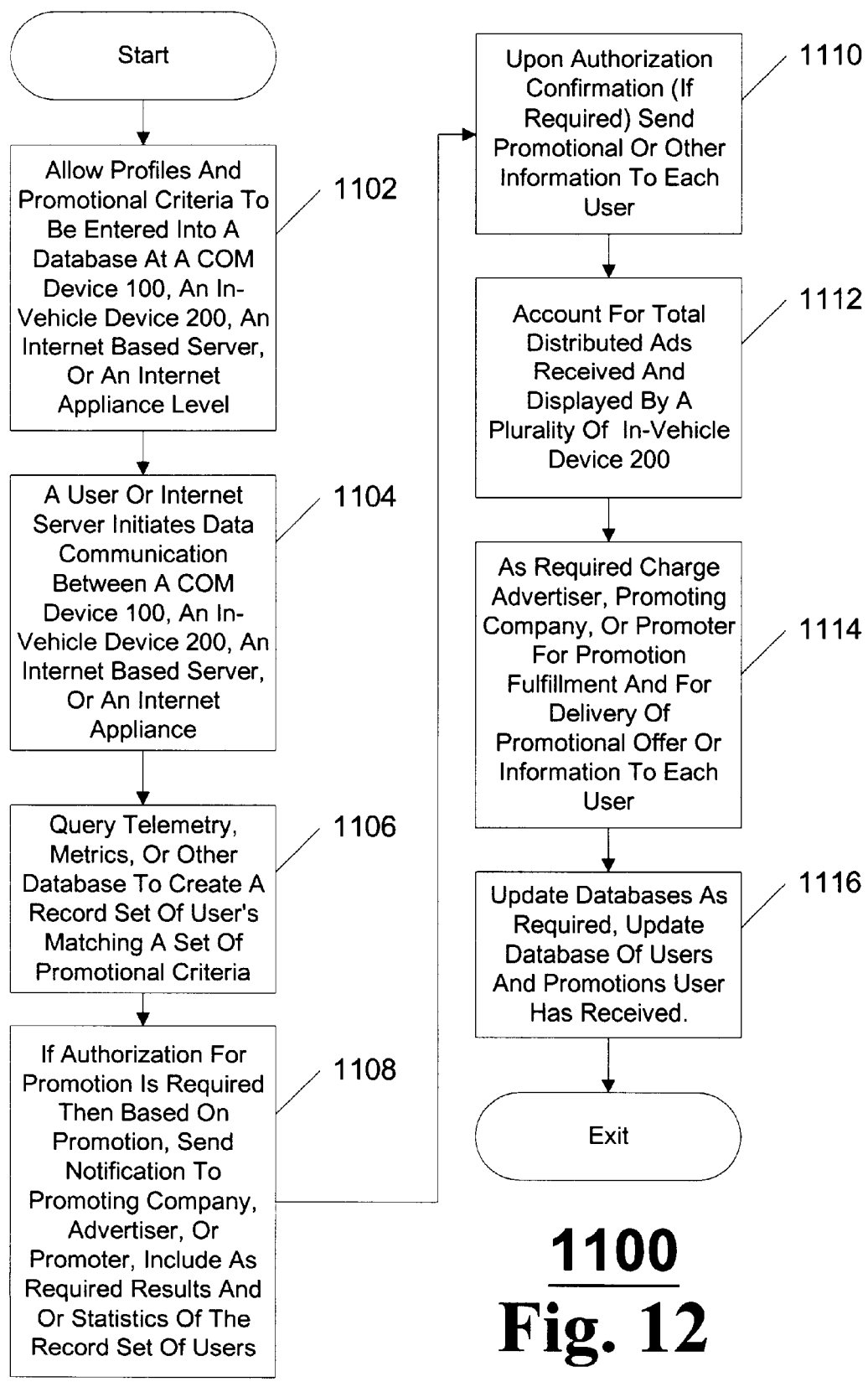
FIG. 12 shows an Internet based advertising server routine 1 100 flowchart.

Referring to FIG. 12 there is shown an Internet based advertisement service routine 1100. COM device 100, in-vehicle device 200, and various data processing resources cooperate together as a system to effectuate the Internet based advertisement service routine 1100. An Internet based advertising routine can be used to serve coupon and advertising data to a plurality of in-vehicle device 200. Coupon and advertising data can be selected from a database of coupon and advertising data. The selection of such data can be based on a plurality of in-vehicle device 200 vehicle telemetry or metric data, user preferences, and server settings. In-vehicle device 200 data can include GPS location data as well as other vehicle operational data. Special promotions or offers, coupon data, and advertisement data can generally be referred to as promotional data. Processing begins in block 1102.

In block 1102 user preferences, server profiles and settings, promotional criteria, coupon data, advertising data, and other data can be entered into a database. Such a database can be an advertising server database. An advertising server database can be populated with data in a plurality of ways including by way of an in-vehicle device 200, a COM device 100, an Internet based server, a PC 310, an Internet appliance 322, or other database data management methods.

In general, the advertising server can be populated with advertising data and hyperlinks to other advertising data at any time. The step in block 1102 of allowing the profile or promotional criteria to be changed can be optional. Allowing a user to change coupon and advertisement selection criteria can produce better coupon and advertisement serving results. For example and without limitation, if a user or occupant in a vehicle desired to locate restaurants geographically close to the vehicle then the user or occupant could set the advertising server criteria to produce coupons and advertising data related to geographically local restaurants. Processing then moves to block 1104.

In block 1104 a user or an Internet server initiates data communication with an in-vehicle device 200. Data communications between an Internet based server and an in-vehicle device 200 can be a direct data communication between the server and the in-vehicle 200 or a data communication facilitated by way of a COM device 100, or an Internet appliance 322. Processing then moves to block 1106.

In block 1106 a record set of coupon and advertising data based on the results of a query can be data communicated to the in-vehicle device 200. Query result can be based in part on vehicle telemetry or metric data, vehicle GPS location data, promotional criteria, user preferences, or other coupon and advertising selection criteria. Processing then moves to block 1108.

Certain promotional offers may require authorization for distribution prior to data communication and display of the coupon or advertisement data on an in-vehicle device 200. In block 1108 if required such an authorization can be performed. The authorization process can include sending notification to the promoting company or promoter, or basing authorization approval on statistical data related to the advertisement. Statistical data related to the coupon or advertisement can include how many time the offer has been made, how many user's have responded, or other statistical based criteria. Processing then moves to block 1110.

In an exemplary embodiment an advertiser may desire to regulate the number of promotional offers made in a certain time period, or to a certain number of user's. Such advertisements for example and without limitation may be for a free car wash, or free children's meal at a local restaurant. In such an embodiment the step in block 1108 of authorizing the coupon or advertisement prior to extending an offer to a user can allow the advertiser to impose certain limitations or regulations on the availability, frequency, or other aspect of the promotion, coupon, or advertisement.

In block 1110 upon authorization for distribution of a promotion, coupon, or advertisement (if required) the promotion, coupon, or advertisement data is data communicated to each in-vehicle device 200. A specific promotion, coupon, or advertisement can be sent to single in-vehicle device 200 or to a plurality of in-vehicle device 200. Processing then moves to block 1112.

In block 1112 informational data can be recorded as to the number of in-vehicle device 200 that received and displayed the promotion, coupon, or advertisement. Such serving result data can include quantity of in-vehicle device 200 served for viewing, quantity of user's acknowledging the offer, and quantity of user's responding to the promotional, coupon, advertisement data, or otherwise acting on the offer. Processing then moves to block 1114.

In block 1114 as required charges are applied to the appropriate parties. The appropriate parties can include the advertiser, or the promoting company. In addition charges may be applied for fulfillment of the promotion or offer. Fulfillment of the promotion or offer can include printing coupons, delivery of data to the in-vehicle device 200, or other promotional fulfillment requirements. Processing then moves to block 1116.

In block 1116 as required updates to necessary databases are facilitated. Updates can include posting to user databases, posting to promotion databases for the purpose of keeping track of offers a user has received. In addition, statistical data related to an individual user, user responses, or other promotional statistics and metrics can be posted to the appropriate databases. Such databases can be Internet accessible and remotely locatable. The routine is then exited.

Figure 13:
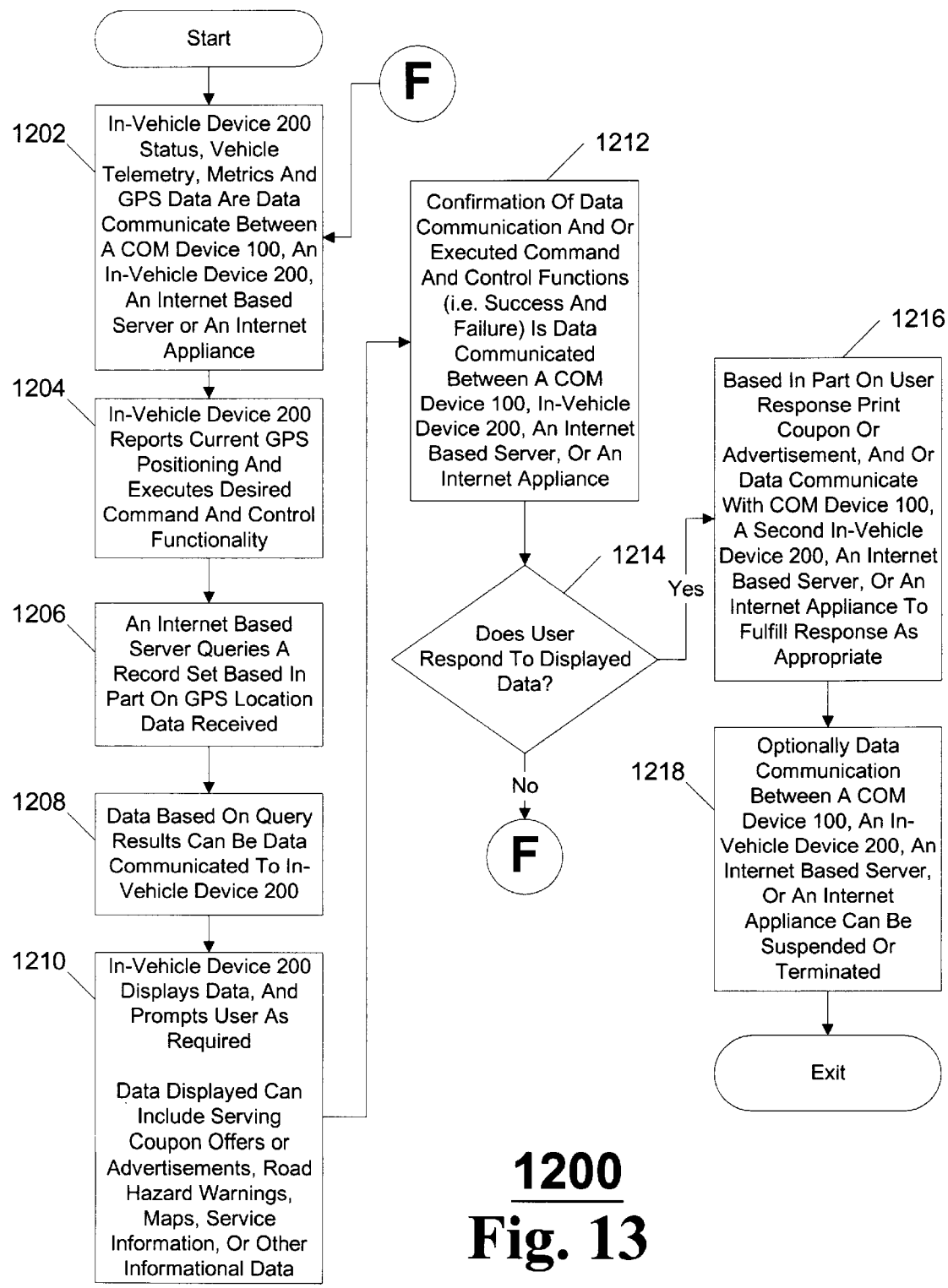
FIG. 13 shows a selection of digital informational content based in part on global positioning system telemetry data routine 1200 flowchart.

Referring to FIG. 13 there is shown a routine 1200 for the selection of digital content based in part on GPS telemetry. COM device 100, in-vehicle device 200, and various data processing resources cooperate together as a system to effectuate routine 1200. A selection of digital informational content based in part on GPS telemetry routine allows e-mail, electronic coupons, interactive advertising, road hazard warnings, maps, service information, or other e-business transactions and e-commerce transactions to be data communicated and transacted by way of an in-vehicle device 200. The selection of such data and transactions can be based in part on user preferences, server settings, vehicle telemetry or metrics, or GPS location data. Processing begins in block 1202.

In an exemplary embodiment an in-vehicle device 200 can data communicated GPS location data to an Internet based server. The Internet based server can consider user preferences, server settings and GPS location data when selecting digital informational content. Digital informational content can be selected by querying a database of coupons, maps, service information, traffic condition databases, or advertisements. Upon identifying appropriate informational content an Internet based server can data communicate such informational content to the in-vehicle device 200 for viewing and interaction by the occupants of the vehicle.

In this embodiment informational content can be selected based in part on GPS location data. GPS location data can facilitate the selection of geographically relevant content. For example and without limitation, restaurant, service centers, entertainment, shopping, hotels, maps, hazard warnings, and other local businesses can choose to run coupon specials and advertisements in vehicles that may be moving through the area. Roadside businesses can run discount offers in a vehicle equipped with an in-vehicle device 200 as it moves down a freeway approaching the roadside business.

In another exemplary embodiment electronic maps, and road hazard warnings can be data communicated to an in-vehicle device 200. In such an embodiment map data and road hazard warning data can effectively inform the occupants of a vehicle of impending road conditions. In addition, map data and road hazard warning data can be utilized to determine alternative routes, and aid in reducing traffic delays.

In block 1202 data related to in-vehicle device 200, vehicle telemetry and metrics, and GPS location data is data communicated between an in-vehicle device 200 and an Internet based server. Data communications between an Internet based server and an in-vehicle device 200 can be a direct data communication between the server and the in-vehicle device 200 or a data communication facilitated by way of a COM device 100, or an Internet appliance 322. Processing then moves to block 1204.

In block 1204 the in-vehicle device 200 data communicates GPS location data to an Internet based server. In addition, the in-vehicle device 200 can execute any command and control functionality. Such command and control functionally can be effectuated in accordance with FIG. 11, Internet based command and control routine 1000. Processing moves to block 1206.

In block 1206 an Internet based server or a computing resource accessible by way of an Internet based server queries a record set of data based in part on GPS location data communicated by the in-vehicle device 200. Results of a query can include restaurant, service centers, entertainment, shopping, hotels, maps, hazard warnings, and other local business information preferable geographically relevant based on GPS location data. Processing then moves to block 1208.

In block 1208 a record set of data based on the results of the query can be data communicated to the in-vehicle device 200. Processing then moves to block 1210.

In block 1210 the in-vehicle device 200 can display the data as appropriate and interactively prompt the user as required. Displayed data can include coupon offers, advertisements, road hazard warnings, map data, service information, or other informational data. Processing then moves to block 1212.

In block 1212 confirmation of any executed command or control functions or feature are data communicated between the in-vehicle device 200, a COM device 100, an Internet based server, or an Internet appliance. Processing then moves to decision block 1214.

In decision block 1214 a test is performed to determine if the user responded to the displayed data. Responding to the data can include voice acknowledgement, touching the touch screen, or other in-vehicle device 200 input. If the resultant is in the affirmative, that is the user responds to the displayed or annunciated data then processing moves to block 1216. If the resultant is in the negative, that is the user does not respond to the displayed or annunciated data then processing moves back to block 1202.

In block 1216 based in part on user response coupons or advertisement can be printed. Furthermore, the in-vehicle device 200 can data communicate with a COM device 100, an Internet based server, or an Internet appliance to fulfill the user's response as appropriate. Processing then moves to block 1218.

In block 1218 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Referring to FIG. 14 there is shown an Internet based vehicle tracking routine 1300. COM device 100, in-vehicle device 200, and various data processing resources cooperate together as a system to effectuate the vehicle tracking routine 1300. An Internet based vehicle tracking routine utilizes data communication between an in-vehicle device 200 and an Internet based server to track the geographic location of a vehicle. In addition to tracking the vehicle's geographic location, data communication between the in-vehicle device 200 and the Internet based server can allow for vehicle rate, telemetry, and other metric data to be monitored and tracked.

FIG. 14 shows two processing routines. The first routine begins in block 1302 and shows the steps an in-vehicle device 200 can utilize in effectuating an Internet based vehicle tracking routine. The second routine begins in block 1316 and shows the steps an Internet based server can utilize in effectuating an Internet based vehicle tracking routine. Processing begins in block 1302.

In an exemplary embodiment vehicle telemetry data, and GPS location data can be utilized in conjunction with an electronic map service to facilitate real time electronic trip tracking. In this embodiment GPS location data and other vehicle telemetry data can be used to illustrate vehicle movement on an electronic map. In addition, advertisements of local area business and other relevant geographic information can be served to the in-vehicle device 200 as the vehicle moves on its route through different areas.

In block 1302 data related to in-vehicle device 200, vehicle telemetry and metrics, and GPS location data is data communicated between an in-vehicle device 200 and an Internet based server. Data communications between an Internet based server and an in-vehicle device 200 can be a direct data communication between the server and the in-vehicle device 200 or a data communication facilitated by way of a COM device 100, or an Internet appliance 322. Processing then moves to block 1304.

In block 1304 the in-vehicle device 200 data communicates GPS location data to an Internet based server. In addition, the in-vehicle device 200 can execute any command and control functionality. Such command and control functionally can be effectuated in accordance with FIG. 11, Internet based command and control routine 1000. Processing moves to block 1306.

In block 1306 an Internet based server or a computing resource accessible by way of an Internet based server queries a record set of data based in part on GPS location data communicated by the in-vehicle device 200. Results of a query can include restaurant, service centers, entertainment, shopping, hotels, maps, hazard warnings, and other local business information preferable geographically relevant based on GPS location data. Processing then moves to block 1308.

In block 1308 a record set of data based on the results of the query can be data communicated to the in-vehicle device 200. Processing then moves to block 1310.

If desired in block 1310 a user can program trip metrics or other trip parameters. Trip programming can occur at an in-vehicle device 200 or other data processing device such as a PC 310, a PDA 324, a wireless phone 312, or a pager 326. Trip planning data can reside within an in-vehicle device 200 or reside on an Internet based server or an Internet accessible database. Processing then moves to block 1312.

If desired in block 1312 a user can present data, update data, or redeem awards related to loyalty programs. A loyalty program can be a frequent traveling program, or other points or miles type program. Processing then moves to block 1314.

In an exemplary embodiment an in-vehicle device 200 can data communicate with an Internet based server for the purpose of recording vehicle telemetry such as total miles driven. Promotional offers and other awards can be offered based on the total amount of accrued points or miles.

In block 1314 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Processing in block 1316 begins an Internet based server routine. For effectuating Internet based vehicle tracking. The server side of the Internet based vehicle tracking routine handles data communication from a plurality of in-vehicle device 200.

In block 1316 a COM device 100, a second in-vehicle device 200, an Internet based server, or an Internet appliance initiates data communication with a specific in-vehicle device 200. Processing moves to block 1318.

In block 1318 the data communication between the specific in-vehicle device 200 and the Internet server can include vehicle telemetry data, vehicle metrics, GPS location data, and other related data. The received data communication from the in-vehicle device 200 can be handle in a plurality of ways by the Internet based server. Handling data communications at the server can include processing the data, saving the data in a database, forwarding the data to a second server or database, updating a database, producing return data to the in-vehicle device 200, or otherwise processing, saving or data communicating with other data processing resources. Processing then moves to block 1320.

In block 1320 if desired data communication between the in-vehicle device 200 and the Internet based server can be logged. The routine is then exited.

Figure 15A:
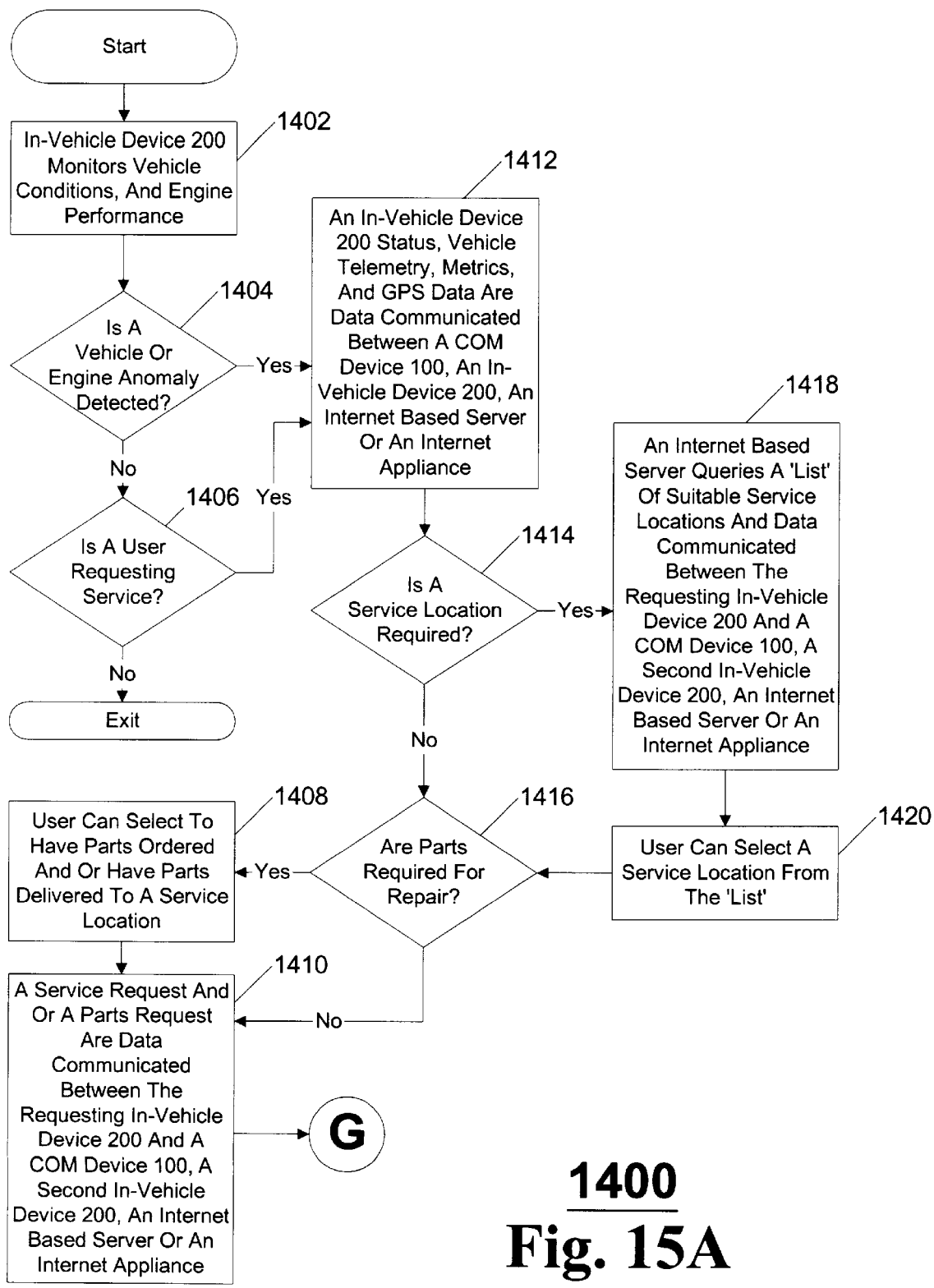
FIGS. 15A–15B show a vehicle maintenance routine 1400 flowchart.
Figure 15B:
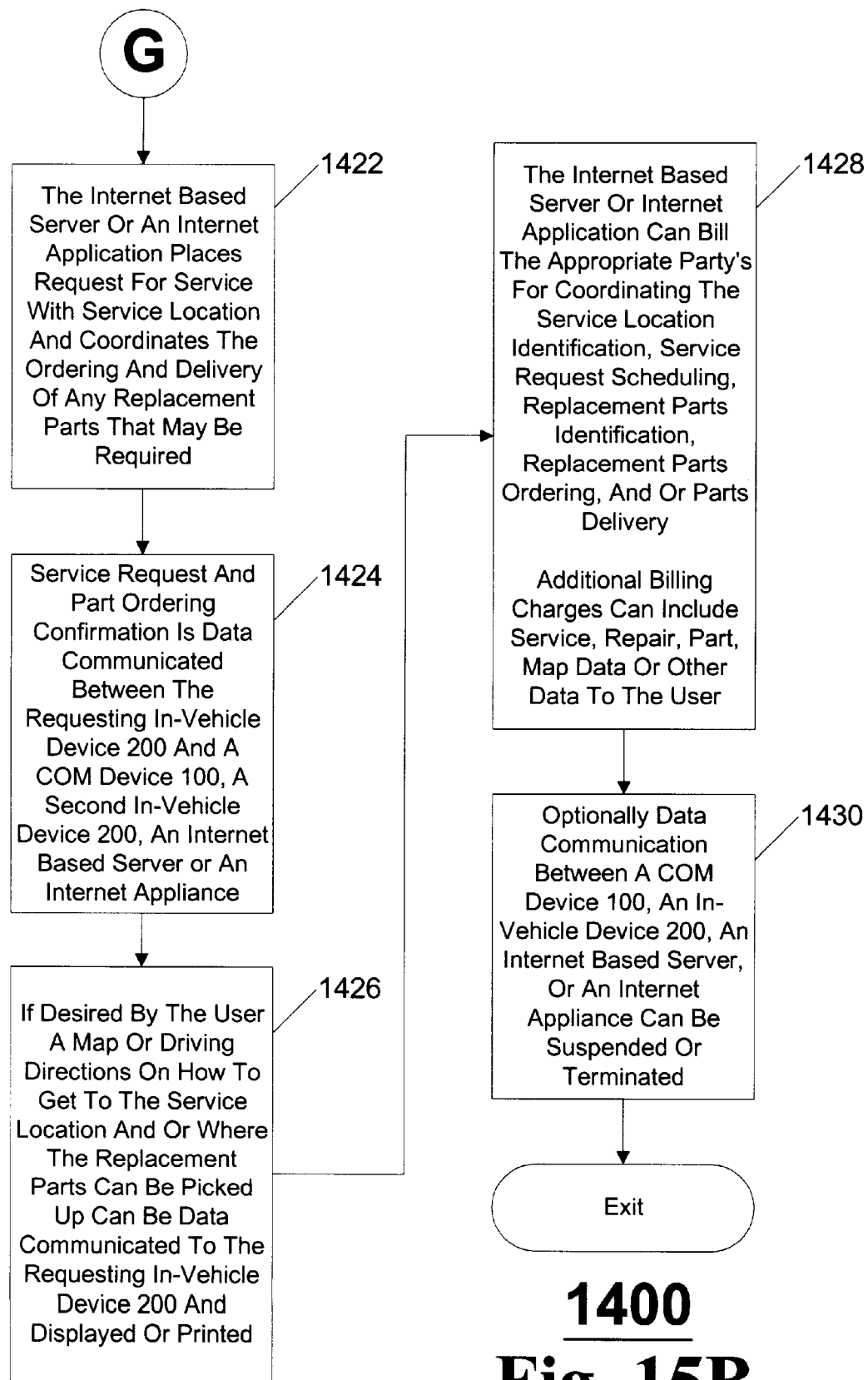

Referring to FIGS. 15A and 15B there is shown a vehicle maintenance routine 1400. COM device 100, in-vehicle device 200, and various data processing resources cooperate together as a system to effectuate vehicle maintenance routine 1400. A vehicle maintenance routine allows an in-vehicle device 200 or a user to determine that the vehicle requires service. Once a service request is initiated a data communication to an Internet based server can locate if required the closest service center, or the availability of necessary replacement parts. In the case a service center or replacement parts are required a user can initiate scheduling of service at a service center, or scheduling delivery of, if required, replacement parts from the in-vehicle device 200.

In addition, map or other informational data related to the location of the service center, or location of replacement parts, or other service resources can be data communicated to the in-vehicle device 200. Processing begins in block 1402.

In block 1402 an in-vehicle device 200 monitors vehicle operational condition and engine performance. Processing then moves to decision block 1404.

In decision block 1404 a determination is made with respect to detecting vehicle or engine performance anomalies. If the resultant is in the affirmative, that is a vehicle or engine anomaly is detected then processing moves to block 1412. If the resultant is in the negative, that is a vehicle or engine anomaly is not detected then processing moves to decision block 1406.

In decision block 1406 a determination is made with respect to whether a user is requesting service. If the resultant is in the affirmative, that is a user is requesting service then processing moves to block 1412. If the resultant is in the negative, that is a user is not requesting service then the routine is exited.

In block 1412 data related to in-vehicle device 200, vehicle telemetry and metrics, and GPS location data is data communicated between an in-vehicle device 200 and an Internet based server. Data communications between an Internet based server and an in-vehicle device 200 can be a direct data communication between the server and the in-vehicle device 200 or a data communication facilitated by way of a COM device 100, or an Internet appliance 322. Processing then moves to decision block 1414.

In decision block 1414 a determination is made with respect to whether a service center location is required. The determination can be based on user input, in-vehicle 200 programming, or server settings. If the resultant is in the affirmative, that is a service center location is required then processing moves to block 1418. If the resultant is in the negative, that is a service center location is not required then processing moves to decision block 1416.

In block 1418 an Internet based server having received data communication from the service requesting in-vehicle device 200 queries a list of suitable service center locations. Such a service center location list can be based in part on the type of service required, or the make or model of the vehicle, GPS location data, or other user preferences or server settings.

The list of suitable service location can be data communicated to the in-vehicle device 200 requesting service. Data communications between an Internet based server and the in-vehicle device 200 requesting service can be a direct data communication between the server and the in-vehicle device 200 or a data communication facilitated by way of a COM device 100, or an Internet appliance 322. Processing then moves to block 1420.

In block 1420 a user can select from the list of suitable service center locations a specific service center in which to obtain vehicle service. Processing then moves to decision block 1416.

In decision block 1416 a determination is made with respect to whether part(s) are required to effectuate the repair. If the resultant is in the affirmative, that is part(s) are required to effectuate the repair then processing moves to block 1408. If the resultant is in the negative or the resultant can not be determined with the available information processing then moves to block 1410.

In block 1408 the user can select to have the repair part(s) ordered or delivered to the service location. The ordering of part(s) can be directly from the service center, from a local auto parts store, or from an online store such as PARTS.COM, WRENCHEAD.COM, CARPARTS.COM, other part suppliers, or from other part databases. Processing then moves to block 1410.

In block 1410 if required a service request or part(s) request can be data communicated between the Internet based server and the requesting in-vehicle device 200. Data communications between an Internet based server and an in-vehicle device 200 can be a direct data communication between the server and the in-vehicle device 200 or a data communication facilitated by way of a COM device 100, or an Internet appliance 322. Processing then moves to block 1422.

In block 1422 the Internet based server or Internet application server having received the service or part(s) request places the order as required. Placing the orders can include scheduling service with the appropriate service center, and ordering or scheduling the delivery of repair part(s) to effectuate the repair. Service and parts ordering can be by way of e-business or e-commerce transactions online or by way of intervention of a customer service or help desk support center. Processing then moves to block 1424.

In block 1424 confirmation that the Internet based server has received the service or part(s) request and subsequently has placed the appropriate orders can be data communicated to the in-vehicle device 200 requesting confirmation. Processing then moves to block 1426.

In block 1426 if desired by the user an electronic map or driving directions on how to get to the service center or repair part pick-up location can be data communicated to the service requesting in-vehicle device 200. Such data can be displayed or printed as required by the user. Processing then moves to block 1428.

In block 1428 the Internet based server or Internet application server can bill as appropriate the parties involved in the service request transaction. The appropriate parties and schedule of billing fees can include licensing fees, royalties, fees for coordinating and identifying the service center location, fees for scheduling the service request, fees for identifying replacement part(s) and replacement parts location, and or fees coordinating replacement part(s) delivery. In addition, a schedule of billing charges can include a percentage of the service center charge, a percentage of the repair cost, a percentage of the repair part cost, or for serving map and other informational data. A user can be billed by way of credit card, or through in-vehicle device 200 network service contract arrangement, or through other appropriate billing arrangements. Processing then moves to block 1430.

In block 1430 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 16:
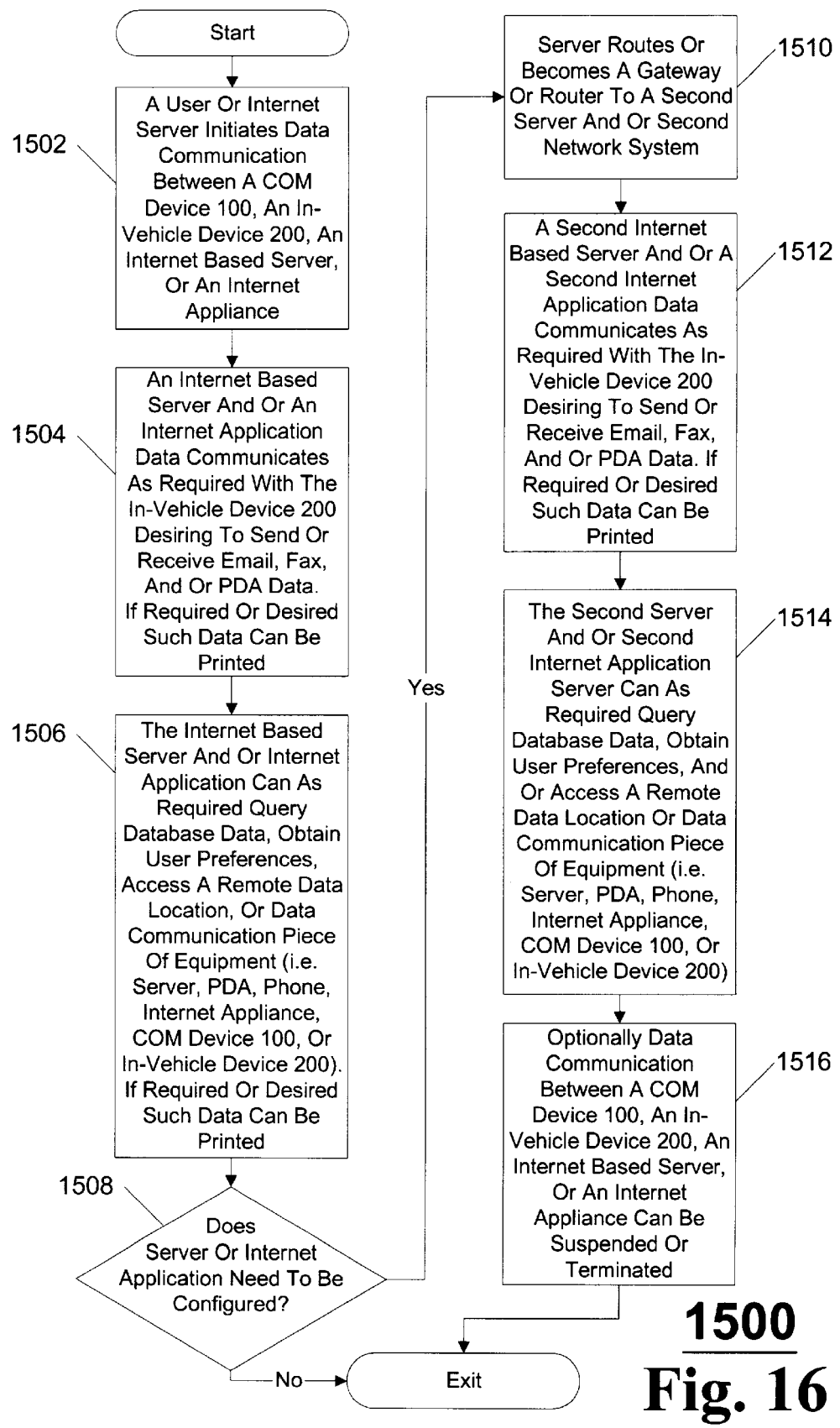
FIG. 16 shows an e-mail, facsimile, and personal data assistant communication routine 1500 flowchart.

Referring to FIG. 16 there is shown an e-mail, facsimile, and personal data assistant communication (PDA) routine 1500. COM device 100, in-vehicle device 200, and various data processing resources cooperate together as a system to effectuate routine 1500. An e-mail, facsimile, and personal data assistant (PDA) communication routine can effectuate the sending and receiving of e-mail, facsimile, and PDA data between an in-vehicle device 200 and an Internet based data processing resource. Processing begins in block 1502.

In block 1502 a user or an Internet server initiates data communication with an in-vehicle device 200. Data communication between an Internet based server and an in-vehicle device 200 can be a direct data communication between the server and the in-vehicle device 200 or a data communication facilitated by way of a COM device 100, or an Internet appliance 322. Processing then moves to block 1504.

In block 1504 an Internet based server or Internet application server can data communicate with the in-vehicle device 200 desiring to send an e-mail, facsimile, or PDA data. E-mail, facsimile data, PDA data, or other data can be data communicated between the in-vehicle device 200 and the Internet server or Internet application server. If required or desired e-mail, facsimile data, PDA data, and other data can be printed. Processing then moves to block 1506.

In block 1506 an Internet based server or Internet application server can as required query a database, obtain user preferences, access a remote data location, or data communicate with a data communicating piece of equipment. A data communicating piece of equipment can include a server, PDA, phone, Internet appliance, a COM device 100, a specific in-vehicle device 200. If required or desired e-mail, facsimile data, PDA data, and other data can be printed. Processing then moves to decision block 1508.

In decision block 1508 a determination is made as to whether the Internet server, or Internet application server needs to be configured as a gateway or router. If the resultant is in the affirmative, that is the Internet server, or Internet application server needs to be configured as a gateway or router then processing moves to block 1510. If the resultant is in the negative, that is the Internet server, or Internet application server does not need to be configured as a gateway or router then the routine is exited.

In an exemplary embodiment when an e-mail server destination, facsimile data destination, PDA data destination, or other data destination can not be directly reached an Internet server or Internet application server can receive and cache the data transmission or in real time redirect the data transmission. The Internet server or Internet application server can also be configured as a gateway or router to a second server or second network system. The second server or second network system can contain the data destination. In such an embodiment the Internet server or Internet application server can be configured as a gateway or router and redirect the data transmission to a second Internet server or Internet application server. Delivery of the data to the intended data destination can be effectuated by a second server or Internet application server.

In block 1510 the Internet server or Internet application server can be configured to as a gateway or router to a second server or second network system. Processing then moves to block 1512.

In block 1512 a second server or a second Internet application server can data communicate with the in-vehicle device 200 desiring to send and receive e-mail, facsimile, or PDA data. E-mail, facsimile data, PDA data, or other data can be data communicated between the in-vehicle device 200 and the Internet server or Internet application server. If required or desired e-mail, facsimile data, PDA data, and other data can be printed. Processing then moves to block 1514.

In block 1514 a second server or a second Internet application server can as required query a database, obtain user preferences, access a remote data location, or data communicate with a data communicating piece of equipment. A data communicating piece of equipment can include a server, PDA, phone, Internet appliance, a COM device 100, or a specific in-vehicle device 200. If required or desired e-mail, facsimile data, PDA data, and other data can be printed. Processing then moves to decision block 1516.

In block 1516 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 17:
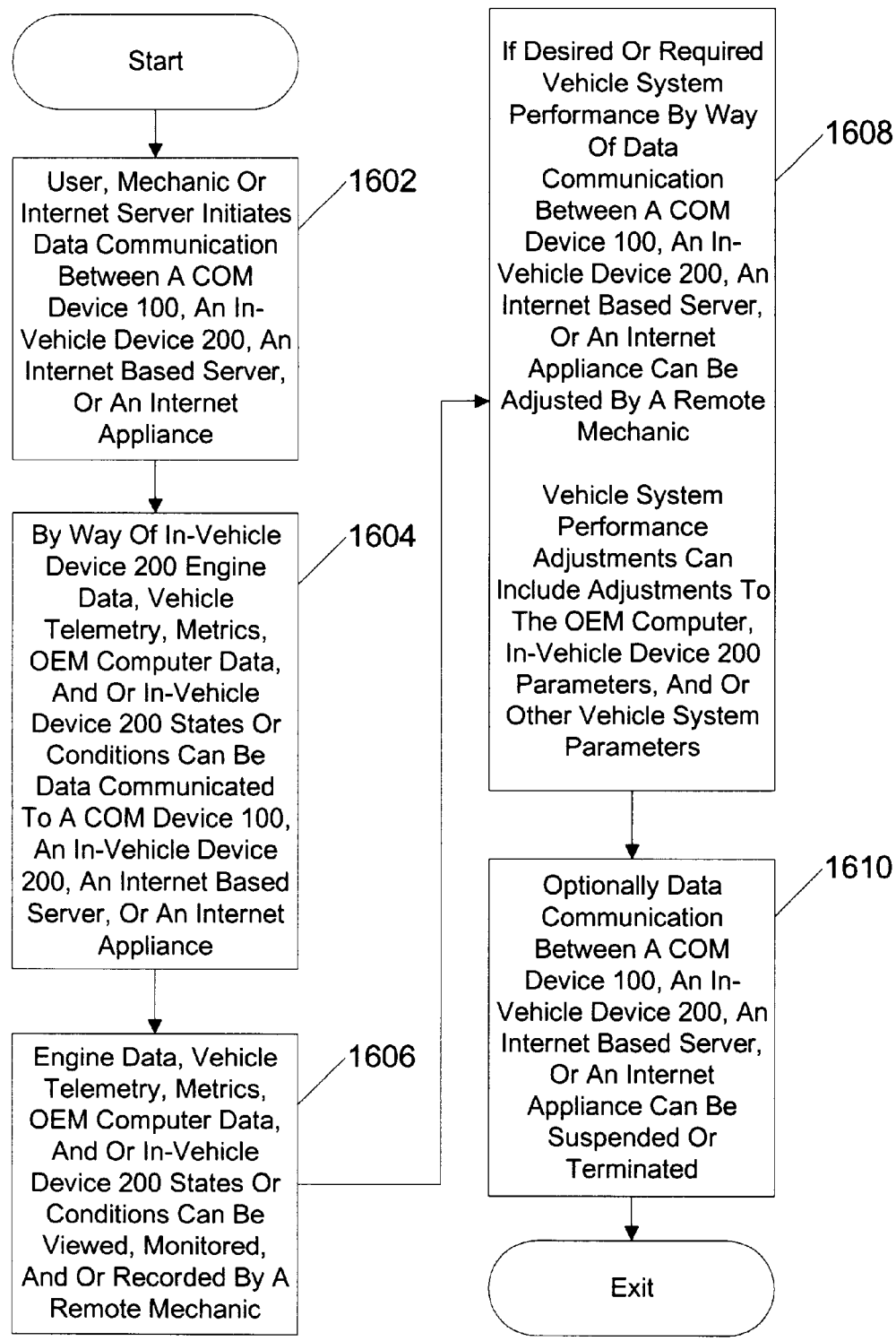
FIG. 17 shows an Internet based remote vehicle diagnostic routine 1600 flowchart.

Referring to FIG. 17 there is shown an Internet based remote vehicle diagnostic routine 1600. An Internet based remote vehicle diagnostic routine can be utilized to remotely analyze vehicle engine performance. COM device 100, in-vehicle device 200, and various data processing resources cooperate together as a system to effectuate a remote vehicle diagnostic routine 1600. Processing begins in block 1602.

In an exemplary embodiment a remote mechanic can by way of a data communication between an in-vehicle device 200 and an Internet data processing resource monitor and analyze vehicle engine performance. In addition, certain remote adjustments can be made by data communicating such adjustment requests to the in-vehicle device 200. As required the in-vehicle device 200 can by way of the interface to the vehicle engine control system 210 data communicate or effectuate the requested adjustments.

In block 1602 a user or an Internet server initiates data communication with an in-vehicle device 200. Data communication between an Internet based server and an in-vehicle device 200 can be a direct data communication between the server and the in-vehicle 200 or a data communication facilitated by way of a COM device 100, or an Internet appliance 322. Processing then moves to block 1604.

In block 1604 an in-vehicle device 200 data communicates engine data, vehicle telemetry and metric data, or original equipment manufacture (OEM) control system data. In addition, data from the in-vehicle device 200 can include status, conditions, or other data. Processing then moves to block 1606.

In block 1606 data received at the Internet based server can be viewed, monitored, recorded, or otherwise be utilized to analyze the operation of the vehicle interconnected with the specific in-vehicle device 200. Data received can include engine data, vehicle telemetry and metric data, or OEM vehicle control system data. In addition, data from the in-vehicle device 200 can include status, conditions, or other data. Processing then moves to block 1608.

In block 1608 if required or desired certain adjustable parameters within or accessible by the in-vehicle device 200, or within the OEM vehicle control system can be adjusted. Adjustable parameters can include fuel mixture, engine settings, idle RPM, and other in-vehicle device 200, or vehicle engine adjustable parameters. Processing then moves to block 1610.

In block 1610 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 18:
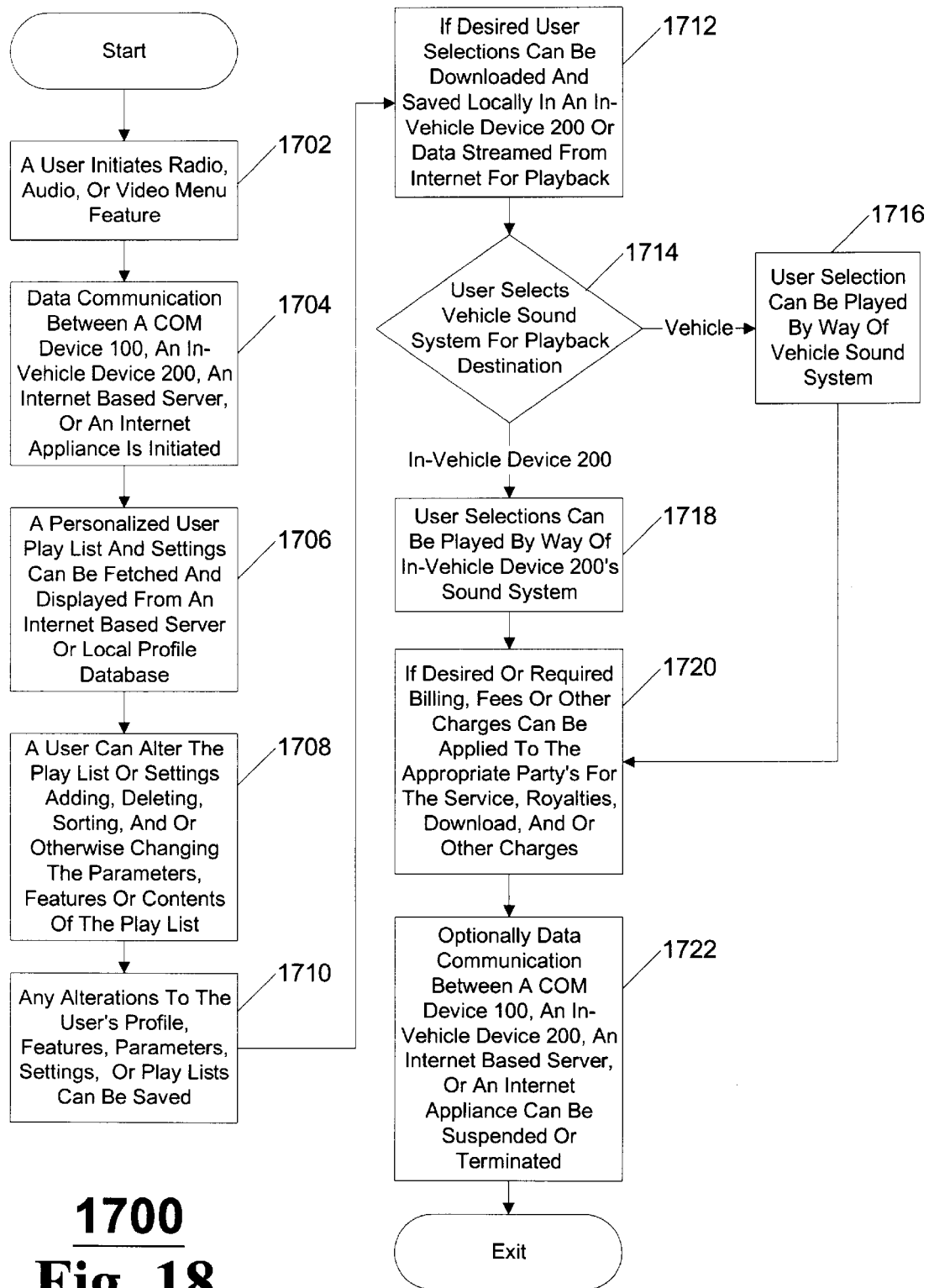
FIG. 18 shows an Internet based audio and video server routine 1700 flowchart.

Referring to FIG. 18 there is shown an Internet based audio and video server routine 1700. COM device 100, in-vehicle device 200, and various data processing resources cooperate together as a system to effectuate routine 1700. An Internet based audio and video server routine allows a user to select music and video. Music and video can be selected at an in-vehicle device 200. A menu system can allow a user to selectively download or stream the audio and video data for storage or playback. Processing begins in block 1702.

In block 1702 a user initiates the in-vehicle device 200 radio, audio, or video menu feature. Such a feature allows a user to select radio, audio, or video programming to selectively download, store, or playback. Processing then moves to block 1704.

In block 1704 data communication between an Internet based server and an in-vehicle device 200 can be initiated. Data communication between an Internet based server and an in-vehicle device 200 can be a direct data communication between the server and the in-vehicle device 200 or a data communication facilitated by way of a COM device 100, or an Internet appliance 322. Processing then moves to block 1706.

In block 1706 a personalized user play list and settings can be fetched and displayed from an Internet based server, or fetched from a local profile data within an in-vehicle device 200. Processing then moves to block 1708.

In block 1708 a user can alter the play list or settings. Altering the play list or settings can include adding, deleting, sorting, or otherwise changing the parameters, features, or content of the play list. Processing then moves to block 1710.

In block 1710 any alterations to a user's profile, features, parameters, settings, or play list can be saved. Saving can include saving the user's profile, features, parameters, settings, or play list on an Internet based server, or saving the user's profile, features, parameters, settings, or play list within an in-vehicle device 200. Processing then moves to block 1712.

In block 1712 if desired a user's radio, music, or video selections can be downloaded and saved locally within an in-vehicle device 200. Alternatively, a user's selection can be streamed from the Internet for playback, and optionally saved (while being streamed) within an in-vehicle device 200. Processing then moves to decision block 1714.

In decision block 1714 a determination is made as to whether a user's selections will be played by way of the in-vehicle device 200 sound system or by way of the vehicle's sound system. If the resultant is in the affirmative, that is a user selects to have the playback sent to the vehicle's sound system then processing moves to block 1716. If the resultant is in the negative, that is the user selects to have the playback sent to the in-vehicle device 200 sound system then processing moves to block 1718.

In block 1716 the user's selections can be played by way of the vehicle's sound system. Radio, music, video, or other data can be communicated to the vehicle's sound system by way of the vehicle radio interface 248. Processing then moves to block 1720.

In block 1718 the user's selections can be played by way of the in-vehicle device 200 sound system. Processing then moves to block 1720.

In block 1720 if desired or required billing, fees, or other charges can be applied to the appropriate party's including the user, or advertisers for the service, royalties, download, or for other appropriate reasons. A user can be billed by way of credit card, or through in-vehicle device 200 network service contract arrangement, or through other appropriate billing arrangements. Processing then moves to block 1722.

In block 1722 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 19:
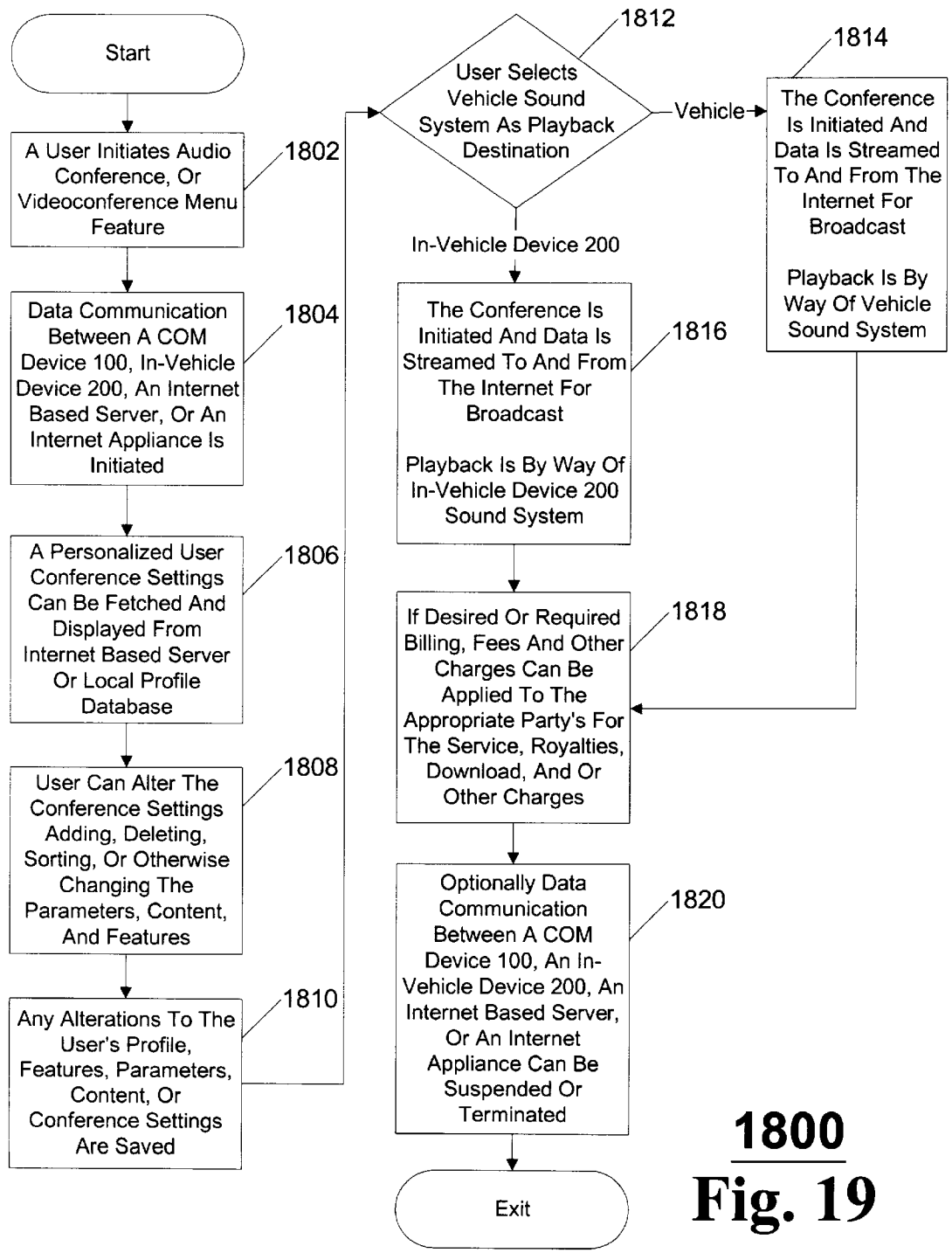
FIG. 19 shows an Internet based vehicle audio and videoconferencing routine 1800 flowchart.

Referring to FIG. 19 there is shown an Internet based audio and videoconferencing routine 1800. COM device 100, in-vehicle device 200, and various data processing resources cooperate together as a system to effectuate routine 1800. An Internet based audio and videoconferencing routine 1800 allows a user to conduct audio and videoconferencing by way of a plurality of in-vehicle device 200 and a plurality of other data processing resources. Processing begins in block 1802.

In block 1802 a user initiates the in-vehicle device 200 audio conferencing or videoconferencing menu feature. Such a feature allows a user to initiate and conduct audio conferencing and or videoconferencing between an in-vehicle device 200 and a plurality of other data processing resources. A plurality of other data processing resources can include a plurality of in-vehicle device 200, an Internet based server, an Internet based application server, a COM device 100, or an Internet appliance. In addition, a plurality of data processing resources can include, a wireless phone, a PDA, a pager, a PC 310, and other types and styles of data processing resources Internet or non-Internet based. Processing then moves to block 1804.

In block 1804 data communication between an Internet based server and an in-vehicle device 200 can be initiated.

Data communication between an Internet based server and an in-vehicle device 200 can be a direct data communication between the server and the in-vehicle 200 or a data communication facilitated by way of a COM device 100, or an Internet appliance 322. Processing then moves to block 1806.

In block 1806 a personalized user conference list and settings can be fetched and displayed from an Internet based server, or fetched from local profile data within an in-vehicle device 200. Processing then moves to block 1808.

In block 1808 a user can alter the conference list or settings. Altering the conference list or settings can include adding, deleting, sorting, or otherwise changing the parameters, features, or content of the conference list. Processing then moves to block 1810.

In block 1810 any alterations to a user's profile, features, parameters, settings, or conference list can be saved. Saving can include saving the user's profile, features, parameters, settings, or conference list on an Internet based server, or saving the user's profile, features, parameters, settings, or conference list within an in-vehicle device 200. Processing then moves to decision block 1812.

In decision block 1812 a determination is made as to whether a user's audio or videoconference (audio portion of videoconference) will be played by way of the in-vehicle device 200 sound system or by way of the vehicle's sound system. If the resultant is in the affirmative, that is a user selects to have the playback sent to the vehicle's sound system then processing moves to block 1814. If the resultant is in the negative, that is the user selects to have the playback sent to the in-vehicle device 200 sound system then processing moves to block 1816.

In block 1814 the user's audio or video (audio portion of videoconference) can be played by way of the vehicle's sound system. Audio conference or (audio portion of videoconference) conference, or other data can be communicated to the vehicle's sound system by way of the vehicle radio interface 248. Processing then moves to block 1816.

In block 1816 the user's selections can be played by way of the in-vehicle device 200 sound system. Processing then moves to block 1818.

In block 1818 if desired or required billing, fees, or other charges can be applied to the appropriate party's including the user, or advertisers for the service, royalties, download, or for other appropriate reasons. A user can be billed by way of credit card, or through in-vehicle device 200 network service contract arrangement, or through other appropriate billing arrangements. Processing then moves to block 1818.

In block 1820 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

Figure 20:
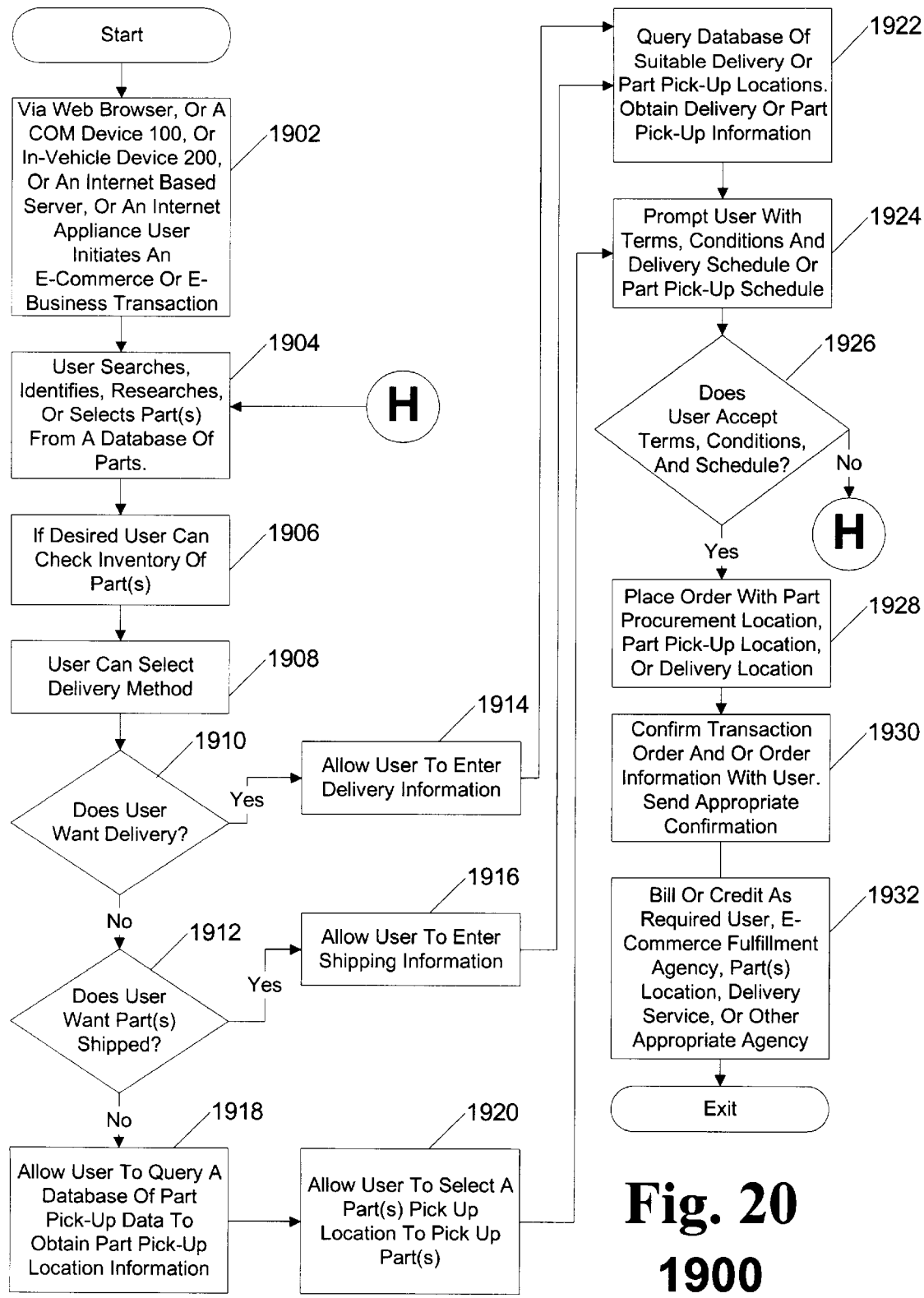
FIG. 20 shows an online part ordering and delivery routine 1900 flowchart.

Referring to FIG. 20 there is shown an online part ordering and delivery routine 1900. COM device 100, in-vehicle device 200, and various data processing resources cooperate together as a system to effectuate routine 1900. An online part ordering and delivery routine allows a user to initiate a part order and arrange for part delivery by utilizing a web browser, a COM device 100, an in-vehicle device 200, an Internet based server, or an Internet appliance. Processing begins in block 1902.

In block 1902 a user by way of a web browser, a COM device 100, an in-vehicle device 200, an Internet based server, or an Internet appliance. Can initiate an e-commerce or e-business transaction. Such an e-commerce or e-business transaction can include searching for a part or information, identifying a part, researching parts, ordering parts, buying parts, or arranging for shipping or delivery parts or information. Processing then moves to block 1904.

In block 1904 a user can search for part(s) information, identify part(s), research part(s), or select part(s). Processing then moves to block 1906.

In block 1906 if desired a user can check inventory of the selected parts. Processing then moves to block 1908.

In block 1908 a user can select the preferred part(s) delivery method. Such part(s) delivery methods can include traditional shipping methods, courier services, or other part delivery methods. In addition, a user can arrange to pick-up the part from a part pick-up location. Processing then moves to decision block 1910.

In decision block 1910 a determination is made whether the user wants the selected part(s) delivered. If the resultant is in the affirmative, that is the user wants the selected part(s) delivered then processing moves to block 1914. If the resultant is in the negative, that is the user does not want the selected part(s) delivered then processing moves to decision block 1912.

In block 1914 a user is allowed to enter delivery information including a delivery address, and or other types of delivery information. Processing then moves to block 1922.

In decision block 1912 a determination is made whether the user wants the selected part(s) shipped. If the resultant is in the affirmative, that is the user wants the selected part(s) shipped then processing moves to block 1916. If the resultant is in the negative, that is the user does not want the selected part(s) shipped then processing moves to decision block 1918.

In block 1916 a user is allowed to enter shipping information including a shipping address, shipping method, and or other types of shipping information. Processing then moves to block 1922.

In block 1918 a user can query a database of part pick-up information. Part pick-up information can include part pick-up locations, and other part pick-up information. Processing then moves to block 1920.

In block 1920 a user can select a preferred location to pick-up parts from a list of part pick-up locations queried in block 1920. Processing then moves to block 1924.

In block 1922 a database of suitable delivery information can be queried. Queried information can include delivery location, and other type of delivery information. Processing then moves to block 1924.

In block 1924 information obtained from a pick-up location query, or a delivery location query can be data communicated to an in-vehicle device 200 requesting such information. The in-vehicle device 200 can display the information and can allow the user to respond. Processing then moves to decision block 1926.

In decision block 1926 a determination is made whether a user by way of an in-vehicle device 200 accepts purchase terms, conditions, and delivery or shipping schedule terms. If the resultant is in the affirmative, that is the user affirmatively accepts the terms and conditions then processing moves to block 1928. If the resultant is in the negative, that is the user does not affirmatively accept the term and conditions then processing moves to block 1904.

In block 1928 the e-commerce or e-business transaction is completed and an order with the appropriate part procurement location(s), appropriate part pick-up location(s), and or appropriate part delivery location(s). Processing then moves to block 1930.

In block 1930 a confirmation that the e-commerce or e-business transaction has been ordered and is complete can be data communicated to the requesting in-vehicle device 200. In addition, a sales or order confirmation can also be data communicated to the requesting in-vehicle device 200, stored in a database, or otherwise data processed. Processing then moves to block 1932.

In block 1932 as required the user, e-commerce fulfillment agency, part(s) location, delivery service, and or other appropriate agencies can be billed or credited. A user can be billed by way of credit card, or through in-vehicle device 200 network service contract arrangement, or through other appropriate billing arrangements. The routine is then exited.

Figure 21:
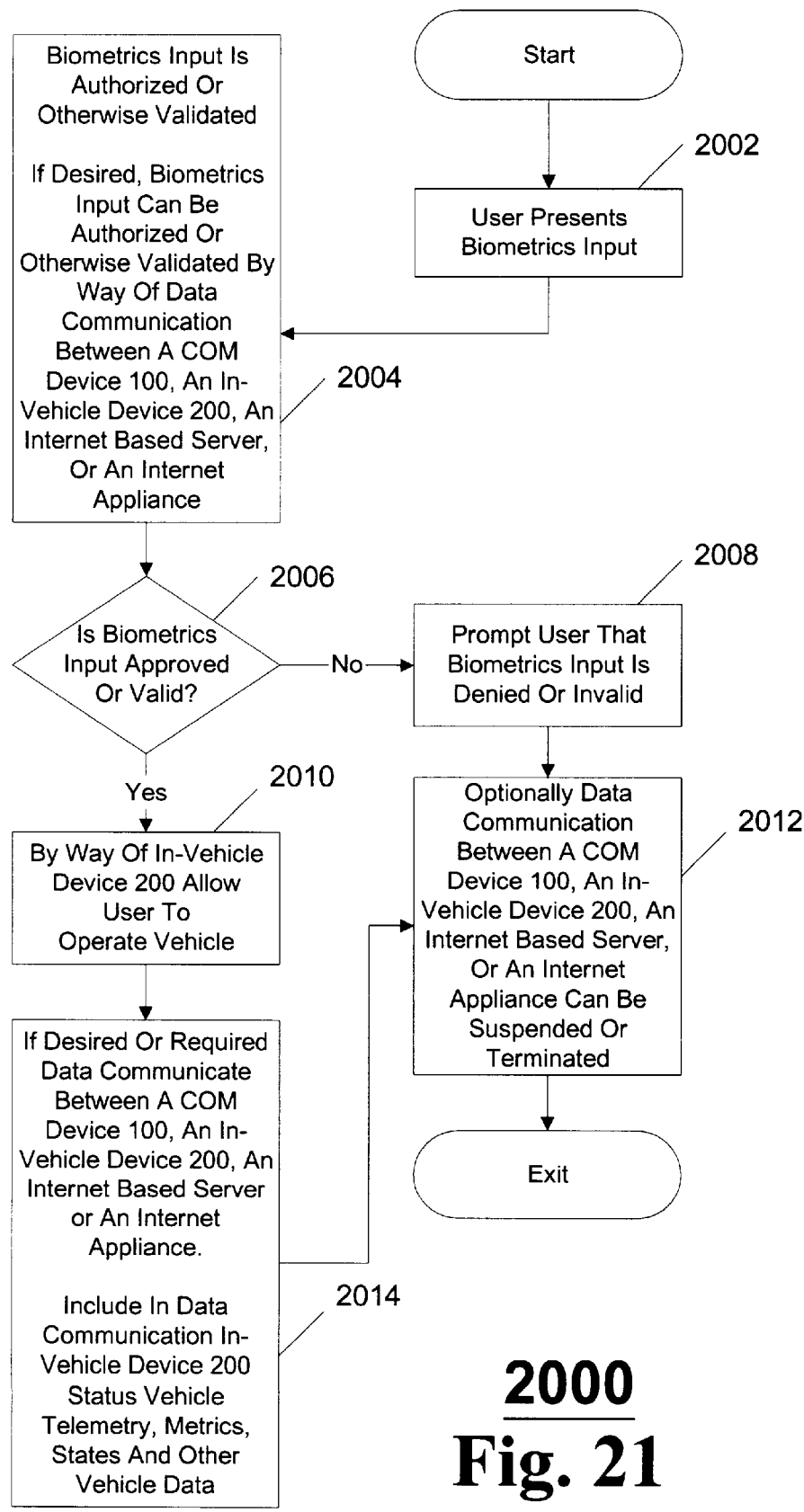
FIG. 21 shows a biometric authorization routine 2000 flowchart.

Referring to FIG. 21 there is shown a biometric authorization routine 2000. COM device 100, in-vehicle device 200, and various data processing resources cooperate together as a system to effectuate routine 2000. A biometric authorization routine requires a user to present valid biometric input to be authorized before operation of the vehicle and systems in the vehicle are enabled for use. Biometric input can include palm, hand, finger, eye (iris scan), voice and voice commands, or other biometric input data. Processing begins in block 2002.

In block 2002 a user presents biometric input. Biometric input can be present by way of the biometric input interface 280. Processing then moves to block 2004.

In block 2004 the biometric input is authorized or otherwise validated locally or remotely. If remote authorization or validation is desired, the biometric input can be data communicated between an Internet based server and the in-vehicle device 200. Data communications between an Internet based server and an in-vehicle device 200 can be a direct data communication between the server and the in-vehicle 200 or a data communication facilitated by way of a COM device 100, or an Internet appliance 322. Processing then moves to decision block 2006.

In block 2006 a determination is made as to whether the biometric input presented by the user is approved or valid. If the resultant is in the affirmative, that is the biometric input presented is approved and or validated then processing moves to block 2010. If the resultant is in the negative, that is the biometric input presented is not approved and or validated then processing moves to block 2008. Approval or validity results can be data communicated from an Internet based server if required.

In block 2008 the user can be prompted that the biometric input has been denied or is invalid. Processing then moves to block 2012.

In block 2010 by way of the in-vehicle device 200 the vehicle and the system associated with the vehicle are enabled for use. Processing then move to block 2014.

In block 2014 if desired or required an in-vehicle device 200 can data communicate engine data, vehicle telemetry and metric data, states, original equipment manufacture (OEM) control system data, or other vehicle data. In addition, data from the in-vehicle device 200 can include status, conditions, or other data. Processing then moves to block 2012.

In block 2012 data communication can be optionally suspended or terminated between a COM device 100, an in-vehicle device 200, a specific in-vehicle device 200, an Internet based server, or an Internet appliance. Data communication suspension or termination can be desirable where the cost of communications, the availability of communications, or the option not to maintain data communications is desirable. The routine is then exited.

While this invention has been described with reference to specific embodiments, it is not necessarily limited thereto. Accordingly, the appended claims should be construed to encompass not only those forms and embodiments of the invention specifically described above, but to such other forms and embodiments, as may be devised by those skilled in the art without departing from its true spirit and scope.

What is claimed is:

1. A system for wirelessly collecting a plurality of data associated with a vehicle and for using collected said plurality of data to query a plurality of databases, or a plurality of global network based data processing resources for the purpose of servicing said vehicle, including determining automotive replacement parts for said vehicle comprising:

an in-vehicle device interconnected with said vehicle, said in-vehicle device having a vehicle engine control system interface for interfacing said in-vehicle device to said vehicle engine control system wherein, said in-vehicle device monitors said vehicle engine, said in-vehicle device having a wireless transceiver for wirelessly data communicating between said in-vehicle device and a plurality of data communicating devices; and a communication interface device for data communicating wirelessly with a plurality of data communicating devices, and for receiving said plurality of data from said in-vehicle device, said communication interface device having a data communication connection with a personal computer, said communication interface device is an Internet appliance;

wherein, said plurality of databases are accessible by said communication interface device, or accessible by said personal computer;

wherein said vehicle by way of said in-vehicle device data communicates said plurality of data to said communication interface device for the purpose of accessing and querying results from said plurality of databases or from said global network based data processing resources, and for associating said plurality of data with a plurality of data elements and storing the result in a database.

2. The system in accordance with claim 1 wherein, said in-vehicle device further comprises:

a vehicle monitor and metering interface for measuring or monitoring vehicle telemetry data and vehicle metric data wherein, said in-vehicle device can by way of said wireless transceiver data communicate vehicle engine status to said communication interface device, and a plurality of global network based data processing resources.

3. The system in accordance with claim 2 wherein, said vehicle monitor and metering interface further comprises at least one of the following:

an accelerometer for measuring or monitoring said vehicle acceleration changes;

a tachometer for measuring or monitoring said vehicle velocity; or an odometer for measuring and monitoring said vehicle travel distance.

4. The system in accordance with claim 1 wherein, said in-vehicle device further comprises:

a vehicle radio interface for interconnecting said in-vehicle device to a vehicle radio wherein, said vehicle radio interface communicates analog and digital signals between said in-vehicle device and said vehicle radio, said vehicle radio can by way of said vehicle radio interface data communicate with said communication interface device, and said plurality of global network based data processing resources.

5. The system in accordance with claim 4 wherein, said vehicle radio can by way of said vehicle radio interface data communicate with said plurality of global network based data processing resources, such data communication can include monitoring of radio station selections, or listening content, or effectuating download and broadcast of digital content from said plurality of global network based data processing resources.

6. The system in accordance with claim 1 wherein, said in-vehicle device further comprises:
an alarm system interface for monitoring vehicle security status wherein, said in-vehicle device can by way of said wireless transceiver data communicate vehicle security status to said communication interface device, and said plurality of global network based data processing resources, wherein such data communication between said in-vehicle device can include command and control instructions to start, stop, enable or disable said vehicle engine.

7. The system in accordance with claim 1 wherein, said in-vehicle device further comprises:
a personal data assistant interface for data communicating between said in-vehicle device and a personal data assistant device.

8. The system in accordance with claim 7 wherein, said personal data assistant interface supports a plurality of communication protocols and standards including WIRELESS APPLICATION PROTOCOL and standard, and BLUETOOTH compliant protocol and standard.

9. The system in accordance with claim 1 wherein, said in-vehicle device further comprises:
a user interface including a display, and a microphone for enabling a user to issue voice commands to said in-vehicle device, and for enabling a user to access local data and remote data wherein, remote data can be located on said plurality of global network based data processing resources.

10. The system in accordance with claim 9 wherein, said in-vehicle device is located external to said vehicle passenger compartment area and said user interface is electrically tethered to said in-vehicle device, such that a user can interact with said user interface from within said vehicle passenger compartment area.

11. The system in accordance with claim 1 wherein, said in-vehicle device further comprises:
a global positioning receiver interface for data communicating global positioning data between said in-vehicle device and a plurality of global network based data processing resources.

12. The system in accordance with claim 1 wherein, said in-vehicle device is retrofitted into said vehicle, and said communication interface device is located external to said vehicle.

13. The system in accordance with claim 1 wherein, said communication interface device is located within or located in wireless proximity to an auto part store, or a vehicle dealership, or a vehicle manufacturer plant, or a vehicle service center.

14. The system in accordance with claim 1 wherein, said wireless transceiver supports a plurality of communication protocols and standards including WIRELESS APPLICATION PROTOCOL and standard, and BLUETOOTH compliant protocol and standard.

15. The system in accordance with claim 1 wherein, said wireless transceiver is a wireless modem, or a wireless phone transceiver.

16. The system in accordance with claim 1 wherein, said wireless transceiver is a programmable storage device, said programmable storage device being wired or wirelessly programmed with said plurality of data by said in-vehicle device and physically carried by a user, such that when said programmable storage device is in wireless proximity to said communication interface device said plurality of data is wirelessly data communicated from said programmable storage device to said communication interface device.

17. A method of servicing a vehicle by communicating a plurality of data wirelessly from said vehicle for the purpose of utilizing said plurality of data to determine a plurality of service recommendations, or a plurality of replacement part recommendations comprising the steps of:
a) receiving said plurality of data from an in-vehicle device wherein, said in-vehicle device is interconnected with said vehicle;
b) accessing a plurality of databases to obtain information related to said vehicle, said plurality of databases can include both a plurality of local databases, and a plurality of remote databases accessible by way of a global network;
c) determining said plurality of service recommendations, or said plurality of replacement part recommendations based on user preferences, said plurality of data, or said plurality of databases query results;
d) allowing a user from said vehicle to review and select at least one of said plurality of service recommendations, or at least one of said plurality of replacement part recommendations;
e) effectuating an e-commerce or an e-business transaction to place an order for said user selected said plurality of service recommendations, or to place an order for said user selected said plurality of replacement part recommendations; and
f) confirming said e-commerce, or said e-business order placement.

18. The method of servicing a vehicle in accordance with claim 17 wherein, the step of confirming said e-commerce, or said e-business order further comprises the step of:
a) charging a plurality of fees for transacting said e-commerce, or said e-business transaction.

19. A method of servicing a vehicle including determining a plurality of service recommendations, or determining a plurality of replacement part recommendations comprising the steps of:
a) monitoring a plurality of said vehicle data, communicated wirelessly between an in-vehicle device located in said vehicle, and a communication interface device;
b) analyzing said plurality of data to determine said vehicle operational state, said vehicle engine performance levels, or said vehicle service requirements;
c) accessing a plurality of databases to obtain information related to determining said plurality of service recommendations, or said plurality of replacement part recommendations wherein, said plurality of databases can include both a plurality of local databases, or a plurality of remote databases accessible by way of a global network;
d) determining said plurality of service recommendations, or said plurality of replacement part recommendations based on analysis in step b, user preferences, or said plurality of databases query results; and e) presenting analysis, recommendations, and other results to at least one of the following: a mechanic, a customer, a user, a manufacture, a service center, an auto part store, or any appropriate plurality of agents or plurality of agencies;

f) allowing said user from said vehicle to review and select at least one of said plurality of service recommendations, or select at least one of said plurality of replacement part recommendations;

g) effectuating an e-commerce or an e-business transaction to place an order for said user selected said plurality of service recommendations, or place an order for said user selected said plurality of replacement part recommendations; and h) confirming said e-commerce, or said e-business order placement.

20. The method of performing remote diagnostics in accordance with claim 19 wherein, the step confirming said e-commerce, or said e-business order placement further comprises the step of:

a) charging a plurality of fees for transacting said e-commerce, or said e-business transaction.

21. A method of performing remote diagnostics on a vehicle comprising the steps of:

a) receiving at a communication interface device a plurality of data, said plurality of data being data communicated by an in-vehicle device located in said vehicle, or data communicated by a programmable storage device carried by a user;

b) communicating said plurality of data from said communication interface device to a remote location by way of a network;

c) analyzing said plurality of data at said remote location to determine said vehicle operational state and engine performance levels, and for performing remote said vehicle diagnostics;

d) accessing a plurality of databases to obtain information related to determining a plurality of service recommendations, or determining a plurality of replacement part recommendations wherein, said plurality of databases can include both a plurality of local databases, or a plurality of remote databases accessible by way of a global network;

e) determining said plurality of service recommendations, or said plurality of replacement part recommendations based on analysis in step c, said user preferences, or said plurality of databases query results; and f) allowing said user from said vehicle to review and select at least one of said plurality of service recommendations, or select at least one of said plurality of replacement part recommendations;

g) effectuating an e-commerce or an e-business transaction by placing an order for said user selected said plurality of service recommendations, or by placing an order for said user selected said plurality of replacement part recommendations; and h) confirming said e-commerce, or said e-business order placement.

22. The method of performing remote diagnostics in accordance with claim 21 wherein, the step of confirming said e-commerce or said e-business order further comprises the step of:

a) charging a plurality of fees for transacting said e-commerce, or said e-business transaction.

23. A system for wirelessly collecting a plurality of data associated with a vehicle and for using collected said plurality of data to query a plurality of databases, or a plurality of global network based data processing resources for the purpose of servicing said vehicle, including determining automotive replacement parts for said vehicle comprising:

an in-vehicle device interconnected with said vehicle, said in-vehicle device having a vehicle engine control system interface for interfacing said in-vehicle device to said vehicle engine control system wherein, said in-vehicle device monitors said vehicle engine, said in-vehicle device having a wireless transceiver for wirelessly data communicating between said in-vehicle device and a plurality of data communicating devices; and a communication interface device for data communicating wirelessly with a plurality of data communicating devices, and for receiving said plurality of data from said in-vehicle device, said communication interface device having a data communication connection with a personal computer;

said in-vehicle device further comprises at least one of the following:

a vehicle monitor and metering interface for measuring or monitoring vehicle telemetry data and vehicle metric data wherein, said in-vehicle device can by way of said wireless transceiver data communicate vehicle engine status to said communication interface device, and a plurality of global network based data processing resources, said vehicle monitor and metering interface include at least one of the following: an accelerometer for measuring or monitoring said vehicle acceleration changes, a tachometer for measuring or monitoring said vehicle velocity; or an odometer for measuring and monitoring said vehicle travel distance;

a vehicle radio interface for interconnecting said in-vehicle device to a vehicle radio wherein, said vehicle radio interface communicates analog and digital signals between said in-vehicle device and said vehicle radio, said vehicle radio can by way of said vehicle radio interface data communicate with said communication interface device, and said plurality of global network based data processing resources, said vehicle radio can by way of said vehicle radio interface data communicate with said plurality of global network based data processing resources, such data communication can include monitoring of radio station selections, or listening content, or effectuating download and broadcast of digital content from said plurality of global network based data processing resources;

an alarm system interface for monitoring vehicle security status wherein, said in-vehicle device can by way of said wireless transceiver data communicate vehicle security status to said communication interface device, and said plurality of global network based data processing resources, wherein such data communication between said in-vehicle device can include command and control instructions to start, stop, enable, or disable said vehicle engine;

a personal data assistant interface for data communicating between said in-vehicle device and a personal data assistant device;

a user interface including a display, and a microphone for enabling a user to issue voice commands to said in-vehicle device, and for enabling a user to access local data or remote data wherein, remote data can be located on said plurality of global network based data processing resources; or a global positioning receiver interface for data communicating global positioning data between said in-vehicle device and a plurality of global network based data processing resources;

wherein, said plurality of databases are accessible by said communication interface device, or accessible by said personal computer;

wherein, said vehicle by way of said in-vehicle device data communicates said plurality of data to said communication interface device for the purpose of accessing and querying results from said plurality of databases or from said global network based data processing resources, and for associating said plurality of data with a plurality of data elements and storing the result in a database.

24. A system for wirelessly collecting a plurality of data associated with a vehicle and for using collected said plurality of data to query a plurality of databases, or a plurality of global network based data processing resources for the purpose of servicing said vehicle, including determining automotive replacement parts for said vehicle comprising:

an in-vehicle device interconnected with said vehicle, said in-vehicle device having a vehicle engine control system interface for interfacing said in-vehicle device to said vehicle engine control system wherein, said in-vehicle device monitors said vehicle engine, said in-vehicle device having a wireless transceiver for wirelessly data communicating between said in-vehicle device and a plurality of data communicating devices; and a communication interface device for data communicating wirelessly with a plurality of data communicating devices, and for data communicating with said in-vehicle device;

said in-vehicle device further comprises at least one of the following:

a vehicle monitor and metering interface for measuring or monitoring vehicle telemetry data and vehicle metric data wherein, said in-vehicle device can by way of said wireless transceiver data communicate vehicle engine status to said communication interface device, and a plurality of global network based data processing resources, said vehicle monitor and metering interface include at least one of the following: an accelerometer for measuring or monitoring said vehicle acceleration changes, a tachometer for measuring or monitoring said vehicle velocity; or an odometer for measuring and monitoring said vehicle travel distance;

a vehicle radio interface for interconnecting said in-vehicle device to a vehicle radio wherein, said vehicle radio interface communicates analog and digital signals between said in-vehicle device and said vehicle radio, said vehicle radio can by way of said vehicle radio interface data communicate with said communication interface device, and said plurality of global network based data processing resources, said vehicle radio can by way of said vehicle radio interface data communicate with said plurality of global network based data processing resources, such data communication can include monitoring of radio station selections, or listening content, or effectuating download and broadcast of digital content from said plurality of global network based data processing resources;

an alarm system interface for monitoring vehicle security status wherein, said in-vehicle device can by way of said wireless transceiver data communicate vehicle security status to said communication interface device, and said plurality of global network based data processing resources, wherein such data communication between said in-vehicle device can include command and control instructions to start, stop, enable, or disable said vehicle engine;

a personal data assistant interface for data communicating between said in-vehicle device and a personal data assistant device;

a user interface including a display, and a microphone for enabling a user to issue voice commands to said in-vehicle device, and for enabling a user to access local data or remote data wherein, remote data can be located on said plurality of global network based data processing resources; or a global positioning receiver interface for data communicating global positioning data between said in-vehicle device and a plurality of global network based data processing resources;

wherein, said vehicle by way of said in-vehicle device data communicates said plurality of data to said communication interface device for the purpose of accessing and querying results from said plurality of databases or from said global network based data processing resources, and for associating said plurality of data with a plurality of data elements and storing the result in a database.

* * * * *